(12) United States Patent
Lemelson

(10) Patent No.: US 6,708,385 B1
(45) Date of Patent: Mar. 23, 2004

(54) FLEXIBLE MANUFACTURING SYSTEMS AND METHODS

(75) Inventor: Jerome H. Lemelson, Incline Village, NV (US)

(73) Assignee: Lemelson Medical, Education and Research Foundation, LP, Incline Village, NE (US)

( * ) Notice: Subject to any disclaimer, the term of this patent is extended or adjusted under 35 U.S.C. 154(b) by 0 days.

(21) Appl. No.: 07/636,415

(22) Filed: Dec. 31, 1990

Related U.S. Application Data

(63) Continuation of application No. 06/667,358, filed on Nov. 1, 1984, which is a division of application No. 06/251,656, filed on Apr. 6, 1981, which is a continuation-in-part of application No. 06/091,908, filed on Nov. 6, 1979, now abandoned, which is a continuation of application No. 05/107,357, filed on Jan. 18, 1971, now abandoned, which is a continuation-in-part of application No. 04/858,560, filed on Aug. 29, 1969, now Pat. No. 3,854,889, which is a continuation of application No. 04/629,758, filed on Apr. 10, 1967, now abandoned, which is a continuation-in-part of application No. 04/465,812, filed on Apr. 8, 1965, now Pat. No. 3,313,014, which is a continuation-in-part of application No. 04/152,702, filed on Oct. 17, 1961, now abandoned, which is a division of application No. 03/449,874, filed on Jul. 28, 1954, now abandoned, application No. 07/636,415, which is a continuation-in-part of application No. 04/712, 443, filed on Mar. 12, 1968, now Pat. No. 3,559,256, and a continuation-in-part of application No. 04/717,065, filed on Mar. 12, 1968, now Pat. No. 3,559,257, which is a continuation-in-part of application No. 04/387,954, filed on Aug. 6, 1964, now Pat. No. 3,372,568, said application No. 04/712, 443, is a continuation-in-part of application No. 04/387,954, which is a continuation-in-part of application No. 04/219, 357, filed on Aug. 13, 1962, now abandoned, which is a continuation-in-part of application No. 03/557,415, filed on Apr. 10, 1956, now Pat. No. 3,049,247, which is a continuation-in-part of application No. 03/477,467, filed on Dec. 24, 1954, now abandoned, and a continuation-in-part of application No. 03/449,874, filed on Jul. 28, 1954, now abandoned.

(51) Int. Cl.$^7$ .................................................. B23Q 7/00
(52) U.S. Cl. ........................................................ 29/563
(58) Field of Search .............................. 29/33 P, 563, 29/568, 564; 408/1 R, 3, 234, 32, 34, 37, 42, 43; 409/131, 132, 151, 158, 161, 163, 164, 173, 197, 79, 80, 84, 117, 159; 483/14, 15, 32; 451/5; 118/696, 697; 228/7; 83/213, 214, 212.1, 255; 414/273, 267, 274, 279, 281; 318/568.1, 568.11, 568.12, 569, 600, 560, 567, 34; 364/474.01, 474.02, 474.11, 474.22; 198/349, 349.5, 349.6, 890, 890.1, 617, 340, 339.1, 350; 700/159, 160, 169, 180; 72/399, 400, 20.4, 21.1

(56) References Cited

U.S. PATENT DOCUMENTS

| | | | |
|---|---|---|---|
| 159,180 A | 1/1875 | Holt | 29/30 |
| 399,406 A | 3/1889 | Holt | 29/30 |
| 493,542 A | 3/1893 | Bessing et al. | |
| 660,477 A | 10/1900 | Wellman | 212/129 |
| 673,317 A | 4/1901 | Cole et al. | |
| 840,859 A | 1/1907 | Morse | 78/19 |
| 1,140,839 A | 5/1915 | Moore | |
| 1,218,044 A | 3/1917 | Beaman | 409/158 |
| 1,256,072 A | 2/1918 | Stevenson | 77/6 |
| 1,256,073 A | 2/1918 | Stevenson | 77/6 |
| 1,429,012 A | 9/1922 | Andrews | 212/17 |
| 1,522,600 A | 1/1925 | Strickland | |
| 1,629,184 A | 5/1927 | Thomas | 212/130 |
| 1,631,927 A | 6/1927 | Dietrich | |
| 1,674,100 A | 6/1928 | Fitch | |
| 1,729,891 A | 10/1929 | Moore | 212/128 |
| 1,837,718 A | 12/1931 | Kendall et al. | |
| 1,960,900 A | 5/1934 | Drexler | 89/42 |
| 1,979,473 A | 11/1934 | Klausmeyer | 77/28 |
| 2,017,865 A | 10/1935 | Morgan | 192/125 |
| 2,028,008 A | 1/1936 | Peyinghuas | 29/33 D |
| 2,043,293 A | 6/1936 | Jennings | 243/16 |
| 2,092,142 A | 9/1937 | Schuz | |
| 2,095,267 A | 10/1937 | Riverman | 268/63 |
| 2,102,995 A | 12/1937 | Coombs | 214/16.1 |
| RE20,630 E | 1/1938 | Hallenbeck | 212/132 |
| 2,139,403 A | 12/1938 | Cole | 29/33 |
| 2,139,772 A | 12/1938 | Ringe | 212/21 |
| 2,183,055 A | 12/1939 | Vanderpool | 51/166.9 |
| 2,238,921 A | 4/1941 | Waldsmith | 29/33 |

| | | | | | | |
|---|---|---|---|---|---|---|
| 2,245,932 A | 6/1941 | Miller ............... 118/324 | | 3,002,615 A | 10/1961 | Lemelson ............... 207/2 |
| 2,249,230 A | 7/1941 | Schafer ............... 77/3 | | 3,010,371 A | 11/1961 | Riedel et al. ............... 90/21 |
| 2,254,285 A | 9/1941 | Harris et al. ............... 212/312 | | 3,017,984 A | 1/1962 | Willard et al. ............... 198/29 |
| 2,286,571 A | 6/1942 | Pollard ............... 91/45 | | 3,049,247 A | 8/1962 | Lemelson ............... 214/16.4 |
| 2,310,870 A | 2/1943 | Retterath ............... 77/28 | | 3,052,140 A | 9/1962 | Guyer, Jr. ............... 77/5 X |
| 2,353,394 A | 7/1944 | Farmer ............... 211/49 | | 3,052,999 A | 9/1962 | Sedgwick et al. ............... 40/2.2 |
| 2,363,208 A | 11/1944 | Sulzer ............... 164/115 | | 3,054,333 A | 9/1962 | Brainard et al. ............... 90/56 |
| 2,386,520 A | 10/1945 | Watson et al. ............... 45/2 | | 3,055,612 A | 9/1962 | Stout et al. ............... 243/13 |
| 2,423,440 A | 7/1947 | Neergaard ............... 178/19 | | 3,071,262 A | 1/1963 | Bosch et al. ............... 214/16.4 |
| 2,428,856 A | 10/1947 | Sinclair ............... 104/50 | | 3,088,197 A | 5/1963 | Cargill ............... 29/200 |
| 2,451,368 A | 10/1948 | White et al. ............... 214/95 | | 3,099,873 A | 8/1963 | Brainard et al. ............... 29/26 |
| 2,475,245 A | 7/1949 | Leaver et al. ............... 318/162 | | 3,106,612 A | 10/1963 | Lemelson ............... 179/6 |
| 2,479,293 A | 8/1949 | Bayless ............... 77/5 | | 3,113,404 A | 12/1963 | Narel et al. ............... 51/105 |
| 2,480,835 A | 9/1949 | Burqwin et al. ............... 250/41.5 | | 3,119,501 A | 1/1964 | Lemelson ............... 214/16.4 |
| 2,489,811 A | 11/1949 | Perkins ............... 51/147 | | 3,145,291 A | 8/1964 | Brainerd ............... 235/61.11 |
| 2,508,086 A | 5/1950 | Alvarez ............... 198/38 | | 3,154,979 A | 11/1964 | Crispin ............... 29/33 P X |
| 2,522,031 A | 9/1950 | Gavin, Sr. ............... 22/79 | | 3,173,175 A | 3/1965 | Lemelson ............... 18/26 |
| 2,522,613 A | 9/1950 | Harrison et al. ............... 51/185 | | 3,191,294 A | 6/1965 | Daugherty ............... 29/568 |
| 2,529,804 A | 11/1950 | Harnischfeger et al. ............... 250/2 | | 3,198,043 A | 8/1965 | Davis ............... 82/53.1 |
| 2,537,770 A | 1/1951 | Livingston et al. ............... 318/162 | | 3,202,449 A | 8/1965 | Lemelson ............... 294/88 |
| 2,558,300 A | 6/1951 | Knapp ............... 51/147 | | RE25,886 E | 10/1965 | Cargill ............... 29/200 |
| 2,575,792 A | 11/1951 | Ballard ............... 90/13 | | 3,227,012 A | 1/1966 | Lemelson ............... 77/65 |
| 2,576,341 A * | 11/1951 | Hanitz ............... 409/158 | | 3,227,290 A | 1/1966 | Lemelson ............... 214/1 |
| 2,580,472 A | 1/1952 | Smith ............... 214/1 | | 3,227,805 A | 1/1966 | Lemelson ............... 178/6.6 |
| 2,587,686 A | 3/1952 | Berry ............... 209/81 | | 3,229,656 A | 1/1966 | Bodey ............... 114/0.5 |
| 2,622,375 A | 12/1952 | Haas ............... 51/108 | | RE25,956 E | 2/1966 | Williamson ............... 90/11 |
| 2,623,626 A | 12/1952 | Dittola ............... 198/21 | | 3,238,615 A | 3/1966 | Leone et al. ............... 29/568 |
| 2,624,122 A | 1/1953 | Knobel ............... 33/164 | | 3,243,178 A | 3/1966 | Williamson et al. ............... 269/58 |
| 2,641,042 A | 6/1953 | Kopp ............... 25/107 | | 3,244,337 A | 4/1966 | Curtze ............... 225/2 |
| 2,646,177 A | 7/1953 | Nussbaum et al. ............... 214/11 | | 3,245,144 A | 4/1966 | Kumagai et al. ............... 29/568 |
| 2,647,647 A | 8/1953 | Alimanestiano ............... 214/16.1 | | 3,247,978 A | 4/1966 | Neumeier ............... 214/1 |
| 2,656,497 A | 10/1953 | Schweighofer | | 3,251,255 A | 5/1966 | Bauman ............... 83/295 |
| 2,665,013 A | 1/1954 | Socke ............... 214/1 BS | | 3,259,958 A | 7/1966 | Lemelson ............... 29/26 |
| 2,678,025 A | 5/1954 | Straky ............... 118/500 | | 3,260,349 A | 7/1966 | Vander Meer ............... 198/38 |
| 2,679,940 A | 6/1954 | Goertz et al. ............... 214/1 | | 3,266,141 A | 8/1966 | Jacobson et al. ............... 29/568 |
| 2,690,532 A | 9/1954 | Johnson | | 3,269,233 A | 8/1966 | Lothman ............... 82/14 |
| 2,691,448 A | 10/1954 | Lontz ............... 214/16.1 | | 3,271,840 A | 9/1966 | Solski et al. ............... 29/33 |
| 2,694,154 A | 11/1954 | Kingsbury ............... 250/219 | | 3,272,347 A | 9/1966 | Lemelson ............... 214/1 |
| 2,696,375 A | 12/1954 | Huff | | 3,272,975 A | 9/1966 | Csech ............... 235/151.11 |
| 2,696,921 A | 12/1954 | Desjardins ............... 214/16.1 | | 3,273,235 A | 9/1966 | Dziedzic et al. ............... 29/568 |
| 2,697,529 A | 12/1954 | Hubbell et al. ............... 214/147 | | 3,280,659 A | 10/1966 | Allen ............... 77/1 |
| 2,707,666 A | 5/1955 | Becker ............... 312/319 | | 3,283,918 A | 11/1966 | Devol ............... 214/1 |
| 2,717,086 A | 9/1955 | Bush ............... 214/11 | | 3,285,437 A | 11/1966 | Lemelson ............... 214/16.4 |
| 2,729,943 A | 1/1956 | Clarke et al. ............... 60/97 | | 3,286,595 A * | 11/1966 | Wollenhaupt ............... 483/32 |
| 2,736,671 A | 2/1956 | Ransburg ............... 118/323 | | 3,310,855 A | 3/1967 | Orioli ............... 25/107 |
| 2,745,167 A | 5/1956 | Cross ............... 29/33.12 | | 3,312,370 A | 4/1967 | Kolarich et al. ............... 221/13 |
| 2,748,544 A | 6/1956 | Narel et al. ............... 51/105 | | 3,313,014 A | 4/1967 | Lemelson ............... 29/33 |
| 2,761,570 A | 9/1956 | Benson et al. ............... 212/126 | | 3,346,894 A | 10/1967 | Lemelson ............... 10/128 |
| 2,769,280 A | 11/1956 | Comstock ............... 51/32 | | 3,372,568 A | 3/1968 | Lemelson ............... 72/218 |
| 2,782,691 A | 2/1957 | Feagans ............... 90/13 | | 3,387,723 A | 6/1968 | Lemelson ............... 214/16.4 |
| 2,785,535 A | 3/1957 | Alcorn, Jr. et al. ............... 60/97 | | 3,389,814 A | 6/1968 | Lemelson ............... 214/16.4 |
| 2,803,333 A | 8/1957 | Freeman ............... 198/38 | | 3,412,431 A | 11/1968 | Lemelson ............... 18/26 |
| 2,807,383 A | 9/1957 | Scheltens ............... 214/731 | | 3,426,339 A | 2/1969 | Rich et al. ............... 179/100.2 X |
| 2,811,267 A | 10/1957 | Bock ............... 214/151 | | 3,465,298 A | 9/1969 | La Duke et al. ............... 340/172.5 |
| 2,820,187 A | 1/1958 | Parsons et al. ............... 318/39 | | 3,469,611 A | 9/1969 | Dunlap ............... 144/144 |
| 2,822,094 A | 2/1958 | Greer ............... 212/127 | | 3,474,919 A | 10/1969 | Lemelson ............... 214/16.4 |
| 2,834,156 A | 5/1958 | Oberlin ............... 49/48 | | 3,486,640 A | 12/1969 | Lemelson ............... 214/16.4 |
| 2,847,131 A | 8/1958 | Miller ............... 214/16.1 | | RE26,770 E | 1/1970 | Lemelson ............... 29/33 |
| 2,861,700 A | 11/1958 | James ............... 214/1 | | 3,497,088 A | 2/1970 | Lemelson ............... 214/16.4 |
| 2,861,701 A | 11/1958 | Bergsland et al. ............... 214/1 | | 3,513,993 A | 5/1970 | Lemelson ............... 214/16.4 |
| 2,882,476 A | 4/1959 | Wetzel ............... 318/162 | | RE26,904 E | 6/1970 | Lemelson ............... 214/1 |
| 2,883,912 A | 4/1959 | Billman et al. ............... 90/13 | | 3,519,148 A | 7/1970 | Lemelson ............... 214/16.4 |
| 2,884,113 A | 4/1959 | Converse et al. ............... 198/19 | | 3,519,151 A | 7/1970 | Lemelson ............... 214/16.4 |
| 2,903,120 A | 9/1959 | Thomas ............... 198/19 | | 3,520,424 A | 7/1970 | Lemelson ............... 214/16.4 |
| 2,921,487 A | 1/1960 | Schabot ............... 77/64 | | 3,530,571 A | 9/1970 | Perry ............... 29/563 |
| 2,927,258 A | 3/1960 | Lippel ............... 318/39 | | 3,543,392 A | 12/1970 | Perry et al. ............... 29/563 |
| 2,947,203 A | 8/1960 | Ausenda et al. ............... 77/5 | | 3,547,797 A | 12/1970 | Haggerty ............... 204/224 |
| 2,964,459 A | 12/1960 | Dearson ............... 294/116 | | 3,559,256 A | 2/1971 | Lemelson ............... 29/33 |
| 2,986,261 A | 5/1961 | Wenstrand ............... 198/21 | | 3,559,257 A | 2/1971 | Lemelson ............... 29/33 |
| 2,988,237 A | 6/1961 | Devol, Jr. ............... 214/11 | | 3,576,540 A | 4/1971 | Fair et al. ............... 340/172.5 |
| 2,997,154 A | 8/1961 | Lahm et al. ............... 198/19 | | 3,854,889 A | 12/1974 | Lemelson ............... 29/33 P |

| | | | |
|---|---|---|---|
| 4,016,540 A | 4/1977 | Hyatt | 340/172.5 |
| 4,369,563 A | 1/1983 | Williamson | 29/568 |
| 4,621,410 A | 11/1986 | Williamson | 29/568 |
| 4,636,137 A | 1/1987 | Lemelson | 414/730 |
| 4,773,815 A | 9/1988 | Lemelson | 414/744 A |
| 5,017,084 A | 5/1991 | Lemelson | 414/744.3 |

FOREIGN PATENT DOCUMENTS

| | | |
|---|---|---|
| DE | 1477681 | 1/1969 |
| GB | 404617 | 1/1934 |
| GB | 902069 | 7/1962 |

OTHER PUBLICATIONS

Williamson, D.T.N., *Molins System 24—a new concept of manufacture*, Machinery and Production Engineering, Sep. 13, 1967.

Unknown, *Numerical Contol's Third Generation*, Metalworking Production, Sep. 13, 1967.

Unknown, *New Concept of Manufacture*, The Engineer, Sep. 15, 1967.

Williamson, D.T.N., *Molins System 24—a new concept of manufacture*, Machinery and Production Engineering, Oct. 25, 1967.

Williamson D.T.N., *A New Pattern of Batch Manufature*, Materials and Methods, Jul. 1968.

Williamson, D.T.N., *System 24—A New Concept Of Manfacture*, Proceedings of the 8th International M.T.D.R. Conference, May 1968.

Cornely, H., "Die Verkettung von Normalmaschinen zu einer Fertigungsstrasse," Industrie–Anzeiger Essen, pp. 336–337, Stuttgart, Germany, Sep. 1962.

DeGroat, George H., *Metalworking Automation*, McGraw–Hill, pp.3–6, 1962.

Siegfried, Von Ing J., "Elastische Automatisierung mit Fertigungsketten," pp. 200–204 Koln, Germany, 1957.

Author Unknown, Title unknown, pages from a Russian book, pp. 260–265, date unknown.

Author Unknown, "Thirty–Seven Short Case Histories Of Automation In The U.S. and Canada," *Automation and Society*, pp. 86–553 & 45–53, Date Unknown.

Bittel, Lester R., Melden, Morley G., Rice, Robert S., *Pratical Automation Methods For Increasing Plant Productivity*, McGraw Hill, 1957.

Brosheer, Ben C., "The NC Plant Goes To Work", *American Machinist*, Reprint, Oct. 23, 1963.

Fehse, Ing–Wilhelm Dr., "Wirtschaftlicher Einsatz von Drhmaschinen in der Einzelund kleinen Reihenfertgung and die Voraussetzunger hierfur," *Klepzig Fachberichte*, pp. 75–83 vol.69, No. 3, Mar. 1961. (Translation).

Perry, Carl, "New System Concept Means Greater Flexibility," *Report From Cincinnati*, pp. 8–12, vol. 24, No. 2, 1967.

"News Report . . . First US Tape–Controlled Line Goes into Production at Hughes–El Segundo," *American Machinist*, p. 98 (Mar. 24, 1958).

Wagenseil, "The Line that Made Headlines," *American Machinist*, pp. 106–09 (May 5, 1958).

"Electronically Controlled Machine–Tool Production Line," *Science Digest*, p. 84 (Jun. 1958).

Wagenseil, "America's First Tape–Controlled Production Line," unknown date and source.

Punched–Tape Units Control New Type Transfer Line, *Iron Age*, pp. 106–108 (Mar. 20, 1958).

Wagenseil, "America's First Tape–Controlled Production Line," *Metalworking Production*, pp. 1639–1642 (Jun. 13, 1958).

Williamson, 'New Wave' in Manufacturing, *American Machinist*, pp. 143–154 (Sep. 11, 1967).

Sarafin, Eugene E., *Multiple Computer System Controls Manufacturing Line*, Control Engineering, pp. 83–92, Dec. 1964.

Johnson, A.H., *Systems Approach To Manufacuring*, Automation, pp. 72–75, May 1965.

Author unknown, *A Step Toward The 'Automatic Factory'*, Production, pp. 75–79, Jul. 1965.

Author unknown, *IBM Buys Its Own Sales Pitch*, Production, pp. 140–146, Oct. 1965.

Author unknown, *Computer Speeds Materials Flow*, American Machinist, Nov. 1965, pp. 81.

Berka, Charles, *Computerized Handling Planned for New IBM Plant*, Material Handling Engineering, pp. 61–64, Dec. 1965.

Author unknown, *The Automatic Factory*, Fortune, beginning at p. 160, Nov. 1946.

E. W. Leaver and J. J. Brown, *Machines Without Men*, Fortune, beginning at p. 165, Nov. 1946.

John T. Diebold et al., *Making the Automatic Factory a Reality*, Griffenhagen, asserted publication date 1951.

John Diebold, *Automation The Advent of the Automatic Factory*, pp. v–vii, ix, & 54–89, (1952).

Author unknown, *On–Line Computers Control Circuit Production*, Machinery, pp. 91–95, Dec. 1965.

Author unknown, *Tape Controlled Transfer Machine*, Automation, Jun. 1958.

Herman Goldberg, *Master Bases Cut Fixture Costs*, American Machinist, pp. 83–90, Dec. 1948.

Author unknown, *Economical Tooling with Standard Jig and Fixture Components*, Machinery, pp. 450–451, Sep. 1951.

Author unknown, *Advanced Methods Used In Creating Computer Microcircuits*, Automation, pp. 84–89, Jan. 1966.

Author unknown, *Advanced Numerical Control Applications*, Tooling & Production, pp. 75–76, Mar. 1966.

Author unknown, *Making Printed Circuit Panels*, Automation, pp. 66–74, Jan. 1967.

An Ozzie Glover Production, videotape entitled *Industrial Breakthrough*, Industrail Systems Division of Hughes Products, asserted to depict a production line that was publically unveiled on Mar. 11, 1958.

Brosheer, Ben C. and Desollar, James C, *'Variable Mission' Machining*, American Machinist Special Report No. 620 (Sep. 9, 1968).

McCauley, W. Nash, *Fundamentals of Multi–Machine Manufacturing Systems*, Technical Paper for presentation at American Society of Tool Manufacturing Engineers Engineering Conference (1968).

Specification No. CE(R)13, Transfer Line Specification, Sundstrand Aviation document (Jul. 21, 1965).

\* cited by examiner

*Primary Examiner*—Derris H. Banks
(74) *Attorney, Agent, or Firm*—Louis J. Hoffman

(57) ABSTRACT

A machine tool method employs a plurality of tools which may be sequentially or simultaneously automatically controlled to perform preprogrammed operations by either the same or different workpieces. A unit of work is conveyed to be operated on by selected of the plurality of tools that are controllably operated at respective work locating positions.

A plurality of command control message signals are generated to perform preprogrammed operations either in sequence or simultaneously on the same workpiece or simultaneously on separate workpieces spaced apart on a common conveyor such as a flight conveyor while the conveyor is either in motion or stationary. In another form, the conveyor is automatically stopped with units of work thereon, each disposed so as to be predeterminately located with respect to a respective machine tool which has been prepositioned adjacent the work-holding conveyor. In yet another form, at least certain of the machine tools are movable parallel to the work-holding conveyor so that they may be predeterminately moved prior to and/or during operations on work. In yet another form, means are provided for transferring units of work from the work-holding conveyor to temporary platforms adjacent certain of the respective machine tools so that each tool may perform automatic operations on work while the work-holding conveyor remains operating.

694 Claims, 5 Drawing Sheets

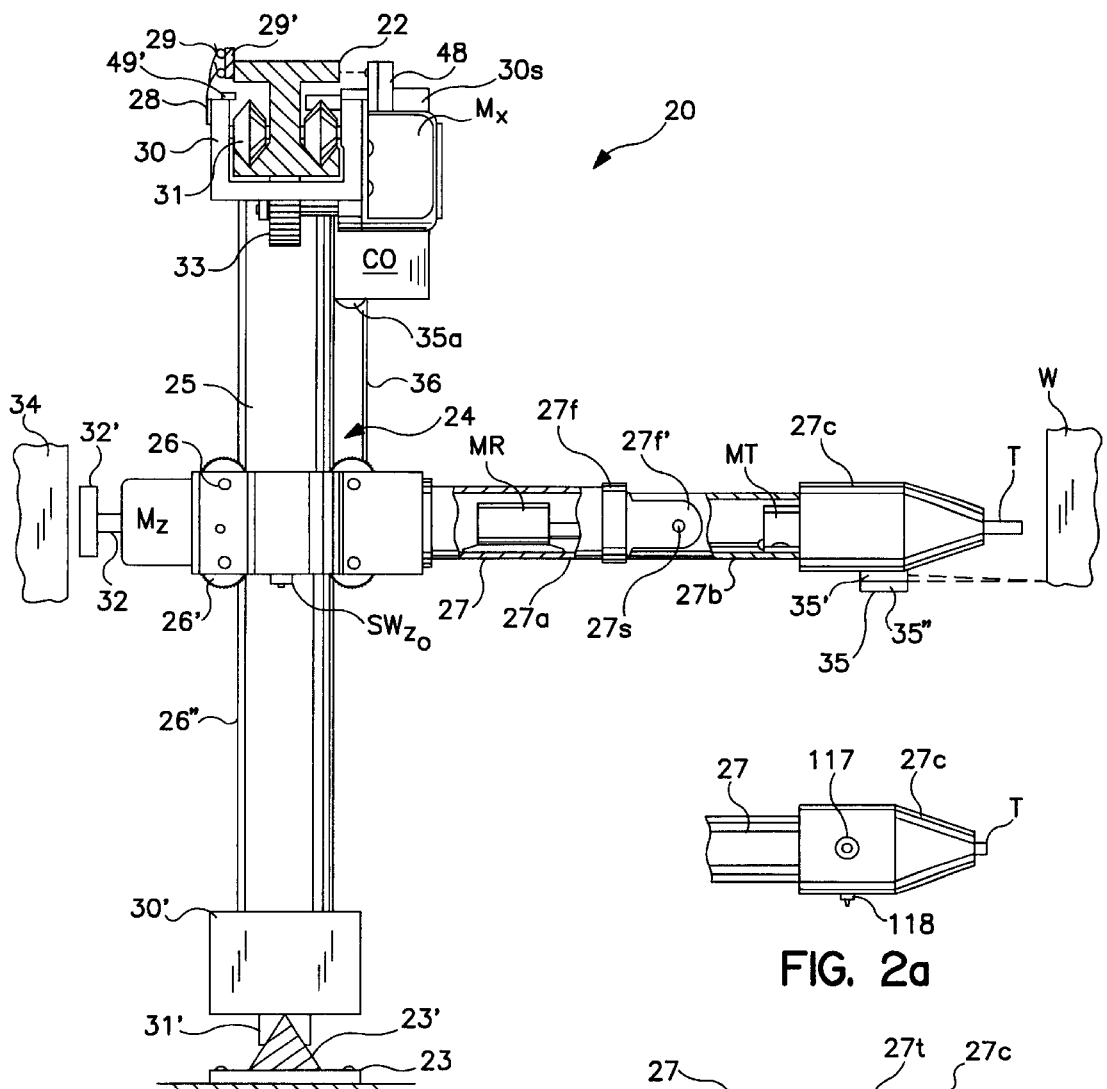
FIG. 2
FIG. 2a
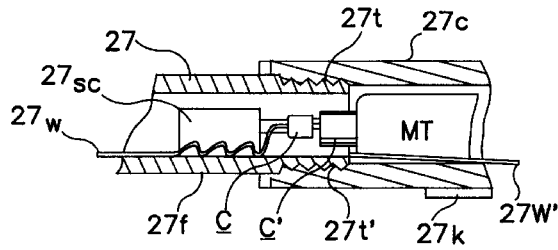
FIG. 2b

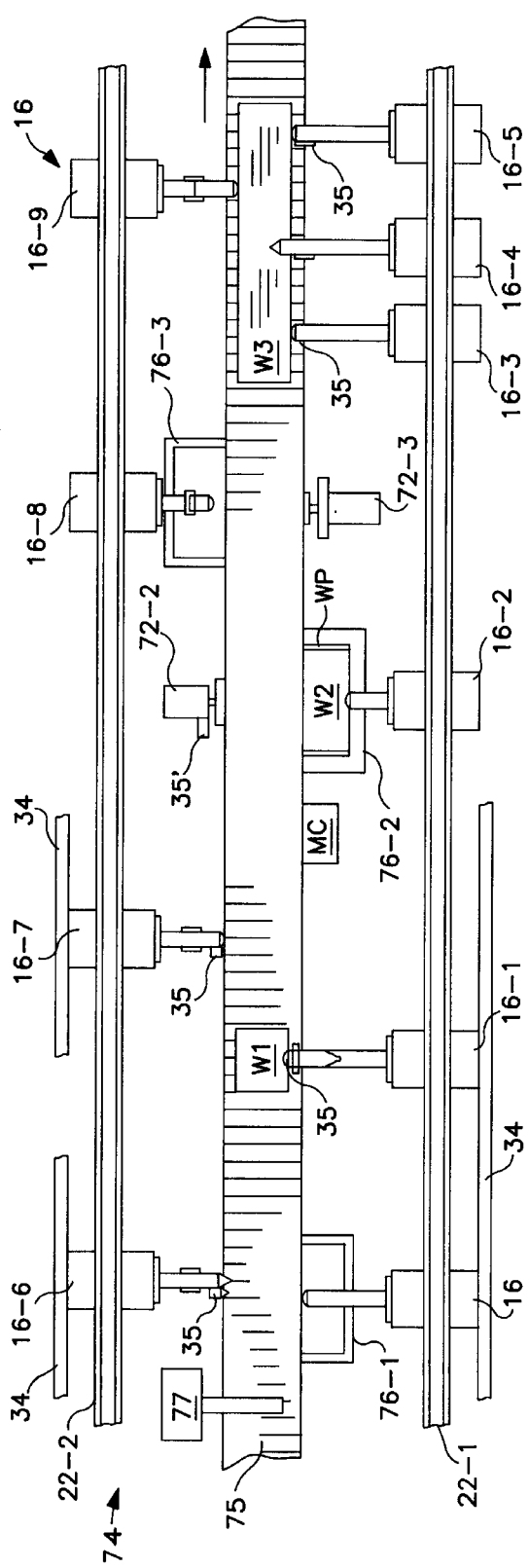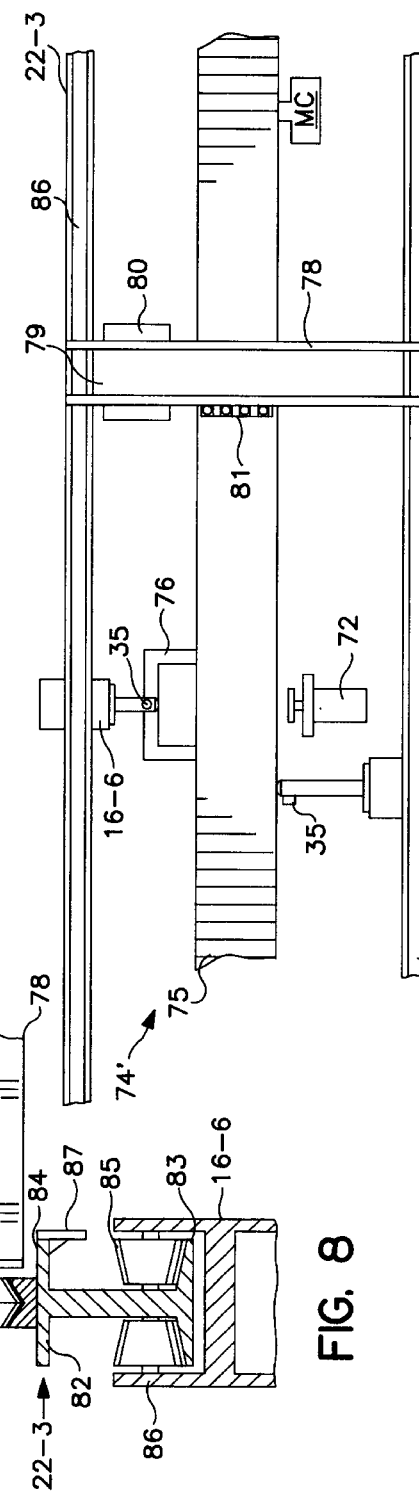

FLEXIBLE MANUFACTURING SYSTEMS AND METHODS

RELATED APPLICATIONS

This is a continuation of application Ser. No. 06/667,358, filed Nov. 1, 1984, which is a divisional of application Ser. No. 06/51,656, filed Apr. 6, 1981, which is a continuation of application Ser. No. 06/091,908 filed Nov. 6, 1979, now abandoned, which is a continuation of application Ser. No. 05/107,357 filed Jan. 18, 1971, now abandoned, which is a continuation-in-part of:

a) application Ser. No. 04/858,560 filed Aug. 29, 1969, now U.S. Pat. No. 3,854,889, which is a continuation of application Ser. No. 04/629,758 filed Apr. 10, 1967, now abandoned, which is a continuation-in-part of application Ser. No. 04/465,812 filed Apr. 8, 1965, now U.S. Pat. No. 3,313,014, which is a continuation-in-part of application Ser. No. 04/152,702 filed Oct. 17, 1961, now abandoned, which is a divisional of application Ser. No. 03/449,874 filed Jul. 28, 1954, now abandoned, and Ser. No. 07/636,415 is a CIP of b) each of the applications Ser. No. 04/712,443 filed Mar. 12, 1968, now U.S. Pat. No. 3,559,256, and Ser. No. 04/717,065 filed Mar. 12, 1968, now U.S. Pat. No. 3,559,257; each of said applications Ser. Nos. 04/712,443 and 04/717,065 being a continuation-in-part of application Ser. No. 04/387,954 filed Aug. 6, 1964, now U.S. Pat. No. 3,372,568, which is a continuation-in-part of application Ser. No. 04/219,357 filed Aug. 13, 1962, now abandoned, which is a continuation-in-part of application Ser. No. 03/557,415 filed Apr. 10, 1956, now U.S. Pat. No. 3,049,247, which is a continuation-in-part of the applications Ser. No. 03/447,467 filed Dec. 24, 1954, now abandoned, and Ser. No. 03/449,874 filed Jul. 28, 1954, now abandoned.

SUMMARY OF THE INVENTION

This invention relates to an automatic production apparatus and method for producing products employing a plurality of remotely controlled machine tools operative to perform preprogrammed operations in sequence and in certain instances simultaneously on the same workpiece. Heretofore, machine tools have been automatically controlled to perform either the same repetitive operation on the same workpiece or, if the machine tools have been program controlled by means such as a numerical controller or computer, it has been required that the same type of workpiece be sent to each machine for performing similar operations on each unit until the machine can be reprogrammed to perform different operations. Accordingly, it is a primary object of this invention to provide an automatic production apparatus including a plurality of production machines, each of which is separately program controllable and simultaneously operable on either the same or different workpieces whereby the total time required to operate on a specific workpiece is substantially reduced.

Another object is to provide an automatic production apparatus including a transport means for a power-operated tool and control means for said tool which is operative to permit the initiation and performance of predetermined operations on a workpiece without the need for precisely positioning the work relative to the transport means.

Another object is to provide a new and improved automatic production apparatus having a plurality of self-propelled machine tools movable along a common guide or trackway and each program controllable in its operation to operate on work from any selected location on said trackway whereby two or more separate machine tool units may perform predetermined operations relative to a single workpiece or a plurality of workpieces of different sizes and shapes.

Another object is to provide an automatic production system having a plurality of machine tools each of which is separately positionable along a common guide or trackway so as to permit each tool to perform varied operations on not only units of conventional work to be machined but also large work assemblies.

Another object is to provide a new and improved automatic production system having a common carrier or guideway means for a plurality of different production tools including tools for performing operations which conventionally require both automatic machine tool operation and manual operations such as machining, finishing, assembling, fastening, inspection and transfer of both semi-finished and finished goods to and from their production area or line thereby totally eliminating the need for manual labor to produce certain assemblies currently requiring a substantial amount of same.

BRIEF DESCRIPTION OF DRAWINGS

With the above and such other objects in view as may hereafter more fully appear, the invention consists of the novel constructions, combinations and arrangements of parts as will be more fully described and illustrated in the accompanying drawing, but it is to be understood that changes, variations and modifications may be resorted to which fall within the scope of the invention as claimed.

In the drawings:

FIG. 2 is a side view of one form of machine or tool which may be controlled by the system defined in FIG. 1;

FIG. 2a illustrates modified features applicable to the machine illustrated in FIG. 1;

FIG. 2b is a fragmentary sectional view of a means for coupling a tool assembly to an arm fixture assembly in accordance with the invention;

FIG. 6 is a plan view of an automatic production line embodying features of the instant invention;

FIG. 7 is a plan view of an automatic production line embodying features of the invention, and FIG. 8 is an end view in partial cross section of a portion of the apparatus shown in FIG. 7.

DETAILED DESCRIPTION

Figure 1:
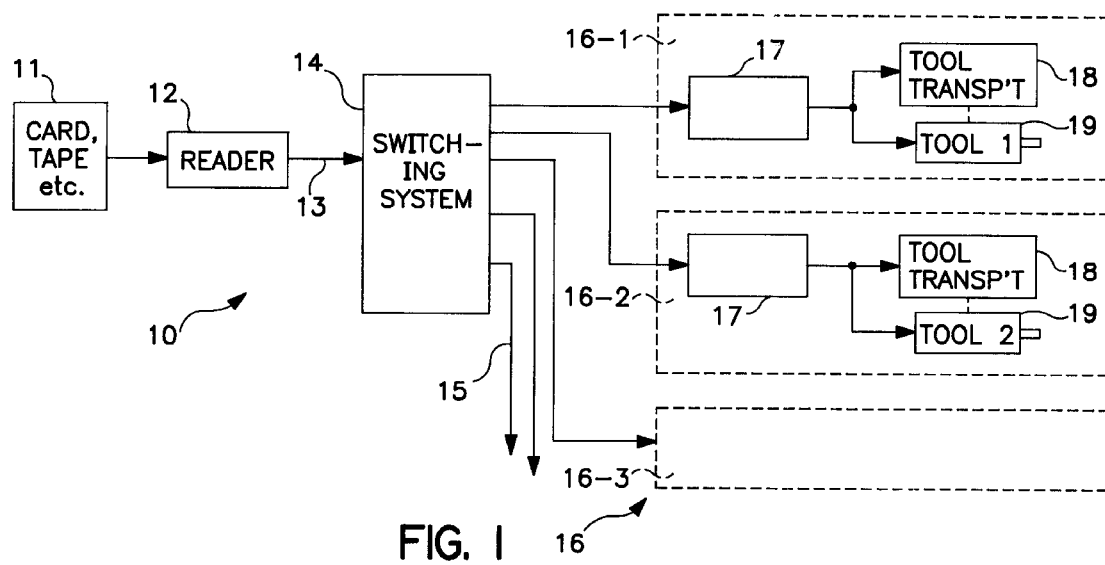
FIG. 1 is a block diagram of an automatic machine control system broadly defining aspects of the instant invention.

For the purpose of simplifying the drawings and description to follow it is assumed that, where not shown, the correct circuit, power supplies, diodes and the like are provided on the proper sides of all motors, switches, relays, solenoids, counters, and similar devices used for control. Also, any mechanical features or devices not illustrated are assumed to be provided in accordance with available conventional components or assemblies or are illustrated in greater detail in one of my said copending applications.

Provided and described hereafter are systems for effecting the automatic and remote control of one or a plurality of power-operated devices which are electrically controlled by remotely generated digital recordings comprising portions of what will be referred to as command control messages. A command control message is defined as one made up of different message units each of which is a portion of the entire message and contains, in addition to one or more discrete groups of digital signals or pulse trains, one or more digital and/or tone signals operative to effect the selective gating of a command control portion of said message unit to a particular controller or control device in the system for activating or presetting said control device.

The separate messages may thus each comprise (a) a series of pulse trains or digital codes generated as electrical signals of the same frequency, (b) a series of pulse trains or codes having interposed between certain of said codes, tone signals of different frequencies which are operative to energize different code responsive or tone responsive relays in the control,system for gating a respective portion or code unit of the remainder of the message to a respective control device for energizing or presetting same in accordance with the digital value of the gated code or (c) a series of tone signals of different frequencies with certain of said tones being operative to effect the gating of other tone signals to preset or energize controls in the system responsive only to respective tone signals. Thus, while the switching means described hereafter may be defined as code responsive or coded relays responsive to code portions of the command control message, they may also comprise tone relays responsive to specific frequency tone disposed between other digital code, pulse train or tone portions thereof operative to effect control of the operation of the tool and the motor means positioning the tool relative to the work on which it performs.

Command control messages may also be composed of different codes or control tones which are transmitted simultaneously in which said codes comprise pulse trains or groups of digital signals each of a different frequency. The groups of tones or tone codes may be recorded as they are transmitted on a single channel of the magnetic recorder of the machine or station to which they have been gated and separated thereafter by the proper filter means. Thus, they may be independently used for control of respective servos or filtered from one another and independently recorded on different channels of a multi-channel recorder or utilized upon separation from the single signal to preset respective predetermining means as described hereinafter.

FIG. 1 shows elements of an automatic production system or apparatus 10 having a plurality of power-operated tools and devices 19 each of which is remotely controllable to perform a specific function or functions relative to work-in-process, equipment or facilities in operation. At a location remote from said power-operated devices 19, a source 11 of input command signals is operatively connected to a scanning device or reader 12. The command signals which control one or more of said power-operated devices 19 may be provided as digital recordings or the like on one or more of a plurality of cards, tapes, discs or other recording media which are scanned by photoelectric, magnetic, mechanical switches or other scanning means referred to as reader 12. The result of scanning is generated as a plurality of digital signals on the output 13 of reader 12 which are transmitted as one or more command messages which are individually transmitted and routed to respective receivers associated with selected of the plurality of power-operated devices 19.

Transmission of the signals generated on the output of scanner or reader 12 may be accomplished by wire or short wave means. In FIG. 1, the output 13 is connected by wire to a switching system 14 such as an automatic telephone switching system which is operative by the first portion of the message generated in reader 12 to effect switching of the remainder of the message on a selected of a plurality of outputs 15 thereof to a selected machine or tool station generally designated 16. In other words, a plurality of tools or tool stations designated 16-1, 16-2, 16-3, etc. may be provided in the system 10 illustrated in FIG. 1, any one or more of which may receive a particular command control message in accordance with the switching and connection portion of the message which is first generated and transmitted to switching system 14.

Each of the plurality of tools or power-operated devices 19 is activated through an assembly including a receiver-controller 17 which is operative to receive and record or otherwise utilize command control messages destined to automatically control the machine tool or device associated therewith. The receiver and controller 17 of each tool preferably includes a recording means for a plurality of command control messages and means presettable by a particular message for predetermining the operation of a tool transport means 18 and the tool 19 itself.

The transport means 18 may comprise one or more motor driven fixtures for prepositioning one or more power-operated devices 19 in sequence with their operation as controlled by the output of receiver and controller 17. The power-operated devices 19 for each unit or station 16 may vary from single or multiple open-loop tools such as motor driven drills, riveters, welding tools, mills, buffers, grinders, material applicators, such as sprayers or the like. They may also comprise assembly and/or disassembly tools for fasteners or components associated with a machine, component or work-in-process which is positioned in the realm of operation of the power-operated devices 19. Other open-loop devices may also include scanning and inspection machines and apparatus such as X-ray, ultrasonic, electron-beam or other radiant energy devices operative to inspect a predetermined portion of a workpiece or assembly or to machine, weld, or otherwise operate thereon in accordance with movement and operation thereof as controlled by the command control message or messages transmitted to the receiver and controller 17.

Tools of the type described may also be operative in a closed-loop system which includes one or more feedback signal generating means operative in response to signals generated with the movement of the tool, its operation and/or by scanning that portion of the work affected by the tool or device 19.

FIG. 2 shows an automatic production tool T and a transport or positioning means therefore which is applicable to perform various operations controlled by command signals generated remote therefrom. The automatically operative apparatus, generally designated 20, includes guide means for a tool carriage assembly 24 in the form of an overhead mounted track 22 and a floor mounted track 23 extending adjacent to one or more workpieces or assemblies W disposed along the path of the parallel tracks 22 and 23. The tracks 22 and 23 may be fixed within a given work area and may comprise one of a plurality of such tracks, each mounting a respective tool carriage assembly 24 or may be mounted on a further frame or tool base which is movable to a particular production or maintenance location by automatic or manually directed means.

Supporting the assembly 24 from above is a first support carriage 30 having a plurality of wheels 31 rotationally supported thereon which ride in respective V-shaped grooves in the bottom legs of the I-beam shaped track 22 along which the tool assembly 24 is movable for positioning the tool T thereof at different locations defined by the extension of tracks 22 and 23. Extending between the upper support carriage 30 and a lower support carriage 30' is a vertical fixture or column 25 supporting a second support carriage 26 which is movable up and down along column 25.

A first motor Mx is mounted on carriage 30 and is operative to drive said carriage 30 longitudinally along track 22. The output shaft of gear motor Mx mounts a drive wheel 33 which may frictionally engage the lower surface of track 22 or may contain a plurality of teeth engaging a spur gear portion of the lower surface of track 22 (not shown). A single wheel 31' has a wedge-like peripheral indentation which rides on a wedge-shaped upwardly extending portion 23' of track 23 for supporting the assembly 24 in fixture relation thereon.

Carriage 26 is driven up and down on column 25 by any suitable electrically controllable drive means mounted either on said carriage 26 or the remainder of the assembly. In FIG. 2, a plurality of toothed wheels 26' are shown rotationally mounted on carriage 26 and are driven by a motor Mz also mounted thereon, to engage one or more spur gear toothed portions. Shown laterally extending from support carriage 26 is a fixture assembly 27 including a first arm 27a and a second arm 27b mounted for movement relative to arm 27a. Carriage 26 is secured to the end of assembly 27. A fitting 27f containing a plurality of fork-like elements 27f' pivotally supports arm assembly 27b on a shaft or pins 27s. A motor MR mounted within arm 27a is operative to pivot arm 27b about the axis of aligned pins 27s under the control of the computing means to be described. Mounted near the end of arm 27b is a tool assembly 27c containing a tool or other power operative device T. The tool assembly 27c is preferably removable from the end of 27b as shown in my said applications of which this is a continuation-in-part, so as to permit different tools to be operated by the apparatus illustrated by the performance of minor changeover functions therefor.

In addition to the provision of one or more workpieces, machines or assemblies W disposed at different locations adjacent to track 22 to be selectively operated on by the tool T of the assembly 24 in accordance with a programmed sequence of movements and operations, a means 34 in the form of one or more assemblies or supports is provided adjacent one or more of the work members W or extending parallel to the track 22 which serves as a bucking member for the tool T. Shaft 32 of a lineal servo is mounted on or within the housing which supports motor Mz and operative to be projected against the adjacent surface of member 34 during the operation of the tool T to serve as a support or bucking means for the tool T and/or a means for prepositioning tool T relative to the work. The head 32' at the end of shaft 32 engages member 34 and transmits axial forces directed there-through from the tool T to member 34. Operation of head 32' to project against member 34 is preferably program controlled by the same means controlling the various servo motors such as Mx, Mz, MR and MT.

All of the components operative to control both prepositioning and operation of the one or more tools T mounted on the assembly 24 are mounted in housing CO. Such components operate in accordance with a programmed input originating as one or more command control messages transmitted thereto from a remote location as will be hereinafter described.

Other features of the apparatus of FIG. 2 include a plurality of wires 29 which are supported off track 22 by a plurality of insulating spacers 29'. An assembly 28 of slides or brush elements which are insulatedly supported by carriage 30 and movably engage respective of the plurality of wires 29 for the transmission of electrical energy to the various servo motors mounted on apparatus 20 and of signals operative to control said motors.

A retractor reel 35a of electrical cable 36 extends between housing CO and the various motors mounted on the carriage 26 and the tool fixture assembly 27 extending therefrom. The retractor reel 35a is operative to retract cable 36 when carriage 26 moves upwardly and to permit the paying out of cable 36 when carriage assembly 24 moves downwardly.

Scanning and switching controls for the apparatus 20 which will hereinafter be described in greater detail, include a photoelectric cell relay 48 mounted on carriage 30 and operative to scan a grid, marks or reflective markers disposed along the edge of the upper leg of the I-beam track 22. Mounted on the other wall of carriage 30 is a limit switch 49' adapted to be activated by a pin or pins projecting from track 22. Either or both these scanners may be mounted on the lower carriage 30' to define means for controlling movement of the assembly 24 along the path defined by both tracks.

A photoelectric scanning relay 35 is shown secured to the housing of tool assembly 27c for the tool T disposed at the end of arm fixture assembly 27 and is operative to scan and detect the work surface, portions thereof, reflective markers or other means disposed on or adjacent to the work or its holding fixture. The relay 35 preferably includes a photoelectric cell disposed in a first housing or compartment 35' adjacent to a light source disposed in a second compartment 35" and adapted to project a beam of light substantially parallel to the scanning axis of the photoelectric cell so that the cell may become energized upon detecting the light from said light source after its reflections off the surface of the work being scanned. The photoelectric relay 35 may be utilized for merely detecting the appearance of a portion of the workpiece such as an edge thereof as it comes into alignment with the projected light beam. It may also be utilized for effecting fine adjustment and positional control of the tool positioning fixture in scanning narrow retroreflective markers or grid lines disposed on a reflex reflecting surface such as the commercially available Scotch Lite.

FIG. 2a illustrates the fixture assembly 27 of FIG. 2 modified with a plurality of limit switches 117 and 118 mounted on and projecting in different directions from the housing of tool assembly 27c. A first limit switch 117 is adapted, with its actuator arm projecting laterally and horizontally outward therefrom, to engage a vertical surface of a workpiece, housing of a machine or the like. A second limit switch 118 is mounted on assembly 27c with its actuator arm projecting vertically downward and is adapted to effect automatic control of the apparatus as will hereinafter be described when it engages a horizontal surface such as the top of the workpiece or a lateral projection thereof. Other means may also be utilized for sensing workpiece or workmount surfaces such as magnetic means or means such as photoelectric relay 35 adapted to detect the reflection of a light source off the surface of the workpiece.

As stated, the tool or device T positioned by the apparatus 20 in the realm of movement of the arm fixture assembly 27 may comprise various forms of electrically controlled power operative devices for performing one or more of a plurality of production machining, assembly or inspection functions, material handling or maintenance functions. These devices may include various tools adapted to shape or machine the work such as drills, mills, saws, grinders, buffers, punchers and shapers or the like; various assembly devices including welding tools, riveters and other fastener,applicators adapted to be automatically prepositioned and operated in a programmed fashion on the work; various inspection devices including radiation devices such as light, X-ray, magnetic field measurement, electron beam measurement and cathode ray devices such as a television camera photomultiplier device and various maintenance tools including wrenches, screwing and unscrewing devices, manipulators for valves, dials and arms projecting from the piping or devices to be controlled thereby; manipulator jaws or the like.

In FIG. 2 motor MR is operative to pivot the arm 27b on arm 27a. This servo motor MR may also be operative to project and retract 27b with respect to arm 27a or to rotate 27b about the longitudinal axis of arm 27a. In other words, various combinations of rotary and lineal servo devices are conceived as applicable to the arm fixture assembly 27 as illustrated or to various modifications thereof depending on the production functions required of the apparatus. If servo MR is a gear motor operative to rotate 27b about the longitudinal axis of arm 27a, then the automatic control means described hereinafter may be operative to effect the automatic assembly and disassembly of various tool housings and the different tools held thereby with the end of arm 27b, particularly if assembly is effected by threading means in which tool assembly 27c is screwed onto the end of arm 27b.

A fixture for holding a plurality of tools T located in different housings of tool assembly 27c may be prepositioned relative to the track 22 so that command message control of the operation of motor Mx after controlling Mz to position carriage 26 at the proper height, may be operative to effect the disassembly of one housing of tool assembly 27c already mounted on the end of arm 27b and its placement in a predetermined location on said fixture and the automatic assembly thereon of a selected tool housing which is at a predetermined location on said fixture.

FIG. 2b shows details of the coupling means at the end of arm fixture assembly 27 such as arm 27b operative to both secure the tool assembly 27c thereto and electrically connect the devices secured therein to the electrical circuitry of the fixture assembly 27 and the power and control means located in housing CO. The arm or column defining the end of fixture assembly 27 has a threaded end 27t for removably securing it to the threaded end 27t' of the housing or mount of tool assembly 27c, which function may be performed automatically as described by rotating either or both assemblies after their signal controlled alignment with each other. Electrical connection of components MT or others mounted within the housing of tool assembly 27c may be effected by the provision of aligned contact members at the end of fixture assembly 27 and within tool assembly 27c which contact member engage each other to connect respective circuits of both assemblies when the proper degree of relative rotation of both is effected.

In FIG. 2b a push-pull, bi-stable solenoid 27sc is secured within fixture assembly 27 near the end thereof and mounts a pluggable electrical connector C at the end of its shaft. Connector C is adapted to engage a receptacle or female electrical connector C' secured within tool assembly 27c upon coupling of assemblies 27 and 27c by the projection of the shaft of solenoid or lineal servo 27sc. A signal operative to project said shaft may be derived from the programmed command control sequence as will be hereinafter described. Thus, the multi-circuit cable 27w extending along the interior of fixture or arm assembly 27 is electrically connected to respective lines of a cable 27w' associated with the housing of tool assembly 27c. Line 27w is shown slack or coiled at its end to permit it to be advanced and retracted with movement of the shaft of the solenoid 27sc and line 27w' may contain power and control circuits operative to energize the various electrical devices such as tool servo MT associated with tool assembly 27c. A key or shaped portion 27k on the housing of tool assembly 27c projects therefrom and is used for aligning and retaining said assembly 27c in its storage fixture and/or is used to rotate and assemble same with fixture assembly 27.

Other features of the apparatus of FIG. 2 include the provision of a servo or solenoid operated means for engaging and locking the carriage 30 against the track 22 to steady and preposition the tool carrier assembly 24 during the performance of a particular production operation thereof. A solenoid 30s mounted on the sidewall of carriage 30 has an actuator arm adapted to project and engage the main rib of the I-beam track 22. Such a device, which may also be mounted on the bottom carriage 30' for the engagement of the track 23, may be automatically controlled to engage and disengage track 22 by respective portions of the command control message, prior to and after tool operation on the work in a predetermined cycle as described hereinafter.

Figure 3:
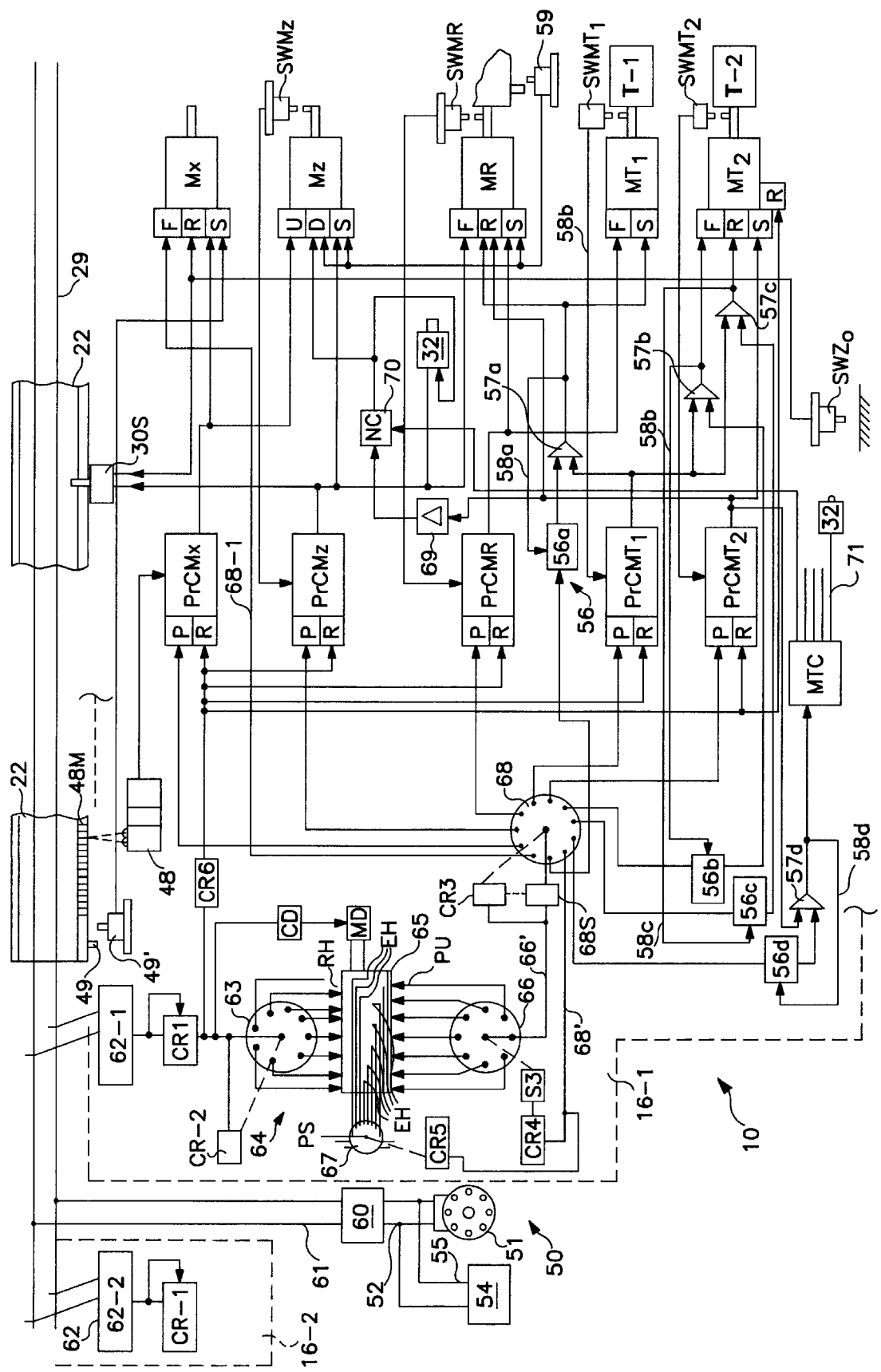
FIG. 3 is a schematic diagram illustrating further details of an automatic control system of the type illustrated in FIG. 1.

FIG. 3 illustrates further details of a system employing one or more remotely controlled tools or devices as described. A source of command control messages is operative at a station or console, generally designated 50, which is situated remote from the power-operated devices controlled thereby. The command control messages may be generated by manual means including a dial operated or push button digital pulse train generating device 51 or a code generating device 54 such as the described card, tape, disc or drum reader having recording elements containing said command control messages which are sequentially scanned in the reader to generate said messages electrical signals. The outputs 52 of device 51 and outputs 55 of device 54 are connected to a signal transmitter 60 which is operative to transmit by short wave or wire 61 the command messages of devices 51 and 54 to a plurality of receivers for power-operative production devices in work stations 16-1, 16-2, etc.

Assuming that the command control message generated on the output of transmitter 60 is destined for the power-operated devices associated with station 16-1, said message is received by the receiver 62-1 thereof as well as the other receivers 62 of the system but is only gated to the control apparatus coupled to the output of receiver 62-1, to the exclusion of all other control apparatus in the system, by means of a tone or coded relay CR-1 connected across the output of 62-1. The relay CR-1 contains a normally open slow-to-close or bi-stable switch and is operative to close said switch in response to a first portion of the command control message which may be a code or tone of such a characteristic as to activate relay CR-1 to the exclusion of similar types of relays each connected to the output of the other receivers 62 in the system. The remainder of the command control message is then operative to perform the following functions:

The next portion or unit code part of the command control message is passed to a second coded relay CR-2 and is utilized to activate relay CR-2 to energize the switching input of a rotary stepping switch 63 to step said switch to the next switching position or any predetermined switching position. The output of the receiver 62-1 passes through the rotary stepping switch 63 to a selected of a plurality of outputs thereof each of which is connected to a respective recording head RH of a bank of said heads which are positioned to record messages on respective of a plurality of recording tracks of a magnetic recording drum, disc, etc.

The drum 65 is driven by a servo device MD which, in the apparatus illustrated, is operative in one of two selected modes including constant speed rotation of drum 65 or stepping rotation of said drum as will be described hereinafter.

A plurality of reproduction heads PU are operatively coupled to the recording channels of drum 65 permitting the recorder 64 to serve as a source of a plurality of command control messages transmitted thereto from station 50 which messages are selectively reproducible therefrom, one after the other or in predetermined sequence, to control the positioning and operation of the one or more power operative devices associated with the assembly or station 16-1. The heads PU are each connected to a respective input of a solenoid or servo driven rotary stepping switch 66. The single output 66' of switch 66 is connected to the input of a second rotary stepping switch 68 for distributing portions of the reproduced command controlled message to various predetermining controllers which are operative for controlling the movement and operation of the one or more power operative devices. The switch 68 is stepped to gate the input 66' to the various outputs thereof by means of a third tone or coded relay CR-3 which operates the servo 68s driving the switch 68 in response to portions of the command control message disposed between the other portions thereof which are utilized for controlling the further control devices coupled to the outputs of 68.

A typical cycle of operation will now be described in order to describe the various control components and features of the particular system illustrated in the drawing. A first portion or code unit of the command control message is gated on line 66' through switch 68 to a predetermining controller PrCMx which is operative to control a first servo motor Mx for positioning the machine tool in a first direction along guide or track 22. It is assumed that carriage 30 is located at a predetermined position on the track 22 as defined by a home position locator stop or pin 49 and a limit switch 49' mounted on the carriage 30'. Switch 49' is operative when its actuator arm strikes 49 as the carriage 30 moves to said home position to have stopped motor Mx with, for example, an end of track 22. Controller PrCMx may be of the code or pulse-presettable type as described in my said copending application, and is operative to receive a pulse or tone code or predetermined number of digital pulses comprising the portion of the command control message gated thereto. Such pulses preset the controller or counter whereby it operates thereafter to generate a stop-signal upon receipt of a predetermined number of feedback pulses produced with movement of the carriage 30 along track 22 by a scanning means such as a limit switch or photoelectric cell 48 which scans incremental marks, holes or grid devices 48M along track 22 or disposed on a member positioned adjacent the track, and generates a pulse each time a grid line 48 or pin is so scanned.

The next portion of the command control message is operative to activate code responsive relay CR-3 to step or rotate switch 68 to the next switching position to gate the following portion of the message to a second predetermining controller PrCMz which is constructed similarly to controller PrCMx. Controller PrCMz is operative to control the servo motor Mz which drives carriage 26 in a vertical direction for prepositioning tool T in a vertical direction relative to work disposed in alignment therewith as a result of controlled operation of motor Mz.

The coded relay CR-3 which controls operation of the rotary switch drive element of switch 68 is next energized by a code or tone comprising the next portion of the command message to step the input 66' thereto to an output extending to a third predetermining controller PrCMR which controls operation of fixture rotating servo motor MR for angularly positioning the tool mounted portion of the fixture relative to the work described elsewhere herein. The input 66' is controlled by the stepping of switch 66 through CR-4 and S-3. Servo motor MR may be operative to rotate the entire fixture on its base or overhead mounted carrier or to pivot one or more portions of the fixture and the notation may be representative of a plurality of such motors operative to rotate, project or pivot different portions of the fixture and/or tool.

Figure 4:
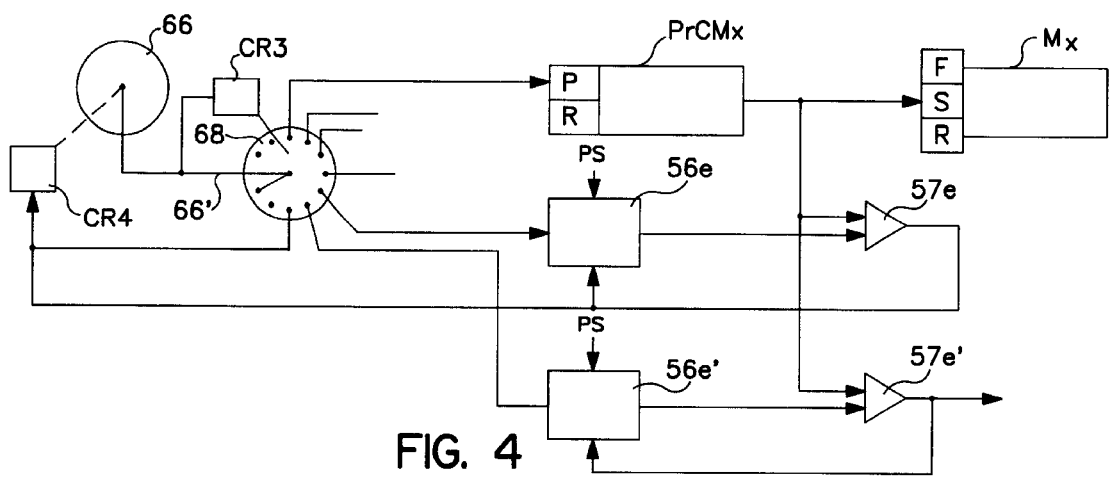
FIG. 4 is a schematic diagram showing further modifications to a system of the type illustrated in FIG. 3.

Further portions of the reproduced digital message are operative to activate the relay CR-3 which effects rotation of rotary switch 68,for gating predetermined portions or units of the message to other controllers for controlling operation of the tool or tools disposed on the fixture prepositioned by motors Mx, Mz, MR, etc. The controllers illustrated in FIG. 4 are presented to be illustrative only and their number as well as mode of operation and devices controlled thereby may be varied according to specific production requirements. These controllers include pulse presettable predetermining controllers PrCMT-1 and PrCMT-2 the function of which will be described and one or more variable control devices MTC. In their simplest form, control devices MTC may comprise multicircuit timers or the like adapted to gate electrical energy or pulses to the respective of the start and stop controls of the various motors and servos such as Mx, Mz, MR, Mt-1 and MT-2. Such gating may be in sequence and of a time duration or time separation such that the tool or tools T-1, T-2, etc. mounted on thefixture will be operated in a predetermined manner during a production, inspection or maintenance function and/or will be moved through a predetermined path after being prepositioned as described.

Assume first that the tool transport means or tool carriage assembly 24 is located with the carriage 30 stopped at a home position as defined by a pin 49 or other stop located on the track 22 which engages the actuating arm of limit switch 49' mounted on carriage 30 causing said switch to activate the stop control S of motor Mx. A start pulse comprising a portion of the reproduced command control message is gated through rotary switch 68 and transmitted on an output 68-1 thereof to the start control F of motor Mx. Thus, assembly 24 is drive along track 22 in the direction of the workpiece or device which is situated adjacent track 22 and is adapted to be operated on by tool T or scanned by an inspection device mounted on carriage assembly 24.

As carriage 30 travels along track 22, photoelectric scanner 48 scans position indicating marks 48M disposed along or adjacent track 22 and generates pulses for uncounting the predetermining counter controller PrCMx which has been preset by a portion of the command control message. Upon uncounting, the controller PrCMx transmits a control pulse to the stop control S of motor Mx and the forward or up-drive control input U of motor Mz to cause the carriage 26 to rise from its lowermost position at the bottom of the track defined by vertical member 25. Uncounting of predetermining controller PrCMz is effected by means of a switch SWMz positioned to become actuated with rotations or fractions of rotations of the output shaft of gear motor Mz and to generate a pulse each time it is so actuated which is transmitted to the uncount input of controller PrCMz.

Upon uncounting, controller PrCMz generates a control pulse which is transmitted to the stop control S of motor Mz and to the start control F of motor MR which rotates the fixture or portion thereof mounting the tool a predetermined degree. Control of motor MR is effected by a limit switch SWMR generating feedback signals as it becomes actuated by means of a cam mounted on the shaft of the output of gear motor MR. Switch SWMR provides feedback, uncounting pulses to the uncount input of predetermining counter controller PrCMR. Upon uncounting, controller PrCMR generates a pulse which is transmitted to the stop control S of motor MR and to the start control F of motor or tool servo MT-1 which is coupled to tool or power operative device T-1.

The output shaft of motor MT-1 is operative to actuate a limit switch SWMT-1 or operative for sensing the rotation thereof, which generates a feedback pulse and transmits same to the counter controller PrCMT-1 which effects uncounting of said controller. Upon attaining its uncount condition, controller PrCMT-1 generates a control pulse and transmits same to the stop control S of motor MT-1. For certain fabrication, Inspection or maintenance functions it may be merely required to operate the tool, clamp or inspection device T, for a predetermined time interval or degree of movement thereof which will be substantially a function of the number of rotations of the output drive shaft of the gear motor or servo MR.

In other production or maintenance functions employing apparatus of the machine or station 16-1 which is more complex in operation, it may be desired to operate one or more additional servos, tools or inspection devices after tool T-1 has been operated. In FIG. 4 control means are provided (1) for either reversing operation of each of the servos MR, Mz and Mx to cause the respective assemblies moved by each to return to a home position, (2) for activating a further tool or tools T-1 or (3) for activating one or more predetermining controllers MTC to control either or both the tool or transport drive motors in a predetermined cycle whereby the tool or tools move through a predetermined path and operate in a predetermined manner at the location attained by means of the positional control effected by the first portion of the command control message.

Portions of the command control message may be operative to effect the selective operation of certain of the servo motors or power-operated devices to the exclusion of others by activating certain control elements to the exclusion of others during a particular control cycle. For example, a single presetting pulse may be gated through switch 68 (whereafter said switch steps to its next position) to any of the predetermined controllers PrCMx, PrCMz, PrCMR, permitting operation of the respective servo controlled thereby for only one rotation or fraction of rotation of its shaft so as to result in little or substantially no movement of the apparatus driven thereby.

Turning now to the operation of predetermining controller PrCMT-1, the output of said controller on which the uncount control pulse is gated, is connected to inputs to a number of switching control elements or circuits 57a, 57b and 57c. These control circuits are logical AND switching circuits which are each operative to generate a pulse on its respective output when its two inputs are simultaneously energized. Accordingly, the other inputs to the AND control devices 57a, 57b and 57c are connected to respective further control elements or circuits 56a, 56b and 56c any one of which may be energized by a signal portion of the command control message gated thereto from a respective output of the rotary switch 68.

In their simplest form, the control devices 56 comprise a bistable switch or flip-flop which is operative when energized by a signal passed to its input from switch 68, to gate a power supply (not shown) through control device 56 to energize the input to the AND switching element 57 connected thereto until the predetermining controller having its output connected to the other input of said AND switching element, uncounts. In other words, if it is. desired to reverse the operation of motor MR after motor MT-1 has finished its cyclic function, control element 56a will have been activated by a signal portion of the command control message gated through switch 68 thereto to the exclusion of the activation of control devices 56b and 56c as the result of the switching of 68 past the terminals of the switch connected to the inputs to 56b and 56c without gating signals through said switch thereto. If 56a is so activated, then when controller PrCMT-1 uncounts, the output thereof will only activate AND switching element 57a resulting in the generation of a control signal on the output of element 57a which is passed to the reverse control R of motor MR and the stop control S of motor MT-1. A time delay relay (not shown) may be provided in the circuit between element 57a and control R of servo MR to permit motor MT-1 to stop before the operation of MR, if necessary.

Thus, the output of AND switching circuit 57a is utilized to pulse the stop control S of servo MT-1 to terminate the operation of the tool T-1 powered or controlled thereby and is also utilized to drive motor MR in reverse to its home position which, when obtained, is operative to activate a limit switch 59 engaging a portion of the fixture driven by servo device MR. Activation of switch 59 is operative to gate a control pulse to the stop control S of motor MR and to the down drive control D of servo Mz. Activation of control S of the servo MR is operative to stop said servo with the fixture driven thereby at its "home" position while activation of D of servo Mz is operative to drive carriage 26 to its lowermost, "home" position on the track associated with the vertical column assembly 25.

Upon attainment of said lowermost position by carriage 26, a further control limit switch SWZo mounted on either carriage 26 or vertical assembly 25 becomes actuated and gates of power supply or pulse to the stop control S of motor Mz and the reverse drive control R of gear motor Mx resulting in movement of the assembly 20 to the "home" position defined by the track mounted pin 49 at which position limit switch 49' becomes activated and pulses the stop control S of motor Mx resulting in stoppage of the assembly at said home position.

To include the predetermined operation of a further tool or power-operated device T-2 in the hereinabove described cycle or to perform further predetermined operations including movement of tool or device T-1, the command control message will have been so composed as to have pulsed or activated certain or the other control elements 56b, 56c, 56d, etc. For example, if the command control message is operative to pulse control switch 56b gating a power supply to the AND switching circuit 57b to the exclusion of circuit 57a, then, when controller PrCMT-1 uncounts, a signal will be generated on the output of AND circuit 57b which is passed to the forward drive control F of a reversible gear motor MT-2 thereby causing motor MT-2 to drive tool or device T-2 in a first direction. The output of AND circuit 57b is also passed to a resetting or deactivating input of control switch 56*b* so as to deactivate same once its function has been fulfilled as are the outputs of each of the other illustrated AND switching circuits.

In other words, when control switches 56 are so deactivated, the power supply gated to their respective AND switching elements are no longer connected thereto. A feedback signal generating switch SWMT-2 is coupled to operate with rotation of the output shaft of servo MT-2 by means of a cam or other switch energizing device mounted on said shaft and provides feedback pulses to the predetermining counter controller PrCMT-2. Upon uncounting, PrCMT-2 generates a pulse on its output which activates the stop control S of motor MT-2 and is also utilized to energize either the down drive control D of motor Mz if the tool operating portion of the cycle is to end at this point. However, if it is desired to effect further movement and/or operation of one or more of the power-operated tools or devices, the output of PrCMT-2 may be utilized to activate a preset controller MTC such as a multi-circuit timer having a plurality of output circuits which extend to those of the illustrated motor start, stop and reverse controls which are desired to become activated in sequence and at predetermined time delays after the initial energization of controller MTC to perform the desired operation of the described apparatus.

While the multi-circuit controller MTC may be preset or predetermined in its function by a portion of the command control message, it may also be manually preset to perform a predetermined production operation and may comprise but one of a plurality of such cycle controllers which are operative only when a control switch 56*d* therefor is activated by a portion of the command control message and energizes an input of an AND switching circuit 57*d* having its other input extending from the output of controller PrCMT-2.

In order to prevent activation of the down drive control D of servo Mz while the cycle controller MTC is activated, one of the outputs 71 of controller MTC is connected to the switching input of a normally closed switch 70 in the circuit between PrCMT-2 and the down drive control D of motor Mz to effect the activation of switch 70 and the opening of said circuit so as not to permit the control pulse generated by PrCMT-2 to energize D of motor Mz. A time delay relay 69 located between the output of PrCMT-2 and D of servo Mz delays the pulse a sufficient interval so that it will appear at the input to switch 70 after said switch has opened. If switch 70 remains closed in the event that controller MTC is not activated, said pulse will be passed directly to D of servo Mz to effect the termination of the work cycle whereafter the carriage 26 is driven to the lower (or upper) home position resulting in the activation of control limit switch SWZo which stops carriage 26 at said position and activates the reverse drive control R of motor Mx resulting in the return of the tool carriage assembly 24 to the home position defined by pin 49 on track 22.

In the control functions described employing the reproduction of recorded command control messages to preset or energize controls of various predetermining controllers, operation of the multiple channel, endless track magnetic recorder recording medium was assumed to be continuous so as to permit the recording of new control messages while messages already recorded thereon are being reproduced. If a complete command control message is recorded on a single channel of the multi-channel recorder and is utilized as described to preset various of the predetermining controllers, the correct portions of said message may be gated to the correct predetermining controller inputs P by the provision of a normally open switch 68S in line 66' which will not pass any portion of the command message destined for the controllers situated beyond switch 68 until the appearance of the leading portion of the message one line 66' which contains a tone or code operative to energize relay CR3. Switch 68S is operatively coupled to CR3 and is closed thereby when the latter is energized and remains closed for a sufficient time interval to pass the longest messages to be gated to the various controllers situated beyond switch 68. In other words, switch 68S is either slow to open after closing or may be operative to close as a bi-stable switch by a portion of the control message gated therethrough. Switch control CR3 as well as the others are assumed to contain, in addition to activating means responsive to respective codes or tones, means for activating the various rotary switches and gates illustrated in FIG. 3 upon receipt thereby of the proper tone or code.

In FIG. 3, a coded relay CD is operative to start drum drive motor MD which is preferably a constant speed motor. Relay CD may be activated by either a code or tone portion of the command control message or one generated by an operator at the computer station 50.

While motor MD preferably operates at constant speed to permit the recording of certain messages while others are being reproduced and used for control purposes, it may also comprise a stepping motor operative in response to a coded or tone responsive relay energized by portions of a command control message or signals generated on the outputs of predetermining counter controllers PrCMx, PrCMz, PrCMR, etc. and MTC. Thus, portions of a command control message are reproduced sequentially only after the previously reproduced portions have been operative to preset or energize the previously controlled mechanism.

Notation MR in FIG. 3 may also be representative of any motor adapted to effect operation of the tool transport in a mode other than those modes controlled by motors Mx and Mz. It may comprise a joint rotating motor or one used to project and retract the tool. It may also define servo means for controlling other fixture or tool variables.

In FIG. 3, each of the predetermining counter controllers PrCMx, PrCMz, PrCMR, PrCMT, and PrCMT-2 has an input R, which, when pulsed, is operative to reset the counter to a null condition. A code or tone responsive relay CR-6 has its output connected to all of the resetting inputs R of the PrC controllers and MT-2 and its input connected to the input side of the switch or relay CR-1. If it is desired to reset the controllers for any reason prior to their operation, such function may be effected by transmission of the proper codes or tones from station 50 to the receiver 62 for energizing relays CR-1 and CR6.

In FIG. 3, the fixture and carriage locking solenoids 32 and 30*s* which have been described as to function, are advanced to engage and retain their assemblies against the respective surfaces by the uncount pulse produced on the output of PrCMz and are each retracted by the control pulses generated respectively on the outputs of switches 70 and SWZo to disengage their retain members at the end of a work cycle.

The command control signal recording and reproduction apparatus hereinabove described may be modified to include operation where certain tracks of the recording drum 65 are adapted to receive and record command control messages transmitted from computer 54 while other tracks contain recordings already provided thereon by locally recording same or other means and operative to effect predetermined movements and operations of the tool or device associated with the machine being controlled.

In the control function where recordings are transmitted from station 50 and recorded on selected or sequentially available tracks of the recorder 64, automatic signal erasure means may be employed to erase each command control message after it has been reproduced therefrom or during the recording of a new message on the same track. To retain certain signal recordings such as those which may be immediately or shortly thereafter reused for repeating a particular controlled action, erasure control may be effected by use of a tone responsive or coded relay gating a power supply to an erasure means such as a head riding on the track just reproduced from, said coded relay being connected to receive the control message and respond to that tone or coded portion thereof to which it is responsive.

A rotary stepping switch 67 in FIG. 3 is operative to connect a power supply PS with an erase head EH which is riding against the track just reproduced from, when a coded relay CR5 is activated by a portion of the message reproduced therefrom to effect the last mode of control. The activation of switch 49' signifying the end of a cycle controlled by a particular command message may also be operative to result in erasure of the channel from which said message was reproduced by connecting said switch 49' to activate CR5 or the solenoid controlled thereby.

In another form of the invention, the described digital or pulse train recordings which are reproduced as part or all of the command control messages from magnetic drum 65 may be replaced by a plurality of analog type signals which are operative upon being reproduced from the recording member to directly control the movement of one or more of the described fixture or tool motors. The analog signals may be transmitted from control console 50 or prerecorded on selected channels of drum 65 and reproduced when needed as the result of the action of one or more signals transmitted when needed as the result of the action of one or more signals transmitted from console 50 and operative to effect the selective and sequential reproduction of said analog signals to define a particular control cycle.

In other words, apparatus of the type described may be operative by controlling one or more servo motors by signals recorded on selected and predetermined of the recording channels of the drum 65 which are selectively reproducible therefrom under the control of signals transmitted to the receiving means 62 of the selected station 16 from the computer or other device 54 or the manual signal generating means 51. Assuming that there are n number of predetermined operations which the machine at station 16-1 may perform or be required to perform over a given time interval or to cover all possible production, maintenance and inspection functions, then a similar number of command control messages or analog signals would be recorded on known locations of the recorder such as on known tracks of the drum 65 and each would be selectively reproducible therefrom by transmitting the desired signal or signals to the receiver 62-1 to effect, as described, the stepping of switch 66 to connect its output 66' with that pickup head PU which is operatively coupled to reproduce from the channel or track of the drum 65 having the desired command control message recorded thereon.

For certain fabricating, inspection or maintenance functions utilizing the apparatus hereinabove described it may be desired to perform a plurality of prepositioning movements of the tool or power-operated device in the vicinity of the particular working location at which it was initially positioned by movement of the carriage 30 along guide or track 22 and carriage or fixture 26 vertically relative to track 25. For example, it may be desired to step the tool, once located at a particular spacial location in a particular direction or directions to perform a plurality of operations relative to a workpiece located thereat. The functions of drilling a plurality of holes in a line or in any predetermined array, applying a plurality of fasteners or assembling components with the workpiece in spaced-apart relationship, stepping a power-operated device such as a welding tool, inspection tool, or the like may be required whereby return of the tool transport assembly 24 to said home position each time the tool operates would result in the waste of a substantial amount of time. Accordingly, means are provided in FIG. 4 for modifying the control apparatus of FIG. 3 to permit any of the described tool positioning and/or operating servo motors to operate a plurality of times during a single cycle to perform predetermined operations on a workpiece in the realm of the tool or tools positioned by said transport means.

While means are provided in FIG. 4 for automatically controlling the predetermining controller PrCMx in a manner to be described, a plurality of said controllers including others thereof as described may be similarly controlled in sequence in a predetermined cycle as defined by the composition of the command control message passed through switches 66 and 68. The pulse presettable predetermining counter PrCMx is preset by a portion of a first of the command control messages reproduced from a first channel or track of recording member 65.

Feedback signals generated by motor Mx uncount PrCMx and result in a first control signal being generated on the output of PrCMx upon attaining its uncount condition. Said signal is transmitted to the stop control S of servo Mx and to an AND switching circuit 57e. The other input to 57e is connected to the output of bi-stable switch 56e having an input which is one of the outputs of rotary control switch 68. The controller switch 56e preferably comprises a bi-stable switch operative when energized by a pulse portion of the command control message passed through 68 thereto, to gate a power supply PS or continuous signal to an input of AND switching circuit 57e until an output control signal appears on the latter.

Thus, if the command control message is so constructed as to activate 56e, uncounting of PrCMx will result in a signal generated on the output of the AND switching circuit 57e which is passed to the tone or coded relay CR-4 controlling the position of the switching element rotary stepping switch 66. The command control message recorded on the next channel of recording drum 65 which is coupled to output line 66' or switch 66 is passed therethrough and is operative to step switch 68 by activating coded relay CR-3 the correct number of times prior to the passage of a pulse code or train to PrCMx again and a signal to the start control F of servo Mx or the reverse control thereof for repositioning carriage 30 and the tool thereof in a horizontal direction. Upon uncounting, PrCMx may be operative to perform any of the control functions hereinabove described which may include operation of one or more of the power-operated tools or devices.

In a similar manner, any of the other predetermining controllers PrCMz, PrCMR, PrCMT-1, PrCMT-2, etc. may be controlled in a predetermined manner to step the tool in any direction, cause it to travel a predetermined path, and/or predetermine its intermittent or continuous operation.

A second AND switching control circuit 57e' and flip-flop controller 56e' therefor are shown operatively connected to the output of PrCMx and switch 68 respectively for controlling the operation of any of the other servo motors described for positioning and/or operating the tools in the manner described. For example, assuming that the command control message does not contain a command portion to be passed through switch 68 to the input of 56e but does contain a portion which will be passed to 56e' when the arm of switch 68 is operatively coupled to the line or terminal thereof which is connected to 56e'. As a result, that servo or power-operated device which is connected to the output or circuit 57e' will become activated upon the uncount of PrCMx and may be controlled as described by generating feedback pulses with its operation which are fed to a respective predetermined controller.

Figure 5:
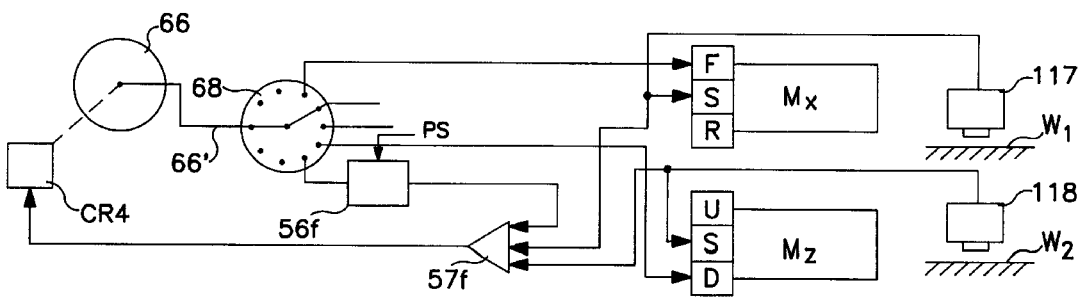
FIG. 5 is a schematic diagram showing further modifications to the system shown in FIG. 3.

In FIG. 2a control elements 117 and 118 in the form of limit switches or surface sensing devices were shown mounted on portions of the tool head or mount and were defined as operative to sense the surface of a workpiece towards which the tool is transported and to effect further control of the movement of the tool upon becoming activated. A modification to the control system of FIG. 3 is illustrated in FIG. 5 in which limit switches 117 and 118 are illustrated as forming part of the control circuitry. It is, of course, assumed that in FIGS. 4 and 5, the other elements of the circuit not illustrated therein are provided in FIG. 3 and are present and are modified accordingly.

Limit switch 117 is assumed to be operative to sense vertically disposed surfaces of the workpiece represented by the notation W1 and limit switch 118 is operative to sense horizontally disposed surfaces of the workpiece located below the tool which, in this modification, is movable towards the workpiece from above. Either or both switches 117 and 118 may be operative to preposition the tool relative to the workpiece. Assume that the tool is first being moved in a horizontal direction by operation of motor Mx and that limit switch 117 is so positioned that its actuator arm or sensing element will first engage a vertical or substantially vertical surface of a workpiece or other member adapted to be operated on or scanned by the tool. The motor Mx is first started by a portion of the command control message passed through switch 68 while the predetermining controller PrCMx has remained deactivated as the result of failure to receive presetting signals as a portion of the command control message. It is, of course, assumed that the tool or tool arm having switch 117 mounted thereon has previously been positioned at a desired vertical location by the predetermined operation and control of motor Mz. Upon approaching said vertical surface, the switch 117 becomes activated as the result of engagement of its actuator arm against the surface W1 of the workpiece or other element mounted in its path of travel. Closure or activation of switch 117 results in the generation thereby of a pulse signal and its transmission to the stop control S of motor Mx and one input of an AND switching circuit 57f. The other input to 57f is from a flip-flop controller 56f having a switching input connected to rotary stepping switch 68 and operative to become activated upon transmission thereto of a portion of the command control message.

Thus, if the command control message is operative to activate 56f, upon the activation of switch 117, motor Mx will stop and a pulse generated on the output of 57f will be transmitted to the relay CR-4 for stepping switch 66. As a result, the next command control message recorded on the drum 65 is reproduced therefrom and passed through switch 66 and gates portions of itself to those predetermining controllers and/or servo motor controls defined for cyclic operation in said next reproduced command control message. Similarly, if switch 118 is activated when it is driven against horizontal surface W2 by movement of the transport apparatus, it will generate a pulse on the output of AND switching circuit 57f provided that 56f has been energized by a portion of the command control message and will result in the generation of a new command control message for further controlling selected of the servo motors described.

Other features of the invention are noted as follows:

As stated, the tool transport fixture may be provided in a variety of machine configurations and may be floor, overhead, wall or machine mounted or movable on guide means secured to a plurality of such locations. Various configurations for such tools and fixtures are illustrated in my said abandoned application and vary from a single column subtending from an overhead track travelling carriage and having a tool such as a spray head or scanner mounted on an arm supported by a vertically movable fixture to one or more tools movable at the end of an arm or assembly which is movable in a plurality of ways by pivoting, rotating, projecting, retracting and otherwise moving portions of the fixture with respect to each other and the carrier of mount supporting the entire assembly.

Each assembly or movable portion of the entire tool transport fixture may be power-operated to rotate and/or translate by means of one or more servo motors coupled thereto through gears or other drive means and mounted on said assembly or the adjacent assembly. Sequential control of the various servo motors to effect eventual prepositioning of the tool or tools as described or by modification to the control apparatus hereinabove provided. Such modifications may include the following which are intended to comprise part of this invention.

Signals reproduced from an erasable recording medium such as the magnetic recording drum 65 may be sequentially gated directly to the controls of one or more of the illustrated and described servo motors used to position the fixture, tool and/or to operate said tool in a predetermined and programmed manner. Said signals may be utilized per se or generated as part of the described command control message to effect at least part of the control functions described by direct control of the servo coupled to the reproduction transducer reading drum 65. In other words, predetermining controllers PrC and MTC may be eliminated completely during a control cycle where the precision required in the operations of the apparatus is such that feedback signals are not required and the operations of the servo motors employed may be controlled by the duration or composition of the signal or signals reproduced from the recordings temporarily provided on member 65 by transmission thereto as described.

A combination of fixture positional control effected by one or more predetermining controllers as described and direct control of the tool operation itself by one or more signals reproduced directly from the drum 65 and transmitted directly to the motor or motors to be controlled in operating the tool, may be utilized for certain operations. This may be variably effected by operatively connecting those servo controls which are to be controlled by signals reproduced directed from the drum 65, to selected of the outputs of switch 68 which may be coupled to selected channels of drum 65 by signals reproduced from recordings on other channels. In other words, a command control message for a particular cycle is recorded on several channels and the latter portions of the message recorded on one channel are used to effect switching of output 66' of switch 66 to the next channel by energizing relay CR4 which activates solenoid 53 to switch 66 to the next position. Accordingly, line 66' is shown connected to the input circuit 68' through rotary switch 68 to relay CR4 so that if the proper tone or code appears on the output of switch 66 as reproduced from one channel, CR4 will become activated and will switch 66 to the next channel thereof without the need for first stepping switch 68.

FIG. 6 shows details of a portion of an automatic production system 74 which includes a plurality of remotely controlled machines of the type described or modifications thereof and conveying means for work-in-process disposed adjacent to the line of machines. A production line is defined in FIG. 6 which includes a centrally disposed power-operated conveyor 75 such as a belt conveyor driven by motor MC, flight conveyor or chain conveyor operative to carry individual units of work, three of which are illustrated and defined by notations W-1, W-2 and W-3, past a plurality of production machines 16 defined by notations 16-1 to 16-9.

FIG. 6 discloses means for guiding a plurality of production machines adjacent to both sides of the conveyor 75.

Such guide means includes overhead and/or floor mounted guideways or tracks of the type heretofore described and defined by notations 22-1 and 22-2. Movable along track 22-1 are a plurality of self-propelled machine assemblies denoted 16-1 to 16-5 while two such self-propelled production machines 16-6 and 16-9 are illustrated as movable along the track or guideway 22-2 for performing on work from the other side of the conveyor 75. A complete production line may include a substantial number of additional self-propelled machine tools, inspection machines and, in certain instances, automatic manipulators for handling, aligning, and transferring. If necessary, prepositioning work-in-process is derived from the conveyor 75 or auxiliary conveyors adjacent thereto for performing one or more operations thereon in cooperation with machine tools, inspection devices and other equipment mounted for travel along the track 22-1 and 22-2 or auxiliary machinery positioned adjacent thereto.

Figure 3A:
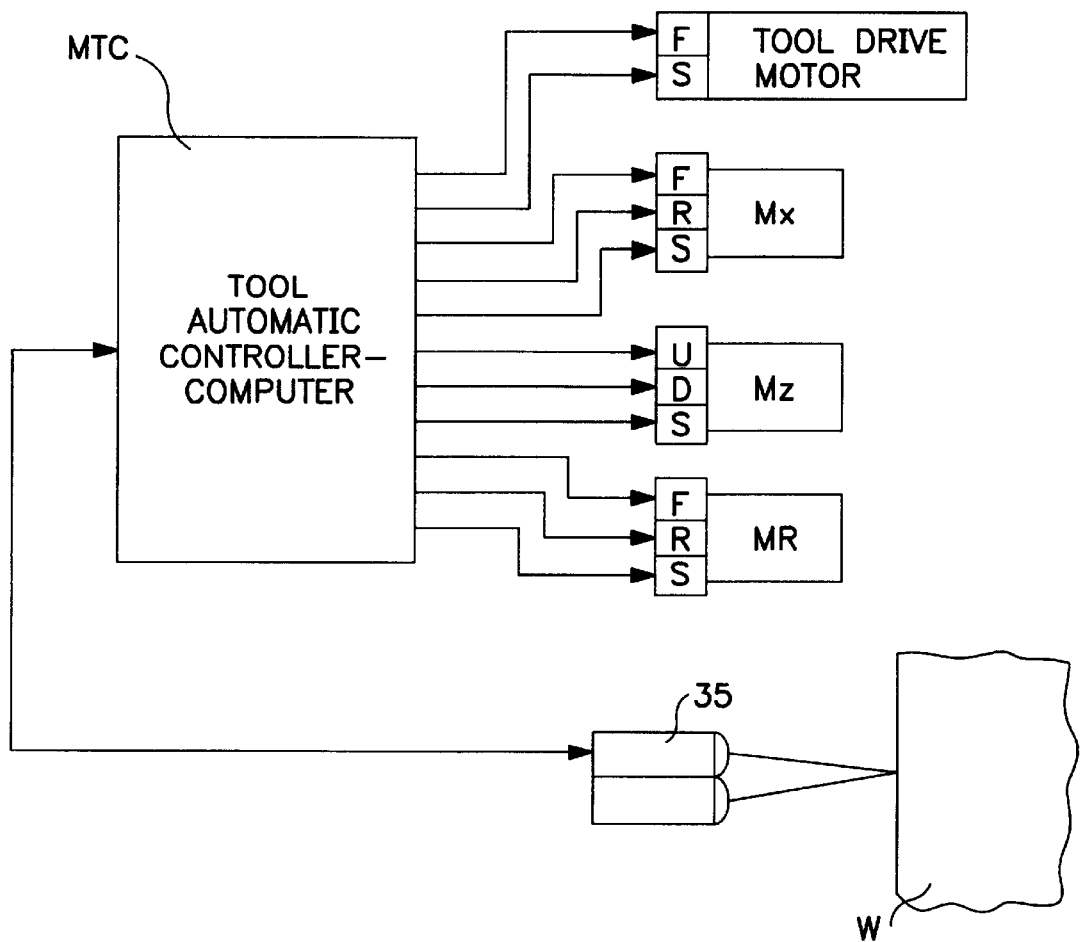
FIG. 3a is a schematic diagram illustrating a modification to the control system of FIG. 3.

The apparatus illustrated in FIG. 6 may be operated in a number of modes, several of which are illustrated in the drawing. A first work piece W-1 is located on the conveyor 75, and a first machine 16-1, which is self-powered to move along the track 22-1, is disposed in alignment with work W-1. In a first mode, the machine or tool 16-1 may be driven along the track 22-1 until it senses either end of the work W-1 or a pallet or container supporting said work on the conveyor. Detection may be effected by use of a scanning device such as the photoelectric detector 35 of FIG. 2, the limit switch means 117 of FIG. 2a or suitable detection means mounted on the tool assembly or tool head as illustrated in FIGS. 2 and 2a. The detection signal is transmitted as a feedback signal to initiate operation of the automatic controller or computer MTC shown in FIG. 3a as controlling the operation of the tool 16-1 by predeterminately controlling the motors. operating said tool and the tool then performs preprogrammed operations on the work piece W-1. In one form of this operation, the work may be moving at constant speed on conveyor 75 while the signals controlling the operation of the tool 16-1 are so composed as to move the tool along with the moving work and cause it to exercise said preprogrammed operations while the tool is moving to account for the movement of the work. In a second mode of operation, the detection signal is also operative to stop the conveyor 75 or the remotely located command signal generator or controller is programmed, not only to effect predetermined operation of the tool but also stoppage of the conveyor 75 so that the work W-1, may be operated on by the tool while said work is stationary on the conveyor.

In the third mode of operation, a work piece W-2, which is self-supported or supported by a carrier or pallet WP on the conveyor 75, is transmitted to a temporary work station 76-2 by means of a transfer device 72-2 located adjacent the work station and operative to push or otherwise carry the work into the temporary work station platform. The automatically controlled machine tool 16-2 is either prepositioned at the work station 76-2 as a result of its previous movement thereto or is driven to the work station under the control of signals generated by a computer or controlled command message generator of the type illustrated in FIG. 3. Alignment of the tool 16-2 with respect to the work W-2 may be effected by scanning alternate switch means detecting a marker or other suitable locating means at the work station 76-2 or by detecting the work itself or its supporting pallet. When the preprogrammed operations are completed by the machine 16-2 on the work W-2, said machine or another machine such as an automatic manipulator, which is drivable along either track 22-1 or track 22-2, is operated by the same computer and is operative to lift or otherwise transfer the work to the conveyor 75 for movement to the next station.

A fourth mode of operation of the apparatus of FIG. 6 involves the automatic control of a plurality of machines or tools, four of which are illustrated and denoted by notations 16-3, 16-4, 16-5 and 16-9 and all of which are remotely controlled, as described, to perform different operations on the same work piece W-3. The work piece W-3 may comprise a large unit of work such as a casting requiring multiple operations thereon which may be simultaneously performed or may comprise an assembly of elements forming a product or a product subassembly. The tools 16-3 to 16-6 may comprise one or more power-operated devices for performing such operations as drilling, tapping, assembling screws or other fasteners, welding, spraying, assembling parts or sub-assemblies with the work W-3, inspecting, plating, spraying, deburring, etc. Said tools may perform such preprogrammed operations from either or both sides of the conveyor 75, as certain of the tools are operative to move along and be positioned with respect to the track 22-2, while others operate on track 22-1 from the other side of the work W-3. Here again, the multiple tools may be programmed to operate on the work W-3 while said work is stationary on the conveyor 75 or adjacent thereto or while said work is in motion with the tools performing their operations while accounting for the work movement by relatively moving along the guide ways 221 and 22-2 with the work.

The work stations 76 may contain auxiliary means for manipulating the work with respect to the tool to present different portions of the work to the tool head or automatically controlled manipulators forming some of the tools 16 may be operative along the track ways 22-1 and 22-2 to seize and vary the attitude of the work or hold same during the operation of one or more tools located on the same or opposite track way to perform preprogrammed operations on the work.

If the conveyor 75 is controlled by a computer which also controls the operations of the various tools and the loading of units of work onto said conveyor, then the location of any particular unit of work on the conveyor will be a known factor during any interval in a work cycle and, accordingly, the proper distribution of command control messages to the different machine tools may be effected by properly timing the entire operation and operating the remote computer or message generator by sequentially reproducing, generating and transmitting the desired command control messages at predetermined time intervals to control the respective machine tools as described.

FIG. 7 illustrates a modified form of automatic production system 74 embodying, in addition to the features found in FIG. 6, the provision of a bridge crane assembly 78, which is supported for movement above and parallel to the conveyor 75 and contains one or more carriages, one of which is shown, at numeral 80, adapted with tooling and/or work handling means for performing operations on work carried by said conveyor 75. The crane apparatus 78 may be used to perform a number of functions including, in addition to supporting and positioning power-operated tooling such as power-operated drills, riveters, inspection devices, and other tooling below the carriage 80 thereof to locate said tooling above the work for operating on the top wall and upper portion of the work, such other functions as picking up the work and transferring it to a fixture or platform adjacent the conveyor 75 or to another conveyor, turning said work around or assembling it with other work, feeding parts or subassemblies to the work or holding and repositioning the work with respect to other tooling such as the track travelling tools 16-1 and 16-6 illustrated. The crane and tooling or handling manipulator of assembly 78 may be operated in an automatic mode under the control of the master controller or computer controlling operation of the other tooling and/or may be controlled by preprogrammed means located on the bridge crane when a detection means 81 located on the bridge 79 of the crane 78 or on the structure depending downwardly from the carriage 80 scans and detects work travelling along the conveyor 75.

In a particular form of the apparatus shown in FIG. 7, it is noted that one or more bridge cranes such as 78 for supporting tooling and/or manipulation means for performing on work along the production line and a plurality of the described track travelling tools 16 of the type described may all be operative to travel and be supported by the same bi-rail trackways denoted 22-3 and 22-4 in FIG. 7, and the cranes 78 may be so mounted as to permit said cranes to bypass the tools 16 to operate along any selected length of the production line.

FIG. 8 illustrates details of a portion of the overhead conveying apparatus of FIG. 7, including one of the trackways 22-3, production tool 16-6 suspended therefrom and bridge crane 78 movable therealong. The trackway 22-3 comprises an overhead supported I-beam 82, the lower flange 83 of which is adapted to support and guide the wheels 85 of the carriage 86 of the tool 16-6, which tool may embody the features shown in FIGS. 2, 2a and 2b or modifications thereof. Secured to the upper flange 84 of the I-beam is a rail 86 having a V-shaped channel in its upper surface. Riding in the V-shaped channel in 86 and guided thereby are the wheels 81 of the bridge crane 78. The rail 86 may also comprise an integral portion of the I-beam or may be replaced by a groove or V-shaped channel in the upper flange thereof. A similar rail or channel formation in the other trackway 22-4 may serve to support and guide the wheels supported by the other end of the bridge crane 78 so that a single pair of I-beams may define the trackways 22-3 and 22-4 and support both the monorail travelling tools 16 and one or more bi-rail devices 78 or bridge cranes defining the automatic production system or line 74'. It is noted that the bridge crane 78, if suspended as in FIG. 8, and if the carriage or tool assembly 80 suspended therefrom is centered on the cross-track 79 thereof, may travel past the tools 16 suspended on either or both trackways to transport or perform on work at any location along the line without colliding with any of the tools or machines provided adjacent the conveyor. Accordingly, the bridge crane 78 may serve to transport work or assemblies from machine to machine or to select machines for effecting operations thereon. In certain instances a plurality of cranes 78 may be used to supplement or replace the conveyor 75 and may travel the entire length of the line or transfer finished work from the line.

The apparatus hereinabove described is subject to a number of variations and improvements noted as follows:

I. One or more branch conveyors may extend from the main conveyor for the work for either temporarily holding or storing work-in-process until a machine tool or tools are available to perform preprogrammed operations thereon or for conveying work past a plurality of other machines disposed adjacent said branch conveyors. The branch conveyors may comprise flight conveyors similar to the main conveyor and onto which work is selectively shuttled by means of ram type transfer devices. Branch conveyors may also comprise overhead power or power and free conveying means or monorail travelling cranes operative to pick up and carry units of work from the main conveyor or from branch gravity chutes or platforms extending therefrom. The units of work may comprise work per se or work mounted on pallets or carriers. Command signals operative to effect transfer of work or pallets to said branch conveyors may be generated by a computer which keeps track of each pallet or work unit disposed on the main conveyor by receiving signals indicative of the main conveyor's speed and computing each pallet's location or by codes provided on each pallet at each branch conveyor location which are effective in operating selected of the transfer machines.

II. A single master controller or computer may be operative to control the shuttling of each work-holding pallet WP not only to each machine located adjacent the main conveyor but also the operation of each machine after it has controlled the movement of the pallet to the machine and its locking securement thereat.

III. A bridge crane 78 of the type described travelling the monorails 22-3 and 22-4 at the sides of the main conveyor 75 may contain, in addition to or in place of, one or more machine tool heads for working on work or work assemblies 80 disposed therebeneath either on the main conveyor or on a platform or branch conveyor adjacent thereto, may have a work seizing means such as manipulator jaws for picking up and manipulating work or components of work or may have work assembly means extending therefrom to permit said crane to pick up work and/or machines or machine components disposed therebeneath and transfer or preposition same with respect to the conveyor, machine tool or work disposed in the vicinity thereof. The operation of the bridge crane 78, its tool or tools and/or its manipulator depending therefrom may be controlled by signals generated in reading codes on a work-holding pallet which codes are formulated to predeterminately control said manipulator or tool or by signals generated by the described master controller or computer controlling either the entire production system, a particular tool or group of tools or the conveyor and crane or cranes disposed adjacent thereto.

IV. The described monorails disposed at both sides of the main conveyor 75 of FIGS. 6–8, may support, in addition to the described machine tools, one or more carriages mounting one or more article manipulators of the types defined in my U.S. Pat. Nos. 3,272,347 and 3,259,958 which are automatically controlled by computer and/or by signals generated in reading codes provided on work-holding fixtures or pallets to perform such operations as manipulating and handling the pallets, units of work held by the pallets, work components to assembly same with the work held by the pallets, inspection devices, machine tools and tool components such as cutters to be assembled to the tool or tool holder or worn or broken cutters to be removed therefrom. In the latter function, signals generated by the tool controller or master controller or computer may operate the manipulator to seize and release cutting tools or other devices either from the tool itself, a tool changer or a carrier therefor located on the conveyor 75 or a supply rack adjacent said conveyor.

V. Communication between a master controller or computer and the machine tools 16 provided adjacent the conveyor 75 as well as the described cranes and manipulators may be effected by radio or short wave, micro-wave communication means or by means of modulated light waves such as generated by lasers located at the computer and machine tools. Photoelectric detection receiving means may be disposed at each machine tool to receive modulated light beams such as pulsed beams modulated with commands which are transduced to pulse trains or frequency code signals and stored in relay storage at the tools for controlling the execution of programmed operations on the work disposed adjacent each tool. Two way communication by similar transmitting means at each tool to the master controller or computer may be effected to provide feedback information of the operation of the tools to the computer which may adaptively or otherwise adjust its output to control the tools accordingly.

Having thus set forth and disclosed the nature of this invention, what is claimed is:

1. An automatic production method comprising:
   (a) stationing a plurality of automatic machines at spaced apart locations along a production line, each of said machines including a respective controller structured to operate the machine to physically alter a unit of work;
   (b) preselecting one of a number of possible sequences of automatic machines to perform a preprogrammed sequence of production operations on each of a plurality of units of work requiring differing tool operations, wherein each of the sequences comprises a plurality of the machines and some of the units of work have a different one of the preselected sequences than the others;
   (c) automatically delivering each of said units of work in a single pass along said production line only to said stationed plurality of machines in the sequence preselected for each unit of work, whereby each unit of work passes each machine only once; and
   (d) automatically generating and applying a plurality of machine control commands to respective controllers of said preselected sequence of machines to controllably operate said selected machines to automatically perform said preprogrammed sequence of production operations altering each of said units of work.

2. The method of claim 1 wherein the acts in part (c) comprise conveying the unit of work along the production line and offloading the unit of work to each of the machines in the preselected sequence but not the other machines.

3. The method of claim 1 wherein delivering the unit of work comprises mounting the unit of work on a carrier having a controller and a local control command storage device including a set of commands defining the preselected sequence of machines for a unit of work carried by the carrier.

4. The method of claim 1 further comprising generating said machine control commands on an output of a central controller located remote from said plurality of automatic machines.

5. The method of claim 4 further comprising communicating selected of said generated machine control commands over a single transmission channel common to all of the controllers but directing the selected commands only to selected controllers.

6. The method of claim 5 wherein the machine control commands are delivered from the central controller to the machine controllers via cable.

7. The method of claim 4 further comprising first securing the unit of work to a pallet.

8. The method of claim 4 wherein delivering the unit of work comprises conveying the unit of work supported on top of a powered conveyor.

9. The method of claim 4 wherein delivering the unit of work comprises conveying the unit of work in a straight line.

10. The method of claim 4 wherein delivering the unit of work comprises conveying the unit of work along a path together with a plurality of other units of work being delivered to other machines.

11. The method of claim 4 wherein delivering the unit of work comprises conveying the unit of work in a single direction.

12. The method of claim 4 wherein the machine control commands are delivered from the central controller to the machine controllers via modulated light waves.

13. The method of claim 4 wherein delivering the unit of work comprises conveying the unit of work in a substantially horizontal path and in a single direction, together with a plurality of other units of work, on top of a substantially flat work surface of a conveyor that has two edges parallel to the path, past a plurality of the machines that are supported on separate bases and positioned adjacent to the side of the conveyor during said conveying.

14. The method of claim 13 wherein delivering the unit of work comprises using an endless belt conveyor to pass the unit of work between, and operating on the unit of work simultaneously with, commonly controlled machines stationed adjacent to both sides of the conveyor belt.

15. The method of claim 4:
   (a) further comprising controlling at least one of the machines to perform different operations on different units of work;
   (b) further comprising communicating selected of said generated machine control commands to selected controllers;
   (c) wherein controllably operating at least one of the machines comprises manipulating the unit of work and further comprises multi-axis driving of an operating end of the machine; and
   (d) wherein applying a plurality of machine control commands to at least one respective controller comprises using the machine controller to select and execute one of a plurality of control programs stored at the machine, each of which can control the machine to perform different combinations of operations to alter a workpiece within range of the machine.

16. The method of claim 4 wherein applying a plurality of machine control commands to at least one respective controller comprises using the machine controller to determine which one of a plurality of control programs stored at the machine in one of a plurality of addressable storage locations should be executed, each of which control programs can control the machine to perform one of a plurality of different combinations of manufacturing operations on a workpiece within range of the machine to alter the workpiece in a different manner than the manner a different combination of manufacturing operations alters a unit of work.

17. The method of claim 16 wherein delivering the unit of work comprises applying a code carried with the unit of work to have the controller determine whether to operate on the unit of work.

18. The method of claim 17 wherein delivering the unit of work comprises passing the unit of work between, and working on the unit of work simultaneously with, machines stationed adjacent to both sides of a conveyor belt.

19. The method of claim 16 wherein using the machine controller comprises using a command of the control program to select another control program from an addressable storage location at the machine and to execute the selected program.

20. The method of claim 16 wherein controllably operating at least one of the machines comprises welding the unit of work.

21. The method of claim 16 wherein controllably operating at least one of the machines comprises fastening objects to the unit of work.

22. The method of claim 16 further comprising controllably operating at least one of the machines by executing a control program stored at the central controller.

23. The method of claim 16 wherein controllably operating at least one of the machines comprises automatically inspecting the unit of work.

24. The method of claim 16 wherein controllably operating at least one of the machines comprises assembly operations on the unit of work.

25. The method of claim 16 wherein controllably operating at least one of the machines further comprises multi-axis driving of an operating head of the machine.

26. The method of claim 16 wherein determining one of a plurality of control programs comprises using a code carried with the workpiece to select the one program from the plurality of programs stored at the machine.

27. The method of claim 16 wherein the machine control commands are delivered from the central controller to the machine controllers via wireless communication.

28. The method of claim 16 wherein generating said machine control commands on an output of a central controller comprises reading tool control programs from a central storage device.

29. The method of claim 16 wherein applying a plurality of machine control commands to at least one respective controller comprises transmitting a signal from the central controller over a common transmission channel to choose one of the plurality of stored control programs, and applying the chosen control program to cause the controlled machine to perform different operations on different units of work.

30. A method of automatically operating on work comprising:
  (a) simultaneously supporting a plurality of different work units requiring differing tool operations with a non-recirculating conveyor system and conveying the work units past a plurality of programmably operated machines, each of which is stationed at a predetermined location along the conveyor, wherein each of the work units passes each of the machines only once;
  (b) detecting when a work unit is positioned at a predetermined location with respect to each of the machines in a selected subset of the machines and generating a control signal indicating said work unit positioning;
  (c) in response to said control signal, determining, at a first machine of the selected subset, which machine control command set of a plurality of different machine control command sets should be applied to the work unit, and selecting and generating that command set from a selected location of a local addressable storage device located at the first machine, which storage device contains the plurality of different machine control command sets, each of said command sets comprising instructions controlling the machine to perform programmable operations by said machine with respect to one of the work units while the work unit is positioned within range of the machine, and different of said machine control command sets causing the machine to physically alter work units in different ways, and using said generated commands to control said machine to cause said machine to automatically operate on and alter the work unit predeterminately located thereat; and
  (d) determining at the other machines of the selected subset which machine control command sets of a plurality of different sets should be applied to the work unit, and selecting and generating such further machine control commands from local addressable storage devices located at the other machines in the selected subset, and applying said generated further commands to cause the other machines in the selected subset to automatically execute respective programmed operations on said work unit.

31. A method in accordance with claim 30 including operating on the work units with said plurality of selected machines while supporting the work units on the conveyor adjacent to said machines.

32. A method in accordance with claim 30 including using a code carried with the work unit to select one of the control command sets from among those stored in the local addressable storage device of a plurality of the machines in the selected subset of machines to operate on the work unit.

33. A method in accordance with claim 30 wherein conveying includes mounting the work units on carriers, each carrier having a controller and associated command set defining the selected subset of machines at which the carried work unit will be positioned.

34. The method of claim 30 further comprising issuing machine control commands to control further machine operations from a single master controller located remote from the machines.

35. The method of claim 30 wherein the programmed operation of at least one of the machines includes multi-axis driving of an operating head of the machine.

36. A method of effecting automatic production operations on units of work comprising:
  (a) simultaneously supporting a plurality of units of work with a non-recirculating conveyor and conveying the plurality of units of work past a plurality of automatic machines, each of which automatic machines is stationed at a location along the conveyor and has a local controller structured to control automatic production operations by said machine on said units of work, said local controller having a storage device containing, in individually and selectively addressable locations, multiple sets of machine control commands, each set causing the machine to physically alter a unit of work in different ways;
  (b) as each of said units of work is conveyed to a selected one of said machines at which the unit of work is predetermined to stop, detecting the presence of the unit of work at the machine and generating a control signal;
  (c) in response to said control signal, applying a code carried with the unit of work to the local controller to cause the local controller to determine which set of machine control commands defines a production operation on the unit of work, and to select and read from a selected location in said storage device at least the set of machine control commands defining said production operation on the unit of work; and (d) applying said selected machine control command set to operate the local controller at the selected machine to cause the machine to execute the production operation on and alter the detected unit of work.

37. The method of claim 36 further comprising communicating a selected machine control command from a remote source over a common transmission channel to the local controllers of each of the machines, which command contains an address corresponding with a selected one of the machines, and recording the command in the storage device of only the selected machine with at least one set of machine control commands previously stored at the selected machine.

38. The method of claim 36 further comprising continuing to convey multiple units of work to selected machines at the same time.

39. The method of claim 36 further comprising using the code carried with the unit of work to determine whether to transfer the unit of work from the conveyor to the machine.

40. A method of effecting automatic manufacturing operations on work units comprising:

(a) supporting a plurality of work units with a conveyor, and simultaneously conveying the plurality of work units along an open path past a plurality of automatic machines, whereby each of the work units passes each of the machines only once, and wherein each of said automatic machines has a local programmable controller structured to control automatic manufacturing operations by the machine on the work units, said local programmable controller having a selectively addressable storage device structured to hold, in individually and selectively addressable locations, multiple sets of machine control commands that cause the machine to physically alter work units in different ways;

(b) as a first of the work units is conveyed to a respective one of said machines, continuing to convey a plurality of other work units to other machines, and when the first work unit arrives in the vicinity of the respective one of said machines, detecting the presence of the first work unit at the respective one of said machines and generating a control signal;

(c) in response to the control signal, determining whether the first work unit is predetermined to stop at the respective one of said machines, and if so, (1) offloading the first work unit from the conveyor to the respective one of said machines, and (2) causing the local programmable controller to determine which set of machine control commands define a manufacturing operation appropriate for the first work unit and to select that set of commands from a selected location in said storage device; and (d) reading the selected set of machine control commands from the storage device and applying the machine control commands of the set to operate said local controller at the respective one of said machines to cause the respective one of said machines to execute an automatic manufacturing operation physically altering the work unit stopped thereat.

41. The method of claim 40 further comprising communicating a selected set of machine control commands from a remote source over a common transmission channel to the local controllers of each of said machines, which set contains an address corresponding with a selected of said machines, and recording the communicated commands in the storage, device of only said selected machine.

42. The method of claim 41 wherein communicating from a remote source comprises transmitting the set of commands to a local controller that has a storage device in which has been prestored another set of machine control commands, and wherein recording comprises storing the communicated command set at a different storage location in the storage device than the prestored command set.

43. A method of automatically operating a plurality of machines, said method comprising:

(a) for each of a plurality of machines, storing a plurality of sets of electrical machine control commands at selectively addressable memory locations of a local storage device structured to store a plurality of sets of different machine control commands, each of the sets at a separate location;

(b) wherein the different sets of electrical machine control commands command each of the plurality of machines to effect different manufacturing operations that alter units of work differently;

(c) intermittently feeding coded units of work to a predetermined sequence consisting of a selected plurality of machines stationed at selected locations, which sequence forms a subset of the plurality of machines, and detecting when each work unit is present at each machine in the subset;

(d) for each of the machines in the subset, generating a control signal responsive to the code associated with the unit of work upon detecting the presence of a work unit;

(e) at each of the machines in the subset, applying said control signal to determine at the machine which of the manufacturing operations should be applied to a unit of work and to selectively address and reproduce a set of machine control commands corresponding to the determined manufacturing operations from a selected location in said local storage device; and (f) applying said selectively reproduced set of machine control commands to predeterminately control the machine to perform manufacturing operations on the unit of work.

44. A method of automatically operating a plurality of machines, said method comprising:

(a) providing a controller located remote from a plurality of machines, each of said mac including a local storage device structured to store a plurality of set of different machine control commands in separate, selectively addressable locations;

(b) composing different sets of electrical machine control commands to command each of the plurality of machines to effect different manufacturing operations altering different units of work and storing several of the sets in the local storage devices of each of the plurality of machines;

(c) simultaneously supporting a plurality of units of work with a conveyor and intermittently feeding different units of work to different predetermined sequences of selected machines by simultaneously conveying the units of work past all of the machines and offloading the different units of work only at the plurality of machines in the sequence selected for each of the different units of work;

(d) detecting when each unit of work is present at a machine in the sequence of machines selected for that unit of work and thereupon generating a control signal;

(e) for each of the machines selected for a unit of work, locally applying the control signal to determine a select one of the sets of machine control commands to be reproduced for application to the machine and selectively reproducing the select machine control command set from a selected location of the local storage device at the selected machine; and (f) for each of the machines selected for a unit of work, applying said selectively reproduced machine control command set and for at least some of the selected machines, also applying command signals from the remote controller, to predeterminately control the selected machines to cause them to alter the unit of work in a predetermined way.

45. A method of effecting the automatic manufacture of product components comprising:

(a) supporting and predeterminately positioning a plurality of different workpieces on respective work-holding pallets, thereby forming pallet-workpiece combinations, and simultaneously supporting the respective pallet-workpiece combinations with a conveyor;

(b) coding each of said pallet-workpiece combinations with information relating to a predetermined sequence of programmed operations to be performed on the workpiece of the combination;

(c) moving said plurality of pallet-workpiece combinations with the conveyor along a predetermined path in a single pass past a plurality of machines, each of said machines being stationed adjacent to the conveyor and having (1) a local storage device holding a plurality of individually and selectively addressable sets of machine control commands, each command set used to operate said machine to cause it to perform a different plurality of tooling operations, and (2) a local controller electrically coupled to said storage device and structured to execute the sets of machine control commands to cause the associated machine to perform preprogrammed tooling operations;

(d) determining when a selected pallet containing a workpiece requiring a first programmed operation to be performed thereon is conveyed to the vicinity of a first machine that is capable of perforating said first programmed operation and that is not in use;

(e) thereafter, with respect to the first machine: (1) reading the coded information on the selected pallet-workpiece combination and generating a control signal, (2) aligning the selected workpiece and the machine, (3) employing said control signal to cause the local controller to determine which of the machine control command sets should be applied to automatically control the machine to perform a programmed tooling operation on the work on the selected pallet, (4) addressing and reproducing the command set from the local storage device, (5) applying the machine control commands of the reproduced set to cause the machine to perform the preprogrammed tooling operations to physically alter the selected workpiece, and (6) after he machine completes operation on the workpiece on the selected pallet, resuming conveyance of said pallet along said predetermined path past others of said plurality of machines; and (f) determining when said pallet arrives in the vicinity of a second machine that is not in use and is capable of performing a second programmed operation to be performed on said work, and thereafter repeating the acts in parts (1) through (6) with respect to said pallet and said second machine.

46. The method of claim 45 further comprising using the coded information read from the pallets to control the programmed operation of the plurality of machines on the work conveyed thereto.

47. The method of claim 45 wherein the act of coding each of said pallets includes programming a controller resident on each pallet.

48. The method of claim 45 wherein the programmed operations performed on the work carried to the machines on the pallets include mining operations.

49. The method of claim 45 wherein supporting workpieces on pallets comprises supporting workpieces with self-propelled pallets, and wherein moving the plurality of pallets along said predetermined path comprises executing a set of commands defining pallet motion, which commands are stored in an addressable memory on the pallet.

50. The method of claim 45 further comprising locating said machines on both sides of said predetermined path along which said pallets travel, and conveying said pallets to the vicinity of selected machines on both sides of said path, wherein a plurality of commonly controlled machines operate simultaneously on the workpieces of at least some of said pallets.

51. The method of claim 45 further comprising causing a plurality of machines that are computer-controlled to simultaneously perform different programmed operations on workpieces conveyed to a location within range of the plurality of machines.

52. The method of claim 45 further comprising carrying out additional programmed operation of the machines under the control of a master controller located remote from said machines.

53. The method of claim 45 wherein the programed operations performed on the work carried to the machines on the pallets include drilling operations.

54. The method of claim 45 including using the coded information read from each specific pallet as it is conveyed to the vicinity of a respective machine to cause the local controller to determine and generate a plurality of selected sets of machine commands stored at said addressable storage device and to determine when the pallet has been conveyed to the vicinity of each of a sequence of machines that can perform the predetermined sequence of required programmed operations on the work presented thereat by the specific pallet.

55. The method of claim 54 further comprising retaining the work on and employing said pallets to support the work carried hereby while the machines perform programmed operations on the work.

56. The method of claim 54 further comprising holding each of the work-holding pallets at each of the sequence of machines that can perform the predetermined sequence of operations while others of the work-holding pallets are conveyed therepast and simultaneously conveyed to other machines along said path.

57. The method of claim 56 further comprising while the selected pallet is being conveyed to the vicinity of the first machine, simultaneously conveying a plurality of other work-holding pallets to other selected machines along the path defined by the conveyor.

58. The method of claim 57 further comprising conveying said pallets along said predetermined path with a powered conveyor, and wherein conveying the pallets to the vicinity of the machines includes transferring said pallets off said powered conveyor to the machines, which are selected to perform said programed operations on the work carded by the pallets, and, while the pallets are being transferred off of the conveyor, continuing to convey other pallets to other machines.

59. The method of claim 56 further comprising continuously conveying said pallets along said predetermined path on an endless-belt-type conveyor.

60. A method for performing automatic operations on a plurality of units of work, comprising:
   (a) supporting a plurality of units of work simultaneously with a conveyor, conveying the units of work along a predetermined path past a plurality of program controllable machines;
   (b) generating a plurality of addressed machine control commands on the output of a computer and communicating respective of said machine control commands to selected of the machines over a transmission channel common to all of the machines;
   (c) storing at individually addressable locations of memories located at each of the selected machines at least some of said communicated machine control commands, wherein the machine control commands at different addressable locations of each memory predeterminately control the operation of the associated machine to alter units of work at the machine in different ways;
   (d) with respect to a first of the selected machines:
      (1) determining when a select unit of work is aligned with the machine at a work station and thereupon determining at the machine which of the machine control commands should be applied to alter a select unit of work in a predetermined way;
      (2) reproducing the machine control commands stored at a selected one of the addressable locations of the memory of the machine; and
      (3) applying the reproduced commands to cause said machine to automatically perform a select manufacturing operation on the select unit of work; and
   (e) when the select operation on the select unit of work is completed, automatically conveying said unit of work to a second of said plurality of selected machines and repeating the acts of part (1) through (3) with respect to the second machine to cause said second machine to perform a further predetermined operation on said unit of work.

61. The method of claim 60 wherein part (a) comprises conveying a plurality of units of work along a predetermined path past a plurality of program controllable machines, at least one of which is a welding machine.

62. The method of claim 60 wherein part (a) comprises conveying a plurality of units of work along a predetermined path past a plurality of program controllable machines, at least one of which is an assembly machine.

63. The method of claim 60 wherein part (a) comprises conveying a plurality of units of work along a predetermined path past a plurality of program controllable machines, at least one of which is a machining tool.

64. The method of claim 60 further comprising, while the select unit of work is being conveyed to said selected first mache, conveying a plurality of other units of work along the predetermined path to respective predefined sequences of respective of a plurality of other program-controllable machines.

65. The method of claim 60 further comprising reproducing machine control commands to cause at least two of the program controllable machines to effect operations on the unit of work simultaneously.

66. The method of claim 60 wherein, for at least one of the selected machines, applying the reproduced commands comprises using one of the reproduced commands to select, from a different addressable storage location of the memory at the machine tool, another control program, and executing the machine control commands of the other control program.

67. The method of claim 60 further comprising issuing a plurality of additional machine control commands from a central computer coupled to said machines and applying the additional machine control commands to alter units of work positioned at the machines.

68. The method of claim 67 wherein automatically conveying the unit of work is carried out under the control of said central computer.

69. The method of claim 60 wherein communicating respective of said machine control commands to respective machines comprises communicating a message containing an address corresponding with one machine to each of said machines, but recording said message in the addressable memory of only said one machine.

70. The method of claim 69 wherein at least one of said machines comprises a mechanical manipulator, and wherein causing said manipulator to perform a select manufacturing operation on the select unit of work comprises performing an assembly operation with respect to said select unit of work.

71. The method of claim 60 further comprising applying a code cared with the select unit of work to determine at the first and the second machines which machine control command to reproduce from memory located at the respective machines.

72. The method of claim 60 wherein part (a) comprises conveying a plurality of units of work along a predetermined path past a plurality of program controllable machines, and using a code carried with each of the units of work to select the first and second machines.

73. A method for automatically operating on units of work with a plurality of power-operated machines, comprising:
   (a) placing one workpiece on each of a plurality of pallets;
   (b) moving each of said pallets so that they travel along a path past a series of stations, each station having a separate numerically controlled production machine thereat, wherein each of the pallets passes from each of the stations of the series to the next station of the series in turn;
   (c) using a code carried with a first one of said pallets to determine when the pallet is located adjacent to one of a plurality of machines in a predetermined sequence consisting of less than all of said series of machines, and thereupon:
      (1) predeterminately positioning, with respect to the one machine of the predetermined sequence, the workpiece on the first pallet;
      (2) thereafter controlling the operation of the machine with machine control commands to cause the machine to automatically perform at least one programmed operation on the predeterminately positioned workpiece;
      (3) after said programmed operation Is completed, moving the first pallet to carry the workpiece supported thereby to the next machine of the series that is in the predetermined sequence; and
      (4) repeating (1), (2), and (3) with respect to the first pallet for each machine of the predetermined sequence but not other machines that are not in the predetermined sequence;
   (d) wherein the first pallet is operated on by a different sequence of machines than a second one of the pallets; and (e) wherein the first and second pallets are moved concurrently between one of the machines in their respective predetermined sequences and the next machine in their respective predetermined sequences.

74. The method of claim 73 further comprising conveying the first pallet to each machine of the predetermined sequence while continuing to convey simultaneously a plurality of other of the pallets along the path to other of the machines.

75. The method of claim 73 wherein moving the pallets along the path comprises selecting one of a plurality of sets of pallet-control messages stored in an addressable storage device of a self-propelled pallet and applying the selected message to propel the pallet to the predetermined sequence of machines appropriate for the workpiece mounted thereon.

76. A method for automatically operating on units of work with a plurality of power-operated machines, comprising:
   (a) placing one workpiece on each of a plurality of pallets;
   (b) moving said pallets so that they travel along an open path at the same time along which path is disposed a plurality of separate numerically controlled production machines, each pallet of a plurality of the pallets simultaneously travelling the path to respective of the machines;
   (c) generating a plurality of machine control commands;
   (d) communicating selected of said machine control commands to respective of said machines;
   (e) sensing when one of said pallets is located adjacent to the first one of the machines of a selected and predetermined sequence consisting of a plurality, but not all, of the machines along the path, and (1) predeterminately positioning, with respect to the selected machine, the workpiece on the pallet; (2) while the workpiece is so positioned, controlling the operation of the selected machine with the machine control commands communicated to the machine to cause the machine to automatically perform at least one programmed operation on the predeterminately positioned workpiece; and (3) after said programmed operation is completed, moving the pallet to carry the workpiece supported thereby further along the path to the next one of said machines in the predetermined sequence; and
   (f) sensing when the pallet is located adjacent to each of the machines in the predetermined sequence and repeating (1), (2), and (3) with respect to each of those machines.

77. The method of claim 76 wherein the machines are at stationary locations along the path while the acts of part (2) are performed.

78. A method of automatically operating on a plurality of different workpieces requiring different types of operations by a plurality of programmed machines, comprising:
   (a) placing a plurality of different workpieces so that they are simultaneously supported on a conveyor and concurrently conveying the plurality of workpieces along a predetermined route to a plurality of work stations at which are stationed a plurality of program-controllable machines,
      (1) wherein each workpiece passes each of the work stations only once,
      (2) wherein at least some of the plurality of machines perform different preselected manufacturing operations on different workpieces, and
      (3) wherein each of the machines that operates differently on different workpieces includes a storage device holding, in individually and selectively addressable locations, a plurality of different machine-control programs, each of which programs can control the machine to physically alter the workpiece in a preselected way;
   (b) detecting each workpiece as it Is conveyed along said predetermined route near each of the machines and identifying and using a code carried with each workpiece to permit each workpiece to be chosen for a preselected operation at a plurality of machines in a sequence of machines selected for that workpiece, wherein the selected sequences of machines are different for different workpieces;
   (c) operatively aligning each workpiece at work stations with each of the machines selected for that workpiece but not at the machines that are not in the sequence selected for that workpiece;
   (d) when a workpiece is aligned with one of the machines that includes a storage device, having the machine use the code carried with the workpiece to determine which machine-control program would cause the machine to perform a preselected manufacturing operation on the workpiece and addressing said storage device of the machine and selectively reproducing the program determined to cause the machine to perform the preselected operation from a selected location of said storage device; and
   (e) applying said reproduced program to control the machine to perform the preselected manufacturing operation to physically alter the workpiece in the preselected way.

79. The method of claim 78 further comprising communicating a program from a central location to each of said machines, which program is communicated on a common transmission channel together with an address corresponding with a predetermined subset of machines, and storing the program in the storage device of only the predetermined subset of machines.

80. The method of claim 79 further comprising selectively transmitting machine-control commands from the central location to directly control at least some of the machines to perform manufacturing operations on workpieces positioned thereat.

81. The method of claim 79 further comprising storing the communicated program in a storage device in which a plurality of other machine-control programs have been prestored.

82. A method of automatically operating on a plurality of workpieces requiring different forms of operations by a plurality of programmed machines, comprising:
   (a) simultaneously supporting a plurality of workpieces with a conveyor and concurrently conveying the supported workpieces along a predetermined route past a plurality of work stations at which program-controllable machines are stationed,
      (1) wherein each workpiece passes each of the work stations only once,
      (2) wherein at least some of the workpieces require preselected operations by a preselected sequence consisting of more than one and less than all of said plurality of machines, wherein the preselected sequences of machines are different for different workpieces, and
      (3) wherein a plurality of the workpieces are simultaneously conveyed along the route to respective of the machines in respective different preselected sequences;

(b) storing in a storage device of each of a plurality of programmable controllers, in individually and selectively addressable locations, a plurality of different programs, each of the programs defining different selected manufacturing operations by the machine on different workpieces, wherein the controllers are distributed along the route;

(c) detecting and identifying a code carried with each of the workpieces that require preselected operations by a preselected sequence of machines as each is conveyed to said preselected sequence of machines and using the code to permit each of the code-carrying workpieces to be chosen for a preselected operation at each of said machines in the preselected sequence for that workpiece;

(d) detaining at a work station and operatively aligning each of the code-carrying workpieces at the machines in the preselected sequence and not at the machines not in the preselected sequence; and (e) at each of the machines in the preselected sequence for each of the code-carrying workpieces, locally determining which of the stored programs define preselected manufacturing operations on the workpiece, addressing the storage device of one of the distributed controllers, and selectively reproducing a program from selected locations of the storage device and applying the program to control the preselected manufacturing operation to alter the workpiece.

83. The method of claim 82 further comprising communicating a program from a central location to each of said machines, which program is communicated on a common transmission machine together with an address corresponding with a predetermined subset of machines, and storing said program in the storage device of only the predetermined subset of machines.

84. The method of claim 83 wherein communicating comprises wireless transmission of said program.

85. The method of claim 83 further comprising communicating additional machine-control commands from a central controller located at the central location to at least one of the machines at which the chosen workpiece is aligned, and applying the communicated commands to control additional manufacturing operations on the chosen workpiece by the machine while the workpiece is aligned thereat.

86. An automatic production method comprising:

(a) conveying a plurality of units of work along a path with a plurality of self-propelled conveyors, each containing a selectively addressable storage having a plurality of command sets, wherein each of the command sets has a plurality of control commands that, when applied to the conveyor, cause the conveyor to transport a supported unit of work to a different location;

(b) disposing a plurality of variably operable powered machines at different locations adjacent to said path, wherein, during said conveying act, each machine remains in a stationary location along the path;

(c) causing the self-propelled conveyor to read a code carried with one of the units of work and applying the code to select one of the stored command sets, and applying the control commands of the selected command set to cause the self-propelled conveyor to deliver the unit of work to a selected subset consisting of a plurality of the machines;

(d) generating machine control messages containing machine control commands usable in controlling the operation of said machines and applying the machine control commands to control the operation of the selected machine when the unit of work carried by said conveyor is operatively aligned with the selected machine; and (e) performing programmed operations on the delivered unit of work in accordance with the machine control commands of the machine control messages applied to the machine.

87. The method of claim 86 wherein part (d) comprises using the code carried with the work unit to select one of a plurality of machine control messages stored in a selectively addressable storage unit at the machine and causing the machine to execute the machine control commands of the selected machine control message.

88. An automatic production method comprising:

(a) simultaneously supplying a plurality of units of work with a conveyor and concurrently conveying the plurality of units of work in a single direction along a non-recirculating path past a plurality of separately operable and selectively addressable powered machines disposed at different locations adjacent to said path, wherein one unit of work is conveyed to one machine stationed at a location along the path while another unit of work is conveyed to another of the machines stationed at a different location along the path;

(b) generating selectively addressable machine control messages containing machine control commands usable in controlling the operation of respective of said selectively addressable machines;

(c) transmitting said machine-controlling messages over a communication channel common to the plurality of machines;

(d) using a specific message address corresponding to selected machines to receive, at each of said selected machines, only correspondingly addressed of said messages;

(e) detecting the presence of at least one of the plurality of conveyed units of work when said unit of work is operatively aligned with a selected subset consisting of less than all of said machines; and (f) applying the selectively addressed and received messages to control the operation of the selected subset of machines to cause a predetermined sequence of machines to perform programmed manufacturing operations physically altering the conveyed unit of work in accordance with information defined by the commands in the selectively addressed messages received at said machine.

89. The method of claim 88 wherein part (e) comprises using a code carried with the unit of work to cause the machine to determine which machine control commands to apply to the unit of work and to reproduce, from a selected address of an addressable storage unit, one of a plurality of the received messages, and further causing the machine to execute the machine control commands of the selected message.

90. An automatic production method comprising:

(a) conveying a plurality of units of work supported together by a conveyor along a non-recirculating conveying path past a plurality of separately operable and selectively addressable powered machines disposed at different locations adjacent to said path, (1) wherein each of the units of work passes each of said machines only once, and (2) wherein, at various times during the conveying operation, a plurality of the units of work are conveyed at the same time, each moving along the conveying path to different machines;

(b) forming selectively addressable machine control messages containing machine control commands usable in controlling respective of said machines to perform a pattern of physical alterations of a unit of work aligned thereat;

(c) transmitting said messages to selected of said machines using selected machine addresses, wherein a unique address corresponds to each of said machines, and, storing only at correspondingly addressed of said machines, the messages addressed to that machine in one of a plurality of separately addressable storage locations at the machine; and (d) detecting the presence of a unit of work on the conveyor when the unit of work is proximate to a selected plurality of said machines and, when the unit of work is proximate to each of the selected machines but not when the unit of work is proximate to others of the machines:

(1) ceasing conveying of the unit of work and transferring the unit of work off of the conveyor and into operative alignment with the selected machine, and (2) determining at the machine one of the selectively addressed and received messages to control the operation of the selected machine at which said unit of work is aligned, (3) retrieving at the machine the message determined to control the operation from its separately addressable storage location, and (4) applying the machine control commands of the retrieved message to cause the machine to perform at least one programmed manufacturing operation on the aligned unit of work to physically alter the unit of work in accordance with the pattern defined by the selectively addressed and addressably retrieved machine control message.

91. The method of claim 90 wherein multiple of the machines operate simultaneously on a unit of work while it is located at a stationary location adjacent to the path.

92. An automatic production method comprising:

(a) power-conveying a plurality of units of work so that they are travelling at the same time along an open path;

(b) disposing a plurality of separately operable powered machines at different stations located adjacent to said path;

(c) generating at a central location selectively addressable machine control commands arranged in separate machine-control messages;

(d) transmitting the messages from said central location over a transmission channel common to each of said machines, and employing a specific address on said messages to specifically address selected of said machines;

(e) at each of the selected machines, selectively storing said specifically addressed messages in a plurality of addressable data storage locations from which data can be selectively retrieved, other of which data storage locations have prestored messages, different of the stored messages controlling the operation of said selected machines to cause them to alter units of work aligned thereat in different ways; and (f) detecting the presence of a conveyed unit of work when the unit is operatively aligned with one of the selected machines and thereupon determining at the machine which one of the messages stored at said machine should be applied to control the machine, selecting the determined message from its addressable data storage location, and applying machine control commands from the selected message to cause the machine to perform a predetermined operation on the unit of work aligned thereat in accordance with the control operation defined by said machine control commands.

93. The method of claim 92 including using part of the selectively stored messages to control the operation of a power-operated device supported by a manipulation assembly at one of said machines.

94. The method of claim 92 further comprising generating at said central location conveyor-control commands, transmitting said conveyor-control commands from said central location and applying said conveyor-control commands to control the power-conveying of said units of work, in coordination with the machine-control commands.

95. The method of claim 92 wherein power-conveying the units of work includes conveying one unit of work to one of the machines while simultaneously conveying others of the units of work to other machines.

96. The method of claim 95 wherein the acts in part (f) comprise conveying the unit of work along the open path and offloading the unit of work to a station adjacent to the open path for operation thereon by each of the selected machines but not the other machines.

97. The method of claim 92 further comprising first securing each of the units of work to a pallet.

98. The method of claim 92 wherein power-conveying the units of work comprises supporting the units of work on top of an endless-belt conveyor.

99. The method of claim 92 wherein power-conveying the units of work comprises supporting the units of work with a plurality of self-propelled carriers, each of the carriers supporting an addressable command storage containing a plurality of sets of motion commands, and selecting and executing one of the sets of messages to control the motion of the carrier.

100. The method of claim 92 wherein power-conveying the units of work comprises passing the units of work between machines stationed adjacent to both sides of a conveyor belt and operating on at least some of the units of work with two of the machines simultaneously and under common control.

101. The method of claim 92 wherein power-conveying the units of work comprises conveying the kits of work in a straight substantially horizontal path.

102. The method of claim 92 wherein power-conveying the units of work comprises conveying the units of work to a position adjacent to two of the machines and simultaneously performing the acts of part (f) with both of the machines.

103. The method of claim 92 wherein power-conveying the units of work comprises conveying the unit of work in a single direction.

104. The method of claim 92 wherein performing a predetermined operation with at least one of the machines comprises cutting the units of work.

105. The method of claim 92 wherein performing a predetermined operation with at least one of the machines comprises welding the units of work.

106. The method of claim 92 wherein performing a predetermined operation with at least One of the machines comprises assembly operations on the units of work.

107. The method of claim 92 wherein performing a predetermined operation with at least one of the machines comprises drilling and riveting the units of work.

108. The method of claim 92 wherein performing a predetermined operation with at least one of the machines further comprises automatically inspecting the units of work.

109. The method of claim 92 wherein performing a predetermined operation with at least one of the machines further comprises manipulating the units of work.

110. The method of claim 92 further comprising selectively controlling the operation of at least some of the machines with a central controller located at the central location.

111. The method of claim 92 wherein the act of power-conveying comprises conveying each of the units of work in a single pass to a predefined sequence consisting of more than one and less an all of the machines.

112. The method of claim 92 further comprising causing the machine to perform an additional operation on the unit of work aligned thereat in accordance with the control operation defined by machine control commands of a message selected from the central location from among a plurality of control messages used to control the machine to perform a combination of operations on a unit of work within range of the machine.

113. The method of claim 92 wherein determining which message should be applied comprises using a code carried with the units of work to determine and select one of the stored messages.

114. The method of claim 92 further comprising using a code carried with the unit of work to determine which of the machines will operate the unit of work.

115. The method of claim 92 wherein transmitting the messages from said central location comprises sending the messages via modulated light waves.

116. The method of claim 92 wherein applying machine control commands from the selected message comprises using one of the machine control commands to select from an addressable data storage location at the machine tool and apply to the machine the machine control commands of another message.

117. The method of claim 92 wherein power-conveying the units of work comprises conveying a plurality of the units of work together in a substantially horizontal path on top of a substantially flat work surface of an endless belt that has two edges parallel to the path, past a plurality of the machines which are supported on bases stationed adjacent to the side of the endless belt.

118. The method of claim 117 wherein power-conveying the units of work comprises passing the units of work between, and operating on selected units of work simultaneously with, commonly controlled machines stationed adjacent to both sides of the endless belt.

119. The method of claim 92:
(a) wherein power-conveying the units of work comprises conveying each of the units of work in a single pass to one of a plurality of predefined sequences consisting of more than one and less than all of the machines, and offloading the units of work only to work stations adjacent to the machines of the predefined sequence, and, while a first of the units of work is being conveyed to a work station at which is stationed one of the machines in the sequence that is predefined for the first unit of work, simultaneously conveying a second of the units of work to a work station at which is stationed one of the machines in a different sequence that is predefined for the second unit of work;
(b) wherein performing a predetermined operation with at least one of the machines further comprises manipulating the units of work and multi-axis driving of an operating end of the machine;
(c) further comprising causing the machine to perform an additional operation on the unit of work aligned thereat in accordance with the control operation defined by machine control commands of a message selected from the central location from among the plurality of control messages stored at different data storage locations of a memory, each of which programs can control the machine to perform a combination of operations on a unit of work within range of the machine; and
(d) further comprising detecting the presence of a conveyed unit of work when said unit of work is operatively aligned with each of the machines, reading a code carried with the unit of work, using the code to determine whether the machine is one of the machines of the sequence predefined for that unit of work, and performing the acts of part (f) with those machines.

120. An automatic production method comprising:
(a) power-conveying a plurality of units of work in a single pass along a conveying path,
   (1) wherein each of the units of work passes each of a plurality of separately operable powered machines disposed at different locations adjacent to said path only once,
   (2) wherein a plurality of the units of work are concurrently conveyed to different selected machines, and
   (3) wherein at least some of the units of work stop at a plurality of the machines and bypass others of the machines;
(b) generating at a central location selectively addressable machine control commands arranged in separate control messages;
(c) transmitting from said central location over a single transmission channel and receiving and storing at selected of said machines said messages, employing a specific address on each of said messages to select the machines at which the message will be received and stored;
(d) selectively storing said specifically addressed messages at one of a plurality of addressable data storage locations located at each of the selected machines and from which the data can be selectively retrieved, along with other messages at each selected machine, which messages are useable to control the operation of said selected machines to physically alter a unit of work aligned thereat; and
(e) detecting the presence of a conveyed unit of work that is operatively aligned with one of the machines at which the unit of work is to stop and thereupon;
   (1) ceasing conveying of the aligned unit of work and transferring the aligned unit of work off of said conveying path,
   (2) determining at the machine which of the control messages stored at said machine should be applied to cause the machine to perform a predetermined manufacturing operation on the unit of work aligned thereat, and
   (3) addressing, selectively retrieving from storage locations, and applying the control message determined to apply, to cause the machine to physically alter the unit of work in accordance with the operation defined by the machine control commands of said control message.

121. The method of claim 120 including using part of the selectively stored messages to control the operation of a power-operated device supported by a manipulation assembly at one of said machines.

122. The method of claim 120 further comprising generating at said central location conveyor-control commands, transmitting said conveyor-control commands from said central location and applying said conveyor-control commands to control the power-conveying of said units of work, in coordination with the machine-control commands.

123. The method of claim 120 further comprising applying machine control commands from the messages received at said machine to cause the machine to perform different predetermined operations on the aligned work for each of a plurality of different types of units of work.

124. The method of claim 120 further comprising commonly controlling multiple of the machines to operate simultaneously on a unit of work while it is located at a stationary location adjacent to the path.

125. An automatic production method comprising:
   (a) placing a plurality of different units of work together on a conveyor and power-conveying the units of work in a single direction along an open path including a plurality of individually addressable and separately operable powered machines stationed at different locations adjacent to said path;
   (b) generating selectively addressed machine control commands arranged in different messages for communication over a single transmission channel to correspondingly addressed machines for use in controlling the operation of said machines;
   (c) using an individual address identifying at least one of said machines for communicating said selectively addressed messages to at least a plurality of said machines but recording the communicated messages at selected of a plurality of addressable data storage locations associated only with said addressed machines, said storage locations containing different recorded messages controlling the associated machine to perform different operations, different of the operations causing aligned units of work to be manufactured differently;
   (d) detecting the presence of conveyed work when said work is adjacent to a respective machine and there upon reading a code carried with the conveyed work units; and
   (e) using the code to determine whether to operate on the conveyed work units with the adjacent machine, and if an operation is to be done, (1) operatively aligning the unit of work with respect to the machine, (2) using the code at the machine to determine which of the messages should be applied, (3) reproducing the determined message from the plurality of data storage locations, and (4) applying the machine control commands reproduced from the selected recorded message to cause the machine to perform a predetermined operation on the unit of work at the machine in accordance with the manufacturing operation defined by said selectively addressed machine control commands.

126. The method of claim 125 wherein performing a predetermined operation on said unit of work comprises moving a powered element supported by the stationed powered machine.

127. An automatic production method comprising:
   (a) simultaneously supporting a plurality of units of work with a conveyor and simultaneously power-conveying the units of work along a conveying path to selected of a plurality of individually addressable and separately operable powered machines disposed at different locations adjacent to said path;
   (b) generating and selectively addressing machine control commands arranged in separate messages to correspondingly addressed machines for use in controlling the operation of said machines;
   (c) selectively communicating said generated and addressed messages over a common communications channel to correspondingly addressed of said machines;
   (d) receiving and recording the messages at a plurality of addressable data storage locations located at each of said addressed machines, wherein, for each of the machines, each of said plurality of data storage locations has recorded thereat a different message, each message causing the associated machine to alter a unit of work in a different fashion; and
   (e) detecting the presence of specific units of conveyed work when said units of work are operatively aligned with a respective machine and (1) ceasing conveying the specific units of work and transferring the specific units of work off of said conveying path and continuing to convey other units of work to other machines, and (2) applying machine control commands reproduced from one of the plurality of recorded messages that is determined at the machine to be applicable to the specific units of work aligned thereat to cause the machine to perform a predetermined operation on the specific units of work at the machine in accordance with the machine operation defined by said selectively addressed machine control commands.

128. The method of claim 127 wherein multiple of the machines operate simultaneously on a unit of work while it is located at a stationary location adjacent to the path.

129. An automatic production method comprising:
   (a) providing a plurality of automatic machines spaced apart along a production line, each of said machines including a respective tool controller;
   (b) preselecting one of a number of possible sequences of machines to perform a preprogrammed sequence of operations on a selected unit of work;
   (c) automatically delivering said unit of work in a single pass along said production line only to said preselected sequence of said plurality of machines; and
   (d) automatically generating and applying a plurality of command control message signals to said respective tool controllers of said preselected sequence of machines to controllably operate said selected tools to automatically perform said preprogrammed sequence of production operations on said unit of work.

130. The method of claim 129 further comprising generating said command control message signals on an output of a master controller located remote from said plurality of automatic machines.

131. The method of claim 129 further comprising generating said command control message signals on an output of a master controller located remote from said plurality of automatic machines, and communicating selected of said generated command control signals to selected tool controllers.

132. A method of automatically performing a plurality of different operations on a plurality of different workpieces by a plurality of machines located at respective machine work stations, said method comprising:
   (a) conveying each of the different workpieces under the control of a programmable controller along a predetermined route to only selected machine work stations corresponding to a preselected sequence of machines; and (b) selectively transferring each of said respective workpieces under the control of a programmable controller to only said machine work stations in said respective preselected sequence, and automatically controlling the machines at each of said preselected work stations to perform different respective combinations of machine operations on each of said respective workpieces.

133. The method of claim 132 wherein the act of conveying workpieces under the control of a programmable controller includes generating machine control messages on an output of a master controller located remote from said machine work stations.

134. The method of claim 133 further comprising generating command control signals on the output of said master controller to control the transfer of said respective workpieces to said preselected machines and to control the machines to carry out the machine operations on said transferred workpiece.

135. The method of claim 132 wherein the programmable controller variably addresses selected of said machines by generating and communicating to said selected machines control messages segmented into different addressed message units, at least some of which message units are stored on selectively addressable storage devices located at said machines.

136. The method of claim 135 wherein the act of selectively applying said addressable command control signals includes communicating selected of said signals to selected of said machines and storing said communicated signals in the addressable storage device at said selected machine.

137. A method for producing articles of manufacture from a plurality of different workpieces, said method comprising;

(a) providing a plurality of program-controlled machines along a production line, each machine being capable of performing different machine operations;

(b) supporting a plurality of different workpieces on a conveyor so that each workpiece is selectively accessible to said plurality of machines as said conveyor operates;

(c) operating said conveyor to sequentially convey said workpieces along the production line to said machines, and selectively transferring each of said workpieces between said conveyor and workstations associated with a preselected set of said machines to effect a predetermined sequence of machine operations on each workpiece; and (d) for each workpiece, automatically generating and selectively applying addressable control signals to automatically control (i) the preselected set of machines that operates on each of said workpieces, and (ii) the particular machine operations performed by each of the machines to which each workpiece is conveyed.

138. A method for operating on a plurality of different workpieces requiring different forms of operations comprising:

(a) providing a plurality of program-controlled machines positioned at locations along a conveyor, each of said machines being capable of performing different machine operations on workpieces positioned thereat;

(b) conveying each workpiece under the control of a programmable controller along a predetermined route defined by said conveyor, said route for each workpiece including stops only at the locations of selected of said plurality of machines; and (c) for each workpiece, selecting a sequence of machines at which to stop so that different workpieces travel different predetermined routes and have different combinations of machine sequences performed thereon.

139. A method for producing articles of manufacture from a plurality of different workpieces with an automatic production system comprising a plurality of machines capable of performing different machine operations, said machines being positioned along a conveyor that supports a plurality of pallets for holding workpieces so that each workpiece is selectively accessible to said plurality of machines, a transfer device structured and located to selectively move said workpieces from the conveyor to workstations associated with said machines, and a programmable controller coupled to control each of said machines and said transfer device, said method comprising:

(a) mounting each workpiece on a pallet adapted for supporting and operatively locating the workpiece at each of said machines required for operating on said workpiece;

(b) predeterminately locating each pallet-mounted workpiece on the conveyor of said machine system for the commencement of its machine sequence;

(c) automatically conveying the pallet-mounted workpieces along a predetermined route by said conveyor and automatically transferring each pallet-mounted workpiece between said conveyor and selected of said machines;

(d) controlling said selected machines to perform selected machining operations on said workpieces transferred from said conveyor; and (e) generating and communicating variably addressed machine control messages that are selectively received at selected machines, to predeterminately control the sequence of the conveying and transferring acts for each workpiece and the respective machine operations performed on each workpiece, so that the sequence of machine operations on at least one workpiece is different from the sequence of machine operations of other workpieces.

140. A method of automatically operating on work comprising:

(a) conveying a plurality of units of work on a conveyor past a plurality of automatically operated machines;

(b) detecting when a respective work unit is positioned at a predetermined location with respect to at least a selected one of said machines and generating a first control signal indicating said work unit positioning;

(c) in response to said first control signal, generating at least one machine control command from a local addressable storage device associated with said selected machine and using said generated command to control said selected machine to cause said machine to automatically execute a predetermined operation on the work predeterminately located thereat; and (d) generating a plurality of further machine control commands and applying said generated further commands to selected others of said machines to cause said selected other machines to automatically execute respective programmed operations on said plurality of units of work.

141. The method of claim 140 including operating on the work with said plurality of selected machines while supporting the work on the conveyor adjacent to said machines.

142. The method of claim 140 including stopping the conveyor in response to said first control signal.

143. The method of claim 140 including applying at least one machine control command to operate at least one transfer device positioned adjacent to said predetermined location to transfer said respective unit of work to said selected tool.

144. The method of claim 140 further comprising generating each of the machine control commands on the output of a single master controller located remote from the machines.

145. A method of effecting automatic production operations on units of work comprising:
   (a) conveying a plurality of units of work along a path past a plurality of automatic machines, each of said automatic machines having a local controller structured to control automatic production operations by said machines on said units of work, said local controller having a selectively addressable storage device structured to record multiple machine control commands communicated from a remote source;
   (b) as each of said units of work is conveyed past a respective one of said machines, detecting the presence of and identifying said work unit at the machine and generating a control signal;
   (c) in response to said control signal, selectively addressing from said storage device at least one selected machine control command and applying the message to control a production operation on said identified work unit; and
   (d) applying said selected machine control command to operate said local controller at said respective machine to cause the machine to execute an automatic production operation on the detected unit of work.

146. The method of claim 145 further comprising communicating a selected machine control message from the remote source to the local controllers of each of said machines, which message contains an address corresponding with a selected of said machines, and recording said message in the storage device of only said selected machine.

147. The method of claim 146 wherein communicating comprises wireless transmission of said machine control message.

148. A method of automatically operating a plurality of machines, said method comprising:
   (a) storing a plurality of electrical command control messages in a selectively addressable memory of a controller located remote from said plurality of machines, each of said machines including a local addressable storage device for storing selected of said command control messages;
   (b) composing the electrical command control messages to effect specific command functions with respect to selected of said machines;
   (c) intermittently feeding different units of work to selected machines and detecting when each work unit is present at each select machine;
   (d) generating a control signal upon detecting the presence of a work unit at each said selected machine;
   (e) applying said control signal to selectively reproduce said select command control messages from said memory of said remote controller and storing said reproduced command control messages at said local storage device of said selected machine; and
   (f) applying said selectively reproduced and locally stored command control message to predeterminately control the machine at which the unit of work is located.

149. A method of automatically operating on work with a plurality of variably operable automatic machines, said method comprising:
   (a) conveying a plurality of units of work on a conveyor in series past a plurality of automatically operable, program-controllable machines;
   (b) providing said automatically operable, program-controllable machines to perform different predetermined operations on different units of work;
   (c) determining when a select unit of work is conveyed into alignment with a first machine that is not operating on another work unit and that is capable of performing a required automatic operation on said work, and thereafter generating a first control signal;
   (d) employing said first control signal to effect the transfer of said select work unit from said conveyor to an operative location at said first machine;
   (e) generating a second control signal when said select work unit is operatively located at said first machine and applying said second control signal to secure said work in an operative location at said first machine;
   (f) after said work is secured at said operative location at said first machine, remotely controlling the operation of said first machine to cause it to perform programmed operations on the work secured thereat;
   (g) when said programmed operations at said first machine have been completed, automatically controlling the release of said work from said operative location, and automatically controlling the transfer of said work from said first machine to said conveyor;
   (h) controlling said conveyor to selectively convey said work to a second automatic machine further along the series that is not operating on another unit of work and that is capable of performing a required operation an said work; and
   (i) when said work is aligned with said second machine, repeating acts (c) through (h) to automatically (i) transfer said unit of work into operative relation with respect to said second machine, (ii) operatively secure said work at said second machine, (iii) cause said second machine to perform a programmed operation on said work, (iv) release said work from said second machine, and (v) transfer said work back to said first conveyor to permit the work to be conveyed by said conveyor further along the series for further automatic operations by other of the machines.

150. A method in accordance with claim 149 including:
   (a) disposing said plurality of units of work on respective work-holding fixtures;
   (b) carrying said work-holding fixtures and the work held thereby on said conveyor;
   (c) transferring said fixtures and work to selected of said machines; and
   (d) performing programmed operations on said work units while held by said fixtures at said machines.

151. The method of claim 150 including:
   (a) securely fixing said work vats to respective of said fixtures; and
   (b) engaging and securely holding said fixtures at the selected machines so as to predeterminately and securely locate the work relative to said machines.

152. A method of effecting the automatic manufacture of product components comprising:
   (a) supporting and predeterminately positioning a plurality of different workpieces on respective work-holding pallets;

(b) coding each of said pallet: with information relating to the work supported thereon;

(c) moving said plurality of pallets on a conveyor along a predetermined path past a plurality of machines, each of said machines having (1) an addressable storage device holding a plurality of machine control signals used to operate said machine to perform a plurality of tooling operations, and (2) tooling electrically coupled to said storage device and structured to be controllable by said machine control signals to perform a plurality of preprogrammed operations an work aligned at the machine;

(d) determining when a selected pallet containing a workpiece requiring a first programmed operation to be performed thereon is conveyed to the vicinity of a first machine that is capable of performing said first programmed operation and that is not in use;

(e) thereafter: (1) reading the coded information on the selected pallet and generating a control signal, and (2) employing said control signal to align the selected pallet and the first machine and to reproduce selected of said command control signals from said addressable storage device to automatically control the first machine to perform a first programmed operation on the work on the selected pallet;

(f) after the first programmed operation is completed, generating a further control signal and employing said further control signal to resume conveyance of said pallet along said predetermined path past others of said plurality of machines; and (g) determining when said pallet arrives in the vicinity of a second machine that is not in use and is capable of performing a second programmed operation required on said work, and thereafter repeating the acts in parts (e) and (f) with respect to said pallet and said second machine to align said pallet and said second machine, to control said second machine to perform said second programmed operation on the work, and to resume conveyance of said pallet along said predetermined path when said second programmed operation is completed.

153. The method of claim 152 including using the coded information read from each specific pallet presented to a respective machine to effect the generation of a plurality of selected command signals stored at said addressable storage device, and employing said plurality of operational command signals to control said respective machine to perform the required progranuned operations on the work presented thereat by the specific pallet.

154. The method of claim 153 further comprising retaining the work on and employing said pallets to support the work carried thereby while the machines perform programmed operations on the work.

155. The method of claim 152 further comprising using the coded information read from the pallets to control the programmed operation of the plurality of machines on the work conveyed thereto.

156. The method of claim 152 wherein the act of coding each of said pallets includes programming a controller resident on each pallet.

157. The method of claim 152 wherein the programmed operations performed on the work carried to the machines on the pallets include milling operations.

158. The method of claim 152 further comprising controlling a powered conveyor to direct said plurality of pallets along said predetermined path.

159. The method of claim 152 further comprising conveying said plurality of work-holding pallets along a straight path.

160. The method of claim 159 wherein the straight path is defined by a powered conveyor.

161. The method of claim 159 further comprising continuously conveying said pallets along said predetermined path on an endless belt-type conveyor.

162. The method of claim 152 further comprising conveying said pallets along said predetermined path with a powered conveyor, and wherein the alignment act includes transferring said pallets off said powered conveyor to the machines that are selected to perform said programmed operations on the work carried by the pallets.

163. The method of claim 152 further comprising locating said machines on both sides of said predetermined path along which said pallets travel and conveying said pallets to selected machines on both sides of said path.

164. The method of claim 163 wherein said machines include multi-axis milling machines that are computer-controlled and operated to perform different programmed operations on work conveyed thereto.

165. The method of claim 152 further comprising carrying out the programmed operation of the machines under the control of a master controller located remote from said machines.

166. The method of claim 152 wherein the programmed operations performed on the work carried to the machines on the pallets include drilling operations.

167. A method for performing automatic operations on a plurality of units of work, comprising:

(a) conveying a plurality of units of work on a conveyor along a predetermined path past a plurality of program controllable machines and determining when a select unit of work is aligned by said conveyor at a selected first machine;

(b) generating a plurality of machine control messages on the output of a computer and communicating respective of said machine control messages to said first machine;

(c) storing in an addressable memory at said first machine at least some of said communicated machine control messages;

(d) reproducing at least a portion of said stored machine control messages from the memory of said first machine and applying the reproduced messages to predeterminately control the operation of said first machine to cause said machine to automatically perform a select operation on the select work unit; and (e) determining when the select operation on the select unit of work is completed and automatically conveying said work unit to a selected second of said plurality of machines and repeating acts (b) through (d) to cause said second machine to perform a further predetermined operation on said work unit.

168. The method of claim 167 wherein at least one of said machines is a welding tool.

169. The method of claim 167 wherein at least one of said machines is a fastening tool.

170. The method of claim 167 wherein at least one of said machines is a machining tool.

171. The method of claim 167 wherein at least one of said machines is a cutting tool.

172. The method of claim 167 wherein said machine includes multiple manipulator arms and wherein each of said manipulator arms is controlled in its movement to effect welding operations on the unit of work.

173. The method of claim 172 further comprising controllably moving said multiple-arm machine along a track adjacent said path.

174. The method of claim 167 wherein said computer includes an addressable memory containing command control codes used to generate said command control messages.

175. The method of claim 167 wherein said command control messages are generated by a central computer coupled to said machines.

176. The method of claim 175 wherein act (e) is carried out under the control of said central computer.

177. The method of claim 167 wherein communicating respective of said machine control messages to said first machine comprises communicating a message containing an address corresponding with said first machine to each of said machines, but recording said message in the addressable memory of only said first machine.

178. The method of claim 177 wherein communicating comprises wireless transmission of said machine control message.

179. The method of claim 177 wherein at least one of said machines comprises a manipulator arm, and wherein causing said manipulator arm to perform a select operation on the select work unit comprises performing an assembly operation with respect to said select work unit.

180. The method of claim 167 wherein at least one of said machines is an assembly tool.

181. A method for automatically operating on units of work comprising:
  (a) locating along a production line a plurality of numerically controlled production tools, each of said tools having a selectively addressable local controller;
  (b) controlling a self-propelled conveyor to carry a plurality of units of work along a path defined at least in part by said production line;
  (c) generating a plurality of control messages remote from said tools for controlling the operations of respective of said tools;
  (d) communicating selected of said messages to selectively addressed local controllers associated with respective of said tools;
  (e) determining when selected of said work units are conveyed to and located adjacent to selected ones of said tools and operatively aligning each of the selected work units with respect to each of the selected tools;
  (f) when selected work units are operatively located at selected tools, controlling the tools with said selected messages communicated to the local controller to cause each tool to automatically perform at least one programmed operation on the work at the tool; and
  (g) determining when said programmed operation is completed and controlling said conveyor to cause it to carry the work supported thereby to another selected tool.

182. The method of claim 181 wherein the act of controlling said conveyor includes holding said conveyor stationary while the workpiece is aligned at a selected tool that is controlled to perform a selected programmed operation on the workpiece.

183. The method of claim 181 wherein communicating in part (d) comprises wireless transmission of said control message.

184. A method for automatically operating on units of work with a plurality of power-operated machines, comprising:
  (a) placing at least one workpiece on each of a plurality of pallets;
  (b) moving each of said pallets so that they travel a path along which path is disposed a plurality of separate numerically controlled production tools;
  (c) generating a plurality of command control signals;
  (d) transmitting selected of said command control signals to respective addressable receivers located at respective of said tools;
  (e) sensing when a selected one of said pallets is located adjacent a selected one of said tools, and predeterminately positioning the workpiece of the pallet with respect to the selected tool;
  (f) thereafter controlling the operation of the selected tool with the command control signals transmitted to the receiver of the tool to cause the tool to automatically perform at least one programmed operation on the predeterminately positioned workpiece; and
  (g) sensing when said programmed operation is completed and thereafter moving said selected pallet to carry the workpiece supported thereby to another selected one of said tools.

185. The method of claim 184 further comprising predeterminately stopping said pallets at each selected tool while said tool performs said programmed operation on said workpiece.

186. A method of manufacturing a variety of products along a production line, said method comprising:
  (a) locating a plurality of different automatically operable production tools to define a production line, each of said production tools having an addressable recording device structured to store control signals;
  (b) conveying a plurality of different units of work-in-process along a conveyor defining a path of said production line, said path passing a plurality of said production tools disposed adjacent thereto;
  (c) sensing when each unit of work-in-process conveyed along said path is in alignment with a first of said automatically operable tools and transferring said unit of work-in-process from said conveyor to an operative location at a workstation associated with said first tool;
  (d) thereafter selectively addressing and reproducing said control signals stored in said recording device and applying said reproduced signals to automatically operate said first tool to cause it to perform a first predetermined operation on the work unit operatively located at said workstation;
  (e) when said first predetermined operation of said first tool on said work unit is completed, transferring the work unit from said workstation back to said conveyor and moving said work unit on said conveyor along said path to a second automatic tool; and
  (f) repeating the acts in parts (b) through (e) with respect to said work unit and selected of the remaining of said plurality of different automatically operable tools until a plurality of second predetermined operations have been performed on said work unit.

187. The method of claim 186 further comprising generating control signals from a remote location and communicating said signals for storage at said addressable recording device associated with selected of said tools.

188. The method of claim 186 including coding said different work units and automatically reading the coding of each work unit to identify each work unit as it is aligned at each tool.

189. The method of claim 188 wherein the act of automatically controlling at least certain of said tools comprises selectively addressing said stored control signals based on the determined identity of a particular type of work unit aligned at said tools to variably operate said tools to carry out different production operations on different identified work units.

190. The method of claim 189 further comprising generating said control signals on the output of a controller located remote from said tools.

191. The method of claim 189 further comprising supporting said work units on respective pallets, coding each pallet with control signal recordings, and reading said control signal recordings from said pallet as said work units are conveyed along said path to determine the selected ones of said automatically operable tools for operating on respective of said work units.

192. A method of automatically operating on a plurality of workpieces requiring different forms of machining operations by a plurality of programmed machines, comprising:
  (a) conveying each of a plurality of workpieces along a predetermined route past a plurality of programcontrollable machines, whereby at least some of the workpieces require preselected machining operations by selected of said plurality of machines, and wherein each of the machines includes an addressable recording device holding a plurality of different programs for performing selected machine operations;
  (b) detecting and identifying each workpiece as it is conveyed along said predetermined route to permit each workpiece to be chosen for a preselected machine operation at a respective one of said machines;
  (c) operatively aligning each identified workpiece at said chosen respective one of said machines; and
  (d) addressing said recording device of each of said chosen respective machines and selectively reproducing therefrom a program for controlling the preselected machine operation.

193. The method of claim 192 further comprising communicating a program from a central location to each of said tools, which program is communicated together with an address corresponding with at least one selected of said chosen respective machines, and recording said program in the recording device of only said selected machines.

194. The method of claim 193 wherein communicating comprises wireless transmission of said program.

195. A process of producing product components from a plurality of workpieces by effecting a predetermined machine sequence on each workpiece with a machine system, wherein said system comprises a plurality of machines capable of performing different machine operations, a conveyor supporting a plurality of workpieces and locate each workpiece so that it is selectively accessible to said plurality of machines, and a programmable master controller coupled to said machines and to said conveyor, said process comprising:
  (a) mounting each workpiece on a pallet that is configured to hold each workpiece at any of a selected number of said machines;
  (b) locating each pallet-mounted workpiece on said conveyor at the start of a machine sequence;
  (c) selectively addressing a control signal storage unit at said master controller and reading and using said signals to automatically control a machine sequence in said machine system including: (1) conveying each pallet-mounted workpiece on the conveyor to selected machines in the machine sequence, (ii) transferring each pallet-mounted workpiece between said conveyor and each of said selected machines, (iii) communicating selected of said control signals for receipt at an addressable local controller associated with each of said selected machines; and (iv) performing a selected machine operation on said workpiece transferred to each of said selected machines; and
  (d) wherein the machine sequence on at least one of the plurality of workpieces is different from the machine sequence performed on others of said workpieces.

196. The process of claim 195 including storing selected of said communicated control signals in an addressable local storage device associated with each of said selected machines.

197. A process of producing production components from a plurality of workpieces by effecting a sequence of different machine operations on each workpiece in an automatic production system defined by a plurality of machines, each of which is capable of performing variable programed operations, a conveyor supporting a plurality of workpieces so that each workpiece is selectively accessible therefrom, work transfer devices adjacent to and associated with each machine, and a programmable controller, said process comprising:
  (a) locating each workpiece on said conveyor;
  (b) performing an automatic operating sequence on each workpiece by conveying each workpiece only to the selected machines in an operating sequence and controlling the work transfer devices associated with each of said selected machines to transfer each workpiece from said conveyor to each of said selected machines;
  (c) controlling an operating sequence of conveying and transferring operations for each workpiece and the machine operations by said selected machines with signals generated by said programmable controller; and
  (d) program controlling the machine sequence applied to at least one of the plurality of workpieces so that the sequence comprises a permutation of selected machines that is different from the permutation of selected machines in the sequences applied to others of said workpieces.

198. An automatic production method comprising:
  (a) conveying a plurality of units of work in sequence along a path with a plurality of self-propelled conveyors;
  (b) disposing a plurality of variably operable powered machines at different locations adjacent said path;
  (c) generating selectively addressable control signals in the form of separate machine control messages for use in controlling the operation of said machines;
  (d) receiving at each of said machines said selectively addressed messages;
  (e) transmitting said selectively addressed messages to receiving devices of selected of said machines;
  (f) applying the selectively addressed messages at each of said selected machines to control the operation of said machine;
  (g) detecting the presence of work carried by said conveyors when said work is operatively aligned with respective of said machines and initiating the generation and application of select control signals to control the operation of the machine at which the work is aligned; and
  (h) performing programmed operations on said work in accordance with the information defined by the selectively addressed messages received at the machine.

199. An automatic production method comprising:
(a) conveying a plurality of units of work in sequence along a path past a plurality of separately operable and selectively addressable powered tools disposed at different locations adjacent said path;
(b) generating selectively addressable control signals in the form of separate machine control messages useful in controlling the operation of respective of said selectively addressable tools;
(c) transmitting said messages to selected of said tools for controlling the operation of said tools;
(d) selectively receiving, using a specific address corresponding to each of said tools, only correspondingly addressed of said messages; and
(e) detecting the presence of said conveyed work when said work is operatively aligned with respective of said tools and applying the selectively addressed and received messages to control the operation of selected of the tools at which said work is aligned to,cause said tools to perform a programmed operation on the conveyed work in accordance with the information defined by the selectively addressed messages received at said tool.

200. An automatic production method comprising:
(a) power-conveying a plurality of units of work along a path,
(b) disposing a plurality of separately operable powered machines at different locations adjacent said path;
(c) generating at a central location selectively addressable control signals in the form of separate machine-control messages;
(d) selectively transmitting from said central location and receiving at each of said machines said messages, and employing a specific address on said messages to specifically address selected of said machines.
(e) selectively applying said specifically addressed messages to the corresponding selected machines to control the operation of said selected machines; and
(f) detecting the presence of conveyed work when said work is operatively aligned with one of the selected machines and applying control signals from the messages received at said machine to cause the machine to perform a predetermined operation on the work aligned thereat in accordance with the machine-control function defined by said control signals.

201. The method of claim 200 including using part of the selectively received messages to control the operation of a power-operated device contained in an operating head supported by a manipulation arm assembly at each of said tools.

202. The method of claim 200 further comprising generating at said central location conveyor-control messages, transmitting said conveyor-control messages from said central location and applying said conveyor-control messages to control the power-conveying of said units of work, in coordination with the machine-control messages.

203. The method of claim 200 further comprising applying control signals from the messages received at said machine to cause the machine to perform different predetermined operations on the aligned work for each of a plurality of different types of work pieces.

204. An automatic production method comprising:
(a) power-conveying a plurality of units of work along a path including a plurality of individually addressable and separately operable powered machines disposed at different locations adjacent said path;
(b) generating selectively addressed control signals in the form of separate messages for communication to correspondingly addressed machines for use in controlling the operation of said machines;
(c) using an individual address identifying each of said machines for selectively receiving and recording correspondingly addressed of said messages;
(d) selectively communicating said generated addressed messages to correspondingly addressed of said machines and reproducing the received and recorded messages to control the operation of said addressed machines; and
(e) detecting the presence of and identifying conveyed work when said work is operatively aligned with a respective machine and applying select command control signals reproduced from the recorded messages to cause the machine to perform a predetermined operation on the work at the machine in accordance with the control function defined by said selectively addressed control signals.

205. An automatic production method comprising:
(a) supporting a plurality of pallets on a conveyor, with each pallet containing at least one unit of work, and carrying said pallets along a path defining a production line past a plurality of production tools disposed adjacent to said conveyor, each of said tools having a transfer device positioned to operatively locate work with respect to the tool;
(b) generating selectively addressable control messages and selectively communicating respective of said messages to signal storage devices at selected of said tools, and recording the communicated messages in said selected signal storage devices;
(c) identifying pallets on the conveyor at the transfer device of said tools;
(d) when a selected pallet containing work to be operated on by a selected tool is conveyed past the transfer device, using the transfer device to transfer the selected pallet into range of the selected tool; and
(e) reproducing selected messages stored by the signal storage device of the selected tool and applying said reproduced messages to control the selected tool to perform programmed operations on the work located thereat.

206. An automatic production system comprising:
(a) a plurality of machines disposed at respective work positions located spaced apart with respect to each other, each machine including:
  (i) a machine controller,
  (ii) an addressable storage device coupled to the machine controller, which storage device has a plurality of storage locations, each capable of storing one of a plurality of different command sets, each of the command sets comprising machine-operation instructions, wherein different of said command sets, when applied by the machine controller, cause the machine to physically alter a work unit positioned within range of the machine in different ways, and
  (iii) an addressable receiver coupled to the addressable storage device,
(b) a conveyor connecting respective work positions within range of selected of the machines,
(c) a remote controller located remote from the machine controllers and having a command output, and
(d) a selective addressing system coupling the output of the remote controller to the addressable receiver of selected of the machines.

207. The system of claim 206 wherein said remote controller comprises a master controller located remotely from said machines and said conveyor and wherein said master controller is coupled to the conveyor.

208. The system of claim 207 wherein said master controller is further coupled to said machine controllers.

209. A machine system for operating on a plurality of different workpieces requiring different forms of operations performed by a plurality of machines, each machine being located at a respective station, said machine system comprising:
  (a) a conveyor structured to support a plurality of workpieces at once and to move them along a path extending to each of said stations;
  (b) a programmable controller coupled to the conveyor and structured to select a specific set of stations to which each of said workpieces is moved by the conveyor, said set of stations being different for different workpieces; and
  (c) a transfer device system coupled to the controller and positioned to permit selective transfer of each of the workpieces to only said selected set of stations,
whereby each of the workpieces follows a selected route defined by the path of the conveyor and the selected set of transfers, to have a selected combination of operations performed thereon by the machines located at the stations along the selected route.

210. The system of claim 209 wherein:
  (a) said conveyor comprises a plurality of controllable, moveable work pallets;
  (b) said programmable controller comprises a master controller located remote from the pallets; and
  (c) said master controller simultaneously controls a plurality of said pallets to select the routes and stations to which said plurality of pallets are conveyed.

211. A machining system for producing articles of manufacture from a plurality of workpieces of different shape, said system comprising:
  (a) a plurality of machine tools capable of performing different machining operations on different unit of work, each of said machine tools including a local controller having a preselected address;
  (b) conveyor means operable for holding a plurality of workpieces, and for conveying each workpiece to only selected of said machine tools;
  (c) transport means for transporting workpieces between said conveyor means and only said selected machine tools to permit select machining sequences to be performed on each workpiece; and
  (d) programmable control means for selectively controlling the operations of said conveyor means and said transport means for each workpiece and for selectively addressing said selected machine tools for controlling the machining operations of said selected machine tools.

212. The system for machining a plurality of different workpieces requiring different machining operations, said system comprising:
  (a) a plurality of machining means for performing variable machining operations;
  (b) means for conveying each workpiece under the control of a programmable control means along a select route of travel defined by preselected stops at only selected of said machining means;
  (c) programmable control means for selecting the route of travel and particular machining means and operations for a particular workpiece, and for controlling the conveying means so that said particular workpiece follows said selected route and stops only at said selected machining means to have particular machining operations performed thereon; and
  (d) means for selectively transferring a workpiece from said conveyor means to said selected machining means.

213. An automatic production system comprising:
  (a) a plurality of production machines,
  (b) a work unit transporter extending to positions adjacent to each of the machines of the plurality, including an offloading device adjacent to each of the machines of the plurality,
  (c) an electronic transport controller coupled to the transporter and the offloading devices and programmed to selectively activate the offloading devices, and
  (d) an automatic inspection device positioned to inspect a work unit operated on by at least one of said machines,
whereby said transporter delivers work units to a selected sequence of the positions and said automatic inspection device inspects a work unit selectively offloaded from the transporter.

214. An automatic production system comprising:
  (a) a plurality of addressable program controllable machines, each structured to perform different programmed operations on different units of work,
  (b) an automatic conveyor structured to convey different work units only to different selected combinations consisting of more than one and less than all of said machines during a single pass past said machines,
  (c) a locator at selected of the machines positioned to locate work conveyed to the machine in a predetermined position within operating range of the machine,
  (d) an automatic programmable inspection system located adjacent to the conveyor and positioned to inspect work operated on by selected of said machines,
  (e) a controller structured to generate selected, addressed machine control commands and coupled to apply the control signals to control the machines and the inspection system, and
  (f) said automatic inspection system including a work-identification subsystem having an output for control signals and coupled to the inspection system to trigger the inspection function applied to a work unit presented for inspection.

215. The system of claim 214 wherein said automatic inspection system comprises a plurality of separately operable automatic inspection machines.

216. An automatic production system comprising:
  (a) a plurality of addressable programcontrollable production tool means for performing different programmed operations with respect to different units of work,
  (b) automatic conveying means for conveying selected work units to stop only at selected of said tool means to permit the selected tool means to perform select operations with respect to the work units,
  (c) work locating and securing means at each of said tool means for prepositioning and holding work conveyed to said tool means and removed from the conveying means,
  (d) control means for controlling the programmed operations of said tool means,
  (e) said control means including (i) memory means having a plurality of command control messages recorded therein, (i) means for controlling the reproduction of selected of said messages and (iii) means for selectively addressing and communicating said reproduced messages to control the operations of said addressed tool means, (f) means at each tool means for (i) identifying work units conveyed by said automatic conveying means to the vicinity of the tool means and (ii) generating identifying signals, and (g) means for employing said identifying signals to operate said reproduction control means in a manner to effect the reproduction of selected messages from said memory means and the application of said messages to control the tool means to perform selected programmed operations on the work located at said tool means, and (h) wherein said control means is also operable for controlling the operation of said work securing means to effect the release of work secured thereby after the tool means has completed its controlled operation on the work to permit the work to be conveyed by said conveying means to another of said selected tool means.

217. An automatic production system comprising:

(a) a plurality of production machines arranged to form a production line in a work area, (b) a work conveyor including a plurality of separate work carriers and a power drive system for the carriers, (c) a movement control system structured to stop said carriers only at selected of said production machines, (d) a positioning system structured to dispose work stopped at each machine in operative alignment with the machine, (e) a securing device structured to hold work aligned at each machine, and (f) a controller coupled to selectively address the plurality of machines and control the operation of each addressed machine on work operatively aligned and secured at the machine to permit the machine to execute a programmed operation on the work and (g) said controller further coupled to effect the release of work secured at each machine after the operation of the machine is completed to permit the work to be carried to the next selected production machine along said production line.

218. The system of claim 217 wherein:

(a) said work conveyor comprises a track supported above said machines, (b) said plurality of carriers are supported for movement along said track, and (c) the power drive system includes, for each carrier, a motor supported on and driving each carrier along said track parallel to said production line to carry the work to selected of said machines.

219. The system of claim 218 wherein the track is a monorail.

220. The system of claim 217 wherein:

(a) the conveyor comprises an overhead supported bi-rail track with at least one bridge crane supported for movement along said bi-rail track and at least one work carrier suspended from the bridge across each crane, and (b) the power drive system is structured to move (i) the bridge of each crane along said bi-rail track and (ii) each suspended carrier back and forth along the crane bridge.

221. An automatic production system for performing different operations, such as cutting and shaping operations on different units of work, and wherein the dimensions and shapes of the workpieces vary during the operations thereon and wherein quality control is required to properly process work, comprising:

(a) a plurality of selectively addressable, programcontrollable, fixed base machines, some performing different operations than others, (b) automatic conveying means for operatively disposing selected of the different work units at selected machines, (c) means for automatically addressing and controlling selected machines to operate on the work units conveyed thereto, (d) automatic inspection means located proximate to said conveying means for inspecting work after it has been operated on by selected of said machines to determine if the machines have properly performed their automatic operations on the work inspected, (e) means for effecting predetermined relative alignment between said work and said automatic inspection means, (f) control means for controlling the operation of said automatic inspection means to cause said inspection means to perform different programmed inspection operations on different units of work, (g) means for identifying work operatively aligned for inspection by said automatic inspection means and generating code signals identify said work, and (h) means for applying said code sis to control the operation of said control means to effect selected inspection operations on different units of work operatively aligned with said inspection means.

222. The system of claim 221 wherein said automatic inspection means comprises a plurality of automatic inspection machines disposed at different locations in said production system.

223. The system of claim 222 wherein at least one of said automatic inspection machines is multi-axis in its operation.

224. An automatic production system comprising:

(a) conveying means for supporting and carrying a plurality of pallets, each pallet containing at least one unit of work and being carried along a path to define a production line, (b) a plurality of production machines, each stationed at a location adjacent to the conveying means, with each machine being operable to perform programmed operations on work presented thereto, (c) at least one of said machines including an automatic inspection device for inspecting work fed thereto and determining the results of the operations of at least some of the others of said machines on work carried by said pallets, (d) means for aligning palletized work with selected of said machines to operatively locate the work with respect to said selected machines, and (e) means for generating selectively addressable command control messages and for selectively applying said messages to selected of said machines to predeterminately control the operation of said selected machines and said automatic inspection device when respective units of work are operatively located with respect thereto to effect preprogrammed operations by said selected machines on said work units and the automatic inspection of such work units after such operations are performed thereon.

225. An automatic production system comprising:
(a) conveying means for supporting and carrying a plurality of pallets with each pallet holding at least one unit of work and being carried along a path to define a production line,
(b) a plurality of production machines disposed adjacent to the conveying means with each machine being operable to perform programmed operations on work presented thereto,
(c) a plurality of pallet transfer and support means disposed adjacent to said first conveying means, with each transport and support means containing (i) means for engaging a pallet conveyed thereto by the conveying means, and (ii) means for fixedly holding said pallets at said production machines to provide the work held thereby in fixed operative relation with respect to said machines,
(d) means for selectively operating said transfer and support means when a selected pallet is presented thereto by the conveying means to selectively transfer said selected pallet into operative relation with respect to a selected machine to which it is conveyed by said conveyor means,
(e) means for operating each pallet engaging means at a respective machine to fixedly hold each pallet presented thereto, and
(f) means for generating selectively addressable command control messages and applying said control messages to control the operation of selectively addressed machines when selected work is operatively located at the machines by the pallets to cause the machines to perform preprogrammed operations on the selected units of work.

226. An automatic production system comprising:
(a) conveying means for supporting and carrying a plurality of pallets with each pallet containing at least one unit of work and traveling a path defining a production line,
(b) a plurality of production tool means disposed adjacent to said conveying means, for performing programmed operations on work presented thereto,
(c) addressable storage means located at each tool means for storing respective machine control commands and inducting means for selectively reproducing control signals therefrom for controlling the tool means,
(d) a plurality of transfer means disposed adjacent to the conveying means for transferring pallets therefrom to respective of said tool means, and means at each tool for operatively locating work with respect to the tool means,
(e) means for selectively operating said transfer means when a selected pallet containing work to be operated on by a selected tool means adjacent to said transfer means is conveyed to the transfer means to cause said transfer means to transfer the selected pallet to the selected tool means,
(f) control means for generating selectively addressable command control messages and means for selectively communicating respective of said messages to selected of said signal storage means, and means for recording the communicated messages in said selected signal storage means for use when reproduced thereafter in controlling respective of the tool means, and
(g) means at each transfer means for (i) identifying pallets on the conveying means, (ii) activating the transfer means when selected pallets are identified to transfer said selected pallets to selected of said production tool means, and (iii) effecting control of the signal storage means of the selected tool means to reproduce selected messages stored thereby and to apply said selected messages to control the selected tool means to perform programmed operations on the work located thereat.

227. An automatic production system comprising:
(a) conveying means for supporting and carrying a plurality of pallets, each containing at least one unit of work, from one end to the other of a production line, sequentially along the line,
(b) a plurality of addressable production machines disposed adjacent to said conveying means for performing programmed operations on work presented thereto,
(c) a plurality of pallet transfer means disposed along said conveying means for transferring pallets from said conveying means to respective of said machines,
(d) control means for generating costs control messages, and
(e) means for selectively addressing said pallet transfer means and said machines to selectively apply said command control messages to control the operations of selected of said pallet transfer means and said machines in a manner to effect the transfer of selected work-holding pallets to selected of said machines and to predeterminately control the operation of said selected machines on work held by selected of said pallets and to further effect the transfer of said pallets and work back to said conveying means after said operations have been performed on the work held by said pallets by said machines.

228. An automatic production system comprising:
(a) conveying means for supporting commands carrying a plurality of pallets, each pallet holding at least one unit of work, along a given path defining a production line,
(b) a plurality of production tool means disposed adjacent to said conveying means for performing programmed operations on work presented thereto,
(c) a plurality of pallet transfer means disposed along said conveying means for selectively transferring pallets from said conveying means to a position in range of said tool means,
(d) means aligned with each tool means for engaging a pallet transferred to said tool means by said transfer means,
(e) support means for fixedly holding a pallet in a manner to provide the work held by said pallet in fixed operative relation with respect to the tool means, and
(f) control means for generating machine control commands and selectively applying said control signals to control the operations of only selected of said pallet transfer means and of said support means to effect the selective transfer of only selected work-holding pallets to only selected of said tool means and the fixed retention of said pallets at the tool means to which they are transferred to permit said tool means to perform programmed operations on the work presented thereto by said pallets.

229. The system of claim 228 wherein said control means is also operable to selectively address and control the programmed operation of each selected tool means after a selected work-holding pallet is transferred from said conveying means to the support means at the tool means and is fixedly held in an operative position.

230. The system of claim 229 wherein said control means is also operable to selectively address and control the operation of selected of said means for fixedly holding pallets in a manner to permit same to hold a selected pallet and fixedly position work held by the pallet with respect to the tool means and to release the pallet to permit the pallet and work to be transferred from the tool support means back to said conveying means.

231. The system of claim 228 wherein said control means is also operable to selectively address and control said pallet transfer devices, after selectively controlling the operation of a tool means to perform on work held by a pallet to transfer pallets from the pallet support means of the tool means to said conveying means to permit said conveying means to carry pallets to another selected tool means adjacent to said production line.

232. An automatic production system comprising:
(a) a conveyor supporting and carrying a plurality of pallets in a given direction along a select path defining a production line, each pallet holding at least one unit of work,
(b) a plurality of production machines disposed along said conveyor and structured to perform different programmed operations on different units of work conveyed thereto on said pallets,
(c) a plurality of pallet transfer devices, located adjacent to said conveyor so as to transfer a pallet from said conveyor to dispose it and the work it holds adjacent to at least one selected production machine,
(d) a securing device at each machine structured to engage and hold a pallet at a predetermined location with respect to said machine and to dispose the work held by the pallet in a fixed position with respect to the machine, within operating range of the machine, and
(e) a controller structured to generate and selectively address command control messages to control selected pallet transfer devices, securing devices, and production machines: (1) to transfer selected of said pallets to selected of said machines, and (2) to perform selected programmed operations on selected work supported by said selected pallets.

233. The system of claim 232 wherein said controller is also structured to control the operations of a plurality of said machines to permit each of said selected machines to simultaneously operate on work presented thereto on said pallets.

234. The system of claim 232 wherein said controller is a master controller controlling the operations of said securing devices to cause them to hold pallets and to fixedly position work held by said pallets with respect to an associated machine and to release the pallets to permit the pallets and work to be transferred from the associated securing device to said conveyor.

235. The system of claim 232 wherein said controller is a remote controller located remotely from said pallet transfer devices and their associated machines.

236. An automatic production system comprising:
(a) a conveyor supporting and carrying a plurality of pallets from one end to another sequentially along a production line, each pallet containing at least one unit of work,
(b) a plurality of programmable production machines disposed adjacent to said conveyor,
(c) said machines including a plurality of cutting tools,
(d) at least one automatic inspection device positioned adjacent to one of the cutting tools,
(e) a transfer device positioned to transfer pallets from said conveyor to selected of said machines, and
(f) a central controller outputting command control messages selectively distributed and applied to said transfer device, selected of said machines, and said automatic inspection device,
whereby work on the pallets is conveyed only to said selected machines, to permit the machines to perform selected programmed operations on work transferred thereto, and to effect the automatic inspection of said work after it is operated on by at least one of said machines to automatically determine if the machine has properly performed a programmed operation on said work.

237. The system of claim 236 including feedback control means for controlling the operation of said automatic inspection device to permit the cutting tool to perform cutting operations.

238. An automatic production system comprising:
(a) a plurality of machines, each supported on a base that does not move during operation of the production system,
(b) automatic conveying means for conveying work units to selected of said machines for the performing of programmed operations on the work units by the selected machines,
(c) control means for controlling the operations of said machines when work is disposed at said machines by said conveying means to permit different programmed operations to be performed on different units of work, and
(d) an automatic, programmable inspection means disposed proximate to said automatic conveying means,
(e) said control means being operable to control said conveying means to feed a selected unit of work to said automatic inspection means and to controllably program the operation of said inspection means when a unit of work is disposed thereat to permit said automatic inspection means to perform a selected programmed inspection operation on said work.

239. The system of claim 238 including feedback control means for said automatic inspection means responsive to a signal generated by said control means for controlling the operation of said machines to perform selected inspection operations on different units of work fed to said automatic inspection means.

240. The system of claim 238 wherein said automatic inspection means is located at one of said machines that is operable to machine work, said automatic inspection means being operable to inspect work that is machined by the machine.

241. The system of claim 240 wherein said machine performs a cutting cycle, and said automatic inspection means is operable to inspect work at the machining machine during the cutting cycle.

242. An automatic production system comprising:
(a) first means, including a plurality of self-propelled conveying means, for conveying a plurality of units of work in sequence along a path,
(b) second means for performing variable powered operations on units of work including a plurality of machines, each of which is stationed during operation of the first means at a different location adjacent to said path,
(c) third means for generating selectively addressable machine control commands in the form of separate machine control messages for use in controlling the operation of said machines, (d) fourth means, at each of said machines, for receiving selectively addressed messages generated by said third means, (e) fifth means for transmitting selectively addressed messages generated by said third means to said receiving means of selected of said machines, (f) sixth means, at each of said machines, for applying the selectively received messages to control the operation of said machine, and (g) seventh means for detecting the presence of work carried by said conveying means when said work is operatively aligned with respect of said machines and for initiating the generation and application of select control signals to control the operation of the machine at which the work is aligned, (h) said programmed operation on said work being in accordance with the information defined by the selectively addressed messages received at the machine.

243. An apparatus of claim 242 herein each of said machines is operable to perform controlled operations on work supported by said conveying means while said conveying means is stopped at the machine.

244. An apparatus of claim 242 wherein at least certain of said machines are numerically controllable machines and said selectively addressed control messages are operable to numerically control the operation of said machines to perform programmed operations on work supported by respective of said self-propelled conveying means.

245. An automatic production system comprising:

(a) first means, including self-propelled conveyors, for conveying a plurality of units of work in sequence along a path, (b) second means for performing machine operations on the units of work, including a plurality of separately operable and selectively addressable powered machines, each of which is stationed during operation of said first means at one of a plurality of different locations along said path, (c) third means for generating selectively addressable machine control commands in the form of separate machine control messages for use in controlling the operation of respective of said selectively addressable machine, (d) fourth means, having a specific address at each of said machines, for selectively receiving only correspondingly addressed messages generated by said third means, (e) fifth means for transmitting selectively addressed messages generated by said third means to respective of said receiving means of selected of said machines for controlling the operation of said machines, and (f) sixth means for detecting the presence of work on said conveying means when said work is operatively aligned with respective of said machines and for initiating the generation and application of selectively addressed control signals to control the operation of selected of the machines at which said work is aligned to cause said machines to perform a programmed operation on the work supported by the conveying means, (g) said programmed operation on said work being in accordance with the information defined by the selectively addressed messages received at said machine.

246. An automatic production system comprising:

(a) a power-operated conveyor structured to move a plurality of units of work along a path, (b) a plurality of separately operable powered machines disposed at different locations adjacent to said conveyor, (c) a generator of selectively addressable machine command sets, each of said machine command sets arranged in the form of separate messages and comprising instructions controlling the machine to perform programmable operations with said machine with respect to a unit of work while the unit of work is positioned within range of the machine, different of said machine command sets causing the machine to physically alter units of work in different ways, (d) a receiver at each of said machines structured to receive messages from said signal generator, said receiver including a specific address, (e) a transmission system for specifically addressed messages coupling said signal generator and said specifically addressable receivers of selected of said machines, (f) a local addressable storage device located at each of the plurality of machines and coupled to the corresponding receiver and to the machine, each of which storage devices contains storage areas for a plurality of different machine command sets received at the receiver, and (g) a detector positioned to detect the presence of a unit of work conveyed by said conveyor when said unit of work is aligned with a respective machine, wherein said detector is coupled to the storage device of the corresponding powered machine so as to apply a select one of the machine control command sets to cause the machine to physically alter the unit of work aligned thereat in a manner defined by said select machine control command set.

247. The system of claim 246 wherein at least one of said machines includes an automatic manipulator having a moveable arm assembly and an operating head supported thereby.

248. An automatic production system comprising:

(a) a power-operated conveyor structured to carry a plurality of units of work in sequence along a path, (b) a plurality of separately operable powered machines disposed at different locations adjacent to said conveyor, (c) a local addressable storage device located at each of the plurality of machines and coupled to the corresponding machines each of which storage devices contains storage areas for a plurality of different machine control command sets, each of said machine command sets comprising instructions controlling the machine to perform programmable operations by said machine with respect to a unit of work while the unit of work is positioned within range of the machine, different of said machine control command sets causing the machine to physically alter units of work in different ways, and (d) a machine controller at each of said machines coupled to the corresponding storage device and structured to select from the coupled storage device, for each unit of work carried by the conveyor to the machine, an appropriate one of the machine control command sets and to apply the selected command set to control the operation of the machine to selectively operate on work delivered by said conveyor to said selected machine.

249. The apparatus of claim 248 further comprising a receiver coupled to the conveyor so as to apply machine control commands from a master controller to control operation of the conveyor.

250. An automatic production system comprising:
(a) first means including a power-operated conveying means for conveying a plurality of units of work in sequence along a path,
(b) second means including a plurality of separately addressable machines disposed at different locations adjacent to said conveying means,
(c) third means including control means operative to generate machine control commands in the form of separate messages for use in selectively addressing and controlling the operation of a selected subset of said machines, and
(d) fourth means at each of said selected machines for receiving, recording and reproducing selectively addressed machine control commands transmitted from said control means and for applying same to automatically operate on work delivered by said conveying means to said selected subset of machines.

251. An automatic production system comprising:
(a) first means including power-operated conveying means for conveying a plurality of units of work along a path,
(b) second means including a plurality of individually addressable and separately operable powered machines, each of which is stationed during operation of the first means at a different location adjacent to said conveying means,
(c) third means for generating selectively addressed machine control commands in form of separate messages for communication to correspondingly addressed machines for use in controlling the operation of said machines,
(d) fourth means associated with each of said machines and having an individual address identifying said machine for selectively receiving and recording correspondingly addressed messages communicated from said third means and for selectively reproducing said recorded control signals when work is positioned at said machine,
(e) fifth means for selectively communicating addressed messages generated by said third means to said correspondingly addressed fourth means of selected of said machines and means for applying the received and reproduced messages to control the operation of said respective machines, and
(f) sixth means for detecting the presence of and identifying work conveyed by said conveying means when said work is operatively aligned with a respective machine and for applying select machine control commands reproduced from recorded messages to cause the machine to perform a predetermined operation on the work at the machine in accordance with the control function defined by said select machine control commands.

252. An automatic production system comprising:
(a) conveying means for a plurality of work holding pallets each supporting at least one unit of work, said conveying means being operable to convey said pallets along a select path,
(b) a plurality of work stations located adjacent to said path, each work station having a machine and power operated means for holding and locating a work pallet at the machine,
(c) each of said machines having a power operated tool end, first motor means for effecting multi-axis movement of said tool end, and respective control means for each of said motor means,
(d) remote control signal generating means for generating addressed machine control signals in the form of command control messages,
(e) each of said work stations having an addressable message signal receiving and recording means,
(f) means for operating said remote control signal generating means to cause it to generate and transmit respective of said addressed command control messages to correspondingly addressed work station receiving and recording means to effect receipt and recording of select messages at select work stations,
(g) means for identifying each of said work holding pallets when the pallet is conveyed by said conveying means to select work stations and for generating control signals, and
(h) means for applying said latter control signals to effect the transfer of said work from said conveying means to a predetermined position with respect to the machine of the select work station.

253. The system of claim 252 wherein the work is predeterminately located on the pallets and the pallets are held and prepositioned at the work stations.

254. The system of claim 252 wherein said pallets contain readable codes and said identifying means scans said codes to identify said pallets at said work stations.

255. An automatic production system comprising:
(a) a plurality of machines stationed at respective positions, each machine including a controller and a local addressable storage device coupled to the corresponding controller, each of which storage devices contains storage areas for a plurality of different machine control command sets, each of said machine command sets comprising instructions controlling the machine to perform programmable operations by said machine, different of said machine control command sets causing the machine to operate in different ways,
(b) a work unit transporter extending to respective work positions within range of each of the plurality of machines,
(c) wherein each machine controller is structured to select one of the machine control command sets to control the coupled machine to physically alter a selected unit of work transported to the work position within range of the machine.

256. The apparatus of claim 255 wherein the units of work are each secured to a pallet.

257. The apparatus of claim 255 wherein the transporter is arranged in a sight line.

258. The apparatus of claim 255 wherein the transporter is substantially horizontal.

259. The apparatus of claim 255 wherein the transporter is a conveyor supporting a plurality of units of work on its top.

260. The apparatus of claim 255 wherein the transporter carries a plurality of units of work at once.

261. The apparatus of claim 255 wherein the transporter comprises an endless belt conveyor.

262. The apparatus of claim 255 wherein the machines are adjacent to the side of the conveyor belt.

263. The apparatus of claim 255 wherein the transporter comprises a chain conveyor.

264. The apparatus of claim 255 wherein the transporter comprises a flight conveyor.

265. The apparatus of claim 255 wherein the transporter is structured to provide a workpiece support surface that is substantially flat and has two edges parallel to the direction of travel of the transporter.

266. The apparatus of claim 265 wherein at least some of the machines are adjacent to each of the edges.

267. The apparatus of claim 255 wherein the transporter moves units of work in a single direction.

268. The apparatus of claim 255 wherein at least one of the machines comprises a cutting machine.

269. The apparatus of claim 255 wherein at least one of the machines comprises a riveting machine.

270. The apparatus of claim 255 wherein at least one of the machines comprises a machining device.

271. The apparatus of claim 255 wherein at least one of the machines comprises a drill.

272. The apparatus of claim 255 wherein at least one of the machines comprises an automatic welder.

273. The apparatus of claim 255 wherein at least one of the machines comprises a fastening machine.

274. The apparatus of claim 255 wherein at least one of the machines comprises a combination drilling-riveting tool.

275. The apparatus of claim 255 wherein at least one of the machines comprises an inspection tool.

276. The apparatus of claim 255 wherein at least one of the machines comprises a camera.

277. The apparatus of claim 255 wherein at least one of the machines comprises a manipulator.

278. The apparatus of claim 255 wherein at least one of the machines comprises a multi-axis manipulator.

279. The apparatus of claim 255 wherein at least one of the machines comprises an articulated manipulator.

280. The apparatus of claim 255 wherein at least one of the machines comprises a grasping device.

281. The apparatus of claim 255 wherein at least one of the machines includes a moveable operating head.

282. The apparatus of claim 281 further comprising a multi-axis drive system coupled to the operating head.

283. The apparatus of claim 282 wherein the operating head is moveable in three dimensions.

284. The apparatus of claim 255 further comprising at least one code-matcher adjacent to the transporter and to one of the machines and coupled to the corresponding storage device holding a plurality of machine control command sets, which code-matcher is structured to select one of the machine control command sets from the corresponding storage device in response to a code carried with a unit of work arriving at the adjacent machine to control the machine to perform an appropriate combination of operations on the unit of work when it arrives within range of the machine.

285. The apparatus of claim 255 wherein the machines are floor-mounted.

286. The apparatus of claim 255 further comprising a workstation adjacent to the transporter having at least one machine stationed thereat, and a transfer device positioned to move a unit of work from the transporter to the workstation.

287. The apparatus of claim 255 wherein the transporter is a belt conveyor, and further comprising a bridge crane above the conveyor having a carriage moveable across the conveyor in a direction perpendicular to the direction of travel of the units of work on the conveyor.

288. The apparatus of claim 255 further comprising a remote controller located remote from the machine controllers and having an output for machine control command sets, a selective addressing system coupled to the output of the remote controller, and a plurality of signal receivers, each coupled to one of the controllers, wherein each of the signal receivers is individually coupled to the selective addressing system, and wherein the selective addressing system can distribute machine control command sets from the remote controller to only a selected set of machine controllers.

289. The apparatus of claim 288 wherein each signal receiver includes a code matcher with a distinct code.

290. The apparatus of claim 288 wherein the selective addressing system includes a wireless transmission system.

291. The apparatus of claim 288 wherein the selective addressing system includes a cable with branches extending to each machine.

292. The apparatus of claim 288 wherein the selective addressing system includes a modulated light wave communication system.

293. The apparatus of claim 288 wherein the remote controller further comprises a storage device holding machine control command sets.

294. The apparatus of claim 288 wherein the remote controller is further programmed to control at least some of the machines to perform different operations on different units of work.

295. The apparatus of claim 294 wherein the remote controller is further programmed to control at least some of the machines to perform different operations on different units of work by selecting one of the plurality of machine control command sets of the local storage device to control the machine coupled thereto to perform a select combination of operations on a unit of work within range of the machine.

296. The apparatus of claim 255 wherein:
   (a) the transporter comprises an endless belt conveyor having a support surface that is substantially flat and has two edges parallel to the direction of travel of the conveyor,
   (b) the conveyor belt carries a plurality of units of work at once on its top in a single direction along a substantially horizontal path, and
   (c) the machines are supported on bases adjacent to the side of the conveyor belt during operation of the conveyor.

297. The apparatus of claim 296 wherein at least some of the machines are adjacent to each of the edges.

298. An automatic production system comprising:
   (a) a plurality of machines disposed at a sequence of respective work positions, each of said machines including a controller and a local addressable storage device coupled to the corresponding controller, each of which storage devices contains storage areas for a plurality of different machine control command sets, each of said machine command sets comprising instructions controlling the machine to perform programmable operations by said machine, different of said machine control command sets causing the machine to operate in different ways;
   (b) a work unit transporter extending to respective of the work positions;
   (c) at least one transfer device, capable of moving a work unit from the transporter to any of the work positions in turn;
   (d) a remote controller located remote from said controllers having an output for a plurality of machine control commands capable of controlling a machine through its controller to physically alter a unit of work at a work station; and (e) a selective communication channel coupling the output of the remote controller to the controllers;

(f) wherein the selective communication channel distributes addressed machine control commands from the remote controller to the storage device of only selected ones of said machines from where it is applied by the corresponding machine controller to control the selected machine to automatically perform operations physically altering a work unit of work transported and transferred to the selected machine by the transporter and transfer device.

299. The system of claim 298 wherein said remote controller comprises a master controller located remotely from said machines and said transporter and wherein said master controller simultaneously controls the transporter and transfer devices.

300. The system of claim 299 wherein said master controller simultaneously controls said selected machine to perform operations physically altering said unit of work at the work position while controlling said transporter to move other of the plurality of units of work past the work position.

301. An automatic production system comprising:

(a) a plurality Of addressable program controllable machines, each structured to perform different programmed operations from a stationary position on different units of work, (b) an automatic conveyor structured to convey different work units only to selected of a series of said stationary machines as the work unit passes each of the plurality of machines in turn, (c) a locator at selected of the machines positioned to locate work conveyed to the machine in a predetermined position within operating range of the machine, (d) an automatic programmable inspection system located adjacent to the conveyor and positioned to inspect work operated on by selected of said machines, and (e) a controller structured to generate selected, addressed machine control commands and coupled to apply the control signals to the machines and the inspection system to control the operation of said machines and said automatic inspection system to perform different inspection functions with respect to different units of work, (f) wherein said automatic inspection system includes a work-identification subsystem having an output for control signals and coupled to the inspection system to trigger the inspection function applied to a work unit presented for inspection.

302. The system of claim 301 wherein said automatic inspection system comprises a plurality of separately operable automatic inspection machines.

303. The system of claim 302 wherein at least one of said automatic inspection machines is multi-axis in its operation.

304. The system of claim 301 wherein at least one of said machines includes an automatic manipulator having a moveable arm assembly and an operating head supported thereby.

305. An automatic production system comprising:

(a) a plurality of addressable program controllable machines, each structured to perform different programmed operations on different units of work, (b) an automatic conveyor structured to convey different work units in a single direction only to selected of said machines, (c) a locator at selected of the machines positioned to remove work from the conveyor and to locate work conveyed to the machine in a predetermined position within operating range of the machine, (d) a programmable inspection system located adjacent to the conveyor and positioned to inspect work operated on by selected of said machines, and (e) a controller structured to generate selected, addressed machine control commands and coupled to apply the control signals to the machines and the inspection system to control the operation of said machines and said inspection system to perform different inspection functions with respect to different units of work, (f) wherein said automatic inspection system includes a work-identification subsystem having an output for control signals and coupled to the inspection system to trigger the inspection function applied to a work unit presented for inspection.

306. The system of claim 305 wherein said inspection system comprises a plurality of separately operable automatic inspection machines.

307. The system of claim 305 wherein each of said plurality of addressable program controllable machines are disposed at a stationary position during operation of the conveyor.

308. An automatic production system comprising:

(a) a plurality of fixed-base production machines located to form a production line in a work area, (b) a work conveyor including a plurality of separate work carriers moveable along the production line with a powered carrier drive system, (c) a movement control system structured to stop each of said carriers only at selected of said production machines, (d) a positioning system structured to dispose work stopped at each machine in operative alignment with the machine, (e) a securing device structured to hold work aligned at each machine, and (f) a controller coupled to the plurality of machines to control the operation of each selectively addressed machine on work operatively aligned and secured at the machine to permit the machine to execute a programmed operation on the work and to effect the release of work secured at each machine after the operation of the machine is completed, (g) said controller further coupled to the movement control system to permit one of the carriers to transport the work to the next one along said production line of the selected production machines.

309. The system of claim 308 wherein:

(a) said work conveyor comprises a track supported above said machines, (b) said plurality of carriers are supported for movement along said track, and (c) the power drive system includes, for each carrier, a motor supported on and driving each carrier along said track parallel to said production line.

310. The system of claim 309 wherein the track is a monorail.

311. The system of claim 308 wherein:

(a) the conveyor comprises an overhead supported bi-rail track with at least one bridge crane supported for movement along said bi-rail track and at least one work carrier suspended from the bridge across each crane, and (b) the power drive system is structured to move (i) the bridge of each crane along said bi-rail track and (ii) each suspended carrier back and forth along the crane bridge.

312. The system of claim 308 wherein at least one of said machines includes an automatic manipulator having a moveable arm assembly and an operating head supported thereby.

313. An automatic production system comprising:
(a) a plurality of production machines arranged to form a production line in a work area,
(b) a work conveyor including a plurality of separate work carriers and a power drive system for the carriers,
(c) a movement control system structured to detach said carriers from said power drive system and to stop only at selected of said production machines,
(d) a positioning system structured to dispose work stopped at each machine in operative alignment with the machine,
(e) a securing device structured to hold work aligned at each machine, and
(f) a controller coupled to selectively address the plurality of machines and control the operation of each addressed machine on work operatively aligned and secured at the machine to permit the machine to execute a programmed operation on the work,
(g) wherein said controller is further coupled to effect the release of work secured at each machine after the operation of the machine is completed to permit the work to be carried to the next selected production machine along said production line.

314. The system of claim 313 wherein the plurality of production machines have fixed bases.

315. An automatic production system comprising:
(a) a power-operated conveyor structured to move a plurality of units of work along a path,
(b) a plurality of separately operable powered machines, each disposed during operation of said conveyor at different fixed locations adjacent to and along said conveyor and each having a local addressable storage device coupled to the machine, each of which storage devices contains storage areas for a plurality of different machine control command sets, each of said machine command sets comprising instructions controlling the machine to perform programmable operations by said machine, different of said machine control command sets causing the machine to operate in different ways,
(c) a generator of selectively addressable machine control command sets arranged in the form of separate transmissible messages,
(d) a receiver at each of said machines coupled to the corresponding local storage device, some of said receivers having a different address from others of said receivers,
(e) a transmission system coupling said generator and said receivers and responsive to an addressed message to communicate messages from the generator to the storage devices at selected of said machines, and
(f) a detector positioned to read a code associated with work conveyed by said conveyor when said work is aligned with a respective machine, wherein said detector is coupled to the corresponding machine and associated storage device;
whereby the machine selects from the storage device those command sets corresponding to a code on the work recognized by the detector and applies the machine control commands in the selected command set to cause the machine to perform a predetermined operation altering the work aligned thereat.

316. The system of claim 315 wherein at least one of said machines includes an automatic manipulator having a moveable arm assembly and an operating head supported thereby.

317. The system of claim 316 wherein a power-operated device supported by the operating head of said automatic manipulator is controlled by part of the selectively received messages applied to control the operation of said machine on work aligned thereat.

318. The system of claim 315 wherein at least one of said machines includes a moveable operating head.

319. An automatic production system comprising:
(a) a power-operated conveyor structured to move a plurality of units of work simultaneously along a path,
(b) a plurality of separately operable powered machines disposed at different work stations adjacent to said conveyor, each machine capable of performing programmed operations physically altering units of work at the machine,
(c) a detector adjacent to each work station and responsive to a code carried with work conveyed by said conveyor, and
(d) a transfer device adjacent to each work station and responsive to the respective detector,
(e) wherein each of a plurality of different codes cause a different, predetermined sequence of transfer devices to transfer a unit of work carried with the code from the conveyor to the respective work stations for preprogrammed operation by the adjacent machines.

320. The system of claim 319 wherein each of said machines are stationed at the respective work stations, and wherein, during operation of the conveyor, some units of work are conveyed past the work station at which a machine is operating on another unit of work.

321. An automatic production system comprising:
(a) a power-operated conveyor structured to carry a plurality of units of work at once in sequence along a path,
(b) a plurality of separately operable powered machines, each stationed during operation of said conveyor at different locations adjacent to said conveyor, and each having a local addressable storage device coupled to the machine, each of which storage devices contains storage areas for a plurality of different machine control command sets, each of said machine command set comprising instructions controlling the machine to perform programmable operations by said machine, different of said machine control command sets causing the machine to operate in different ways,
(c) a control system issuing commands arranged in the form of separate messages to cause units of work to stop at selected machines during a single pass along the path for physical alteration by selected machines under the control of said machine control instructions.

322. The apparatus of claim 321 further comprising a selectively addressable receiver associated with each of the machines and the conveyor, which receiver is coupled to the associated machine or conveyor so as to apply correspondingly addressed control commands from the control system to control operation of the machine or conveyor.

323. The apparatus of claim 321 wherein the units of work are each secured to a pallet.

324. The apparatus of claim 321 wherein the conveyor is arranged in a straight line.

325. The apparatus of claim 321 wherein the conveyor is substantially horizontal.

326. The apparatus of claim 321 wherein the units of work are supported on top of the conveyor.

327. The apparatus of claim 321 wherein the conveyor comprises an endless belt.

328. The apparatus of claim 327 wherein the machines are adjacent to the side of the conveyor belt.

329. The apparatus of claim 321 wherein the conveyor comprises a chain conveyor.

330. The apparatus of claim 321 wherein the conveyor comprises a flight conveyor.

331. The apparatus of claim 321 wherein the conveyor is structured to provide a workpiece support surface that is substantially flat and has two edges parallel to the path.

332. The apparatus of claim 331 wherein at least some of the machines are adjacent to each of the edges.

333. The apparatus of claim 321 wherein the conveyor moves units of work in a single direction.

334. The apparatus of claim 321 wherein at least one of the machines comprises a cutting machine.

335. The apparatus of claim 321 wherein at least one of the machines comprises a riveting machine.

336. The apparatus of claim 321 wherein at least one of the machines comprises machining device.

337. The apparatus of claim 321 wherein at tease one of the machines comprises a drill.

338. The apparatus of claim 321 wherein at least one of the machines comprises an automatic welder.

339. The apparatus of claim 321 wherein at least one of the machines comprises a fastening machine.

340. The apparatus of claim 321 wherein at least one of the machines comprises a combination drilling-riveting tool.

341. The apparatus of claim 321 wherein at least one of the machines comprises an inspection tool.

342. The apparatus of claim 321 wherein at least one of the machines comprises a camera.

343. The apparatus of claim 321 wherein at least one of the machines comprises a manipulator.

344. The apparatus of claim 321 wherein at least one of the machines comprises a multi-axis manipulator.

345. The apparatus of claim 321 wherein at least one of the machines comprises an articulated manipulator.

346. The apparatus of claim 321 wherein at least one of the machines comprises a grasping device.

347. The apparatus of claim 321 wherein at least one of the machines includes a moveable operating head.

348. The apparatus of claim 347 further comprising a multi-axis drive system coupled to the operating head.

349. The apparatus of claim 348 wherein the operating head is moveable in three dimensions.

350. The apparatus of claim 321 wherein the control system causes a unit of work to pass within range of a predetermined sequence of the machines.

351. The apparatus of claim 321 wherein the machines are floor-mounted.

352. The apparatus of claim 321 further comprising a workstation adjacent to the conveyor having at least one machine stationed thereat, and a transfer device positioned to move a unit of work from the conveyor to the workstation.

353. The apparatus of claim 321 further comprising a bridge crane above the conveyor having a carriage moveable across the conveyor in a direction perpendicular to the path.

354. The apparatus of claim 353 wherein the bridge crane is structured to carry a unit of work from the conveyor to the workstation.

355. The apparatus of claim 321 wherein:
 (a) the conveyor comprises an endless belt having a support surface that is substantially flat and has two edges parallel to the path,
 (b) the conveyor belt carries the plurality of units of work on its top in a single direction along a substantially horizontal path, and
 (c) the machines are supported on bases adjacent to the side of the conveyor belt during operation of the conveyor.

356. The apparatus of claim 355 wherein at least some of the machines are adjacent to each of the edges.

357. The apparatus of claim 321 wherein the control system comprises a single central controller.

358. The apparatus of claim 357 wherein the central controller is coupled to receivers at the machines with a cable having branches extending to each machine.

359. The apparatus of claim 321 wherein the central controller is coupled to receivers at the machines via modulated light waves.

360. The apparatus of claim 321 wherein the central controller further comprises a storage device holding control programs.

361. The apparatus of claim 360 wherein the central controller is further programmed to control at least some of the machines to perform different operations on different units of work.

362. The apparatus of claim 357 wherein the central controller is further programmed to control at least some of the machines to perform different operations on different units of work, through transmission of messages to cause the selection of one of the plurality of machine control command sets from the storage devices of said machines.

363. An automatic production system comprising:
 (a) a power-operated work unit transporter structured to carry a plurality of units of work in sequence along a path to or past a plurality of work stations adjacent to the transporter such that each unit of work passes each work station only once during passage along the path;
 (b) a plurality of separately operable powered machines disposed at different of the work stations; and
 (c) a plurality of transfer devices associated with at least some of the work stations and configured to move at least one of the units of work from the transporter to the work stations;
 (d) wherein the transporter and the transfer devices are coordinated to automatically transfer different units of work to different series of work stations.

364. The apparatus of claim 363 wherein each of the machines remain stationed at a respective one of the work stations during operation of the transporter.

365. The apparatus of claim 364 further comprising a master controller coupled to and coordinating the transporter and the transfer devices.

366. An automatic production system comprising:
 (a) a plural-workpiece transporter extending along a path to or past a plurality of work positions adjacent to the transporter, wherein the transporter is restricted to moving the workpieces without backtracking; and
 (b) a control system electronically coupled to the transporter and programmed to direct the transporter to cause workpieces passing along the path to offload from the transporter at a predetermined subset of the work positions and bypass the other work positions, wherein the selected subset of work positions is different for different workpieces;
whereby, when machines are stationed at different work positions, each machine can operate on some but not all of the passing workpieces.

367. The apparatus of claim 366 wherein the workpieces consist of individual units of work each secured to a pallet.

368. The apparatus of claim 366 wherein the transporter is arranged in a straight line.

369. The apparatus of claim 366 wherein the path is substantially horizontal.

370. The apparatus of claim 366 wherein the transporter is a conveyor and the workpieces are supported on top of the conveyor.

371. The apparatus of claim 370 wherein the conveyor carries a plurality of different kinds of workpieces at once along the path.

372. The apparatus of claim 370 wherein the conveyor comprises an endless belt.

373. The apparatus of claim 372 further comprising machines adjacent to the side of the conveyor belt.

374. The apparatus of claim 366 wherein the transporter comprises a chain conveyor.

375. The apparatus of claim 366 wherein the transporter comprises a flight conveyor.

376. The apparatus of claim 366 wherein the transporter is structured to provide a workpiece support surface that is substantially flat and has two edges parallel to the path.

377. The apparatus of claim 376 further comprising machines adjacent to each of the edges.

378. The apparatus of claim 366 wherein the transporter moves workpieces in a single direction.

379. The apparatus of claim 366 further comprising a cutting machine.

380. The apparatus of claim 366 further comprising a riveting machine.

381. The apparatus of claim 366 further comprising a machining device.

382. The apparatus of claim 366 further comprising a drill.

383. The apparatus of claim 366 further comprising an automatic welder.

384. The apparatus of claim 366 further comprising a fastening machine.

385. The apparatus of claim 366 further comprising a combination drilling-riveting tool.

386. The apparatus of claim 366 further comprising an inspection tool.

387. The apparatus of claim 366 further comprising a camera.

388. The apparatus of claim 366 further comprising a manipulator.

389. The apparatus of claim 366 further comprising a multi-axis manipulator.

390. The apparatus of claim 366 further comprising an articulated manipulator.

391. The apparatus of claim 366 further comprising a grasping device.

392. The apparatus of claim 366 further comprising a machine having a moveable operating head.

393. The apparatus of claim 392 further comprising a multi-axis drive system coupled to the operating head.

394. The apparatus of claim 393 wherein the operating head is moveable in three dimensions.

395. The apparatus of claim 366 further comprising a machine that includes a storage device holding a plurality of control programs, each of which can control the machine to perform different combinations of operations on a workpiece within range of the machine.

396. The apparatus of claim 395 wherein the machine is supported on a fixed base.

397. The apparatus of claim 366 further comprising a transfer device positioned to move a workpiece from the conveyor to one of the workstations.

398. The apparatus of claim 366 further comprising a bridge crane above the conveyor having a carriage moveable across the conveyor in a direction perpendicular to the path.

399. The apparatus of claim 366 further comprising a machine at each workstation and a signal receiver associated with each of the machines.

400. The apparatus of claim 399 wherein the signal receivers are separately addressable.

401. The apparatus of claim 400 further comprising a code matcher coupled to the signal receiver.

402. The apparatus of claim 400 further comprising a central controller coupled to the selectively addressable signal receivers.

403. The apparatus of claim 402 wherein the coupling is wireless.

404. The apparatus of claim 402 wherein the coupling is cabled.

405. The apparatus of claim 402 wherein the coupling is via modulated light waves.

406. The apparatus of claim 402 wherein the central controller further comprises a storage device holding machine control programs.

407. The apparatus of claim 406 wherein the central controller is further programmed to control at least some of the machines to perform different operations on different workpieces.

408. The apparatus of claim 402 wherein the central controller is further programmed to control at least some of the machines to perform different operations on different workpieces, and wherein at least one of the machines comprises:
 (a) a multi-axis manipulator having a grasping device and a multi-axis drive system coupled to the grasping device, and
 (b) a storage device holding a plurality of control programs, each of which can control the machine to perform different combinations of operations on a workpiece within range of the machine.

409. The apparatus of claim 366 wherein:
 (a) the path is substantially horizontal,
 (b) the transporter comprises an endless belt having a workpiece support surface that is substantially flat and has two edges parallel to the path,
 (c) the belt carries a plurality of workpieces at once on its top in a single direction, and
 (d) further comprising a plurality of machines, each supported on a respective base adjacent to the side of the belt during operation of the transporter.

410. The apparatus of claim 409 wherein at least some of the machines are adjacent to each of the edges.

411. An automatic production system comprising:
 (a) a plurality of tools disposed at respective work positions located spaced apart with respect to each other, and each of said tools including a respective tool controller that controls the operation of the tool,
 (b) a conveyor structured to convey units of work to respective work positions to be operated on by selected of said plurality of tools,
 (c) a remote controller located remote from said tool controllers having an output for a plurality of command control signals operable to effect control of a tool through its tool controller, and
 (d) a selective addressing system coupling the output of the remote controller to the tool controllers, wherein the selective addressing system is structured to distribute the command control signals from the remote controller to the tool controllers for application at only selected ones of said tools by the respective tool controller of each of said selected tools to control the selected tool to automatically perform tooling operations on a selected unit of work conveyed to the selected tool.

412. An automatic production system in accordance with claim 411 wherein said remote controller comprises a master controller located remotely from said tools and said conveyor and wherein said master controller simultaneously controls a plurality of pallets holding a plurality of units of work.

413. An automatic production system in accordance with claim 412 wherein said master controller simultaneously controls said plurality of tools to perform respective tooling operations on said plurality of units of work conveyed thereto.

414. A machine system for operating on a plurality of different workpieces requiring different forms of machining operations performed by a plurality of machine tools, each machine tool being located at a respective machine work station and each being capable of performing different machining operations, said machine system comprising:
    (a) a conveyor structured to move workpieces along predetermined routes to preselected of said machine work stations;
    (b) a programmable controller coupled to the conveyor and structured to select the predetermined route and specific machine work stations along the selected route to which each of said workpieces is conveyed, said predetermined routes and said preselected set of machine work stations being selectively variable for different workpieces; and
    (c) a transfer device system positioned to permit selective transfer of the workpieces to only said set of machine work stations so that each of the workpieces follows a predetermined route to have a predetermined combination of machining sequences performed thereon under the control of said programmable controller.

415. A system in accordance with claim 414 wherein:
    (a) said conveyor comprises a plurality of controllable, moveable work pallets;
    (b) said programmable controller comprises a master controller located remote from the pallets; and
    (c) wherein said master controller simultaneously controls a plurality of said pallets to select the routes and machine work stations to which said plurality of pallets are conveyed.

416. A machining system for producing articles of manufacture from a plurality of workpieces of different shape, said system comprising.
    (a) a plurality of machine tools capable of performing different machining operations on different units of work, each of said machine tools including a local controller having a preselected address;
    (b) conveyor means operable for holding a plurality of workpieces, and for conveying each workpiece to only selected of said machine tools;
    (c) transport means for transporting workpieces between said conveyor means and only said selected machine tools to permit select machining sequences to be performed on each workpiece; and
    (d) programmable control means for selectively controlling the operations of said conveyor means and said transport means for each workpiece and for selectively addressing said selected machine tools for controlling the machining operations of said selected machine tools.

417. A system for machining a plurality of different workpieces requiring different machining operations, said system comprising:
    (a) a plurality of machining means for performing variable machining operations;
    (b) means for conveying each workpiece under the control of a programmable control means along a select route of travel defined by preselected stops at only selected of said machining means;
    (c) programmable control means for selecting the route of travel and particular machining means and operations for a particular workpiece, and for controlling the conveying means so that said particular workpiece follows said selected route and stops only at said selected machining means to have particular machining operations performed thereon; and
    (d) means for selectively transferring a workpiece from said conveyor means to said selected machining means.

418. An automatic production system comprising:
    (a) a plurality of machine tools,
    (b) conveying means for conveying units of work to only selected of the machine tools for performing programmed operations on work carried to said selected tools by said conveying means,
    (c) control means for selectively addressing and controlling the operations of said plurality of machine tools in performing different operations on selected units of work conveyed to said tools,
    (d) automatic inspection means for inspecting work operated on by selected of said tools, and
    (e) means for operating said conveying means to dispose selected units of work in operative relation with respect to said automatic inspection means, and
    (f) wherein said control means also controls the operation of said automatic inspection means in a manner such that, when a unit of work is operatively aligned with said automatic inspection means, said automatic inspection means will perform a select inspection operation with respect to said unit of work.

419. An automatic production system comprising:
    (a) a plurality of addressable program controllable machine tools, each structured to perform different programmed operations on different units of work,
    (b) an automatic conveyor system structured to convey different work, units only to selected of said tools,
    (c) a locator at each tool positioned to locate work conveyed to the tool in a predetermined position to permit the tool to perform operations on the work,
    (d) an automatic programmable inspection system located adjacent to the conveyor and positioned to inspect work operated on by selected of said tools,
    (e) a controller structured to generate selected, addressed command control signals and coupled to apply the control signals to the machine tools and the inspection system for selectively controlling the operation of said tools and for controlling the operation of said automatic inspection system to perform different inspection functions with respect to different units of work, and
    (f) said automatic inspection system including a work-identification subsystem having an output for control signals and coupled to the inspection system to trigger the inspection function applied to a work unit presented for inspection.

420. An automatic production system in accordance with claim 419 wherein said automatic inspection system comprises a plurality of separately operable automatic inspection tools.

421. An automatic production system comprising:
(a) a plurality of addressable program-controllable production tool means for performing different programmed operations with respect to different units of work,
(b) automatic conveying means for conveying selected work units to stop only at selected of said tool means to permit the selected tool means to perform select operations with respect to the work units,
(c) work locating and securing means at each of said tool means for prepositioning and holding work conveyed to and stopped at each said tool means,
(d) control means for controlling the programmed operations of said tool means,
(e) said control means including (i) memory means having a plurality of command control messages recorded therein, (ii) means for controlling the reproduction of selected of said messages and (iii) means for selectively addressing and communicating said reproduced messages to control the operations of said addressed tool means,
(f) means at each tool means for (i) identifying work units conveyed by said automatic conveying means to the vicinity of the tool means and (ii) generating identifying signals, and
(g) means for employing said identifying signals to operate said reproduction control means in a manner to effect the reproduction of selected messages from said memory means and the application of said messages to control the tool means to perform selected programmed operations on the work located at said tool means, and
(h) wherein said control means is also operable for controlling the operation of said work securing means to effect the release of work secured thereby after the tool means has completed its controlled operation on the work to permit the work to be conveyed by said conveying means to another of said selected tool means.

422. An automatic production system comprising in combination:
(a) a plurality of production tools arranged to form a production line in a work area,
(b) a work conveyor including a plurality of separate work carriers and a power drive system for the carriers,
(c) a movement control system structured to cause said carriers to stop only at selected of said production tools,
(d) a positioning system structured to dispose work stopped at each tool in operative alignment with the tool,
(e) a securing device structured to hold work aligned at each tool, and
(f) a controller coupled to selectively address the plurality of tools and control the operation of each addressed tool on work operatively aligned and secured at the tool to permit the tool to execute a programmed operation on the work, and
(g) said controller further coupled to effect the release of work secured at each tool after the operation of the tool is completed to permit the work to be carried to the next selected production tool along said production line.

423. An automatic production system in accordance with claim 422 wherein:
(a) said work conveyor comprises a track supported above said tools,
(b) said plurality of carriers being supported for movement along said track, and
(c) the power drive system includes, for each carrier, a motor supported on and driving each carrier along said track parallel to said production line to carry the work to selected of said tools.

424. An automatic production system in accordance with claim 423 wherein the track is a monorail.

425. An automatic production system in accordance with claim 422 wherein:
(a) the conveyor comprises an overhead supported bi-rail track with at least one bridge crane supported for movement along said bi-rail track and at least one work carrier suspended from the bridge across each crane, and
(b) the power drive system is structured to move (i) the bridge of each crane along said bi-rail track and (ii) each suspended carrier back and forth along the crane bridge.

426. An automatic production system for performing different tool operations, such as cutting and shaping operations on different units of work, and wherein the dimensions and shapes of the workpieces vary during the tool operations thereon and wherein quality control is required to properly process work, comprising:
(a) a plurality of selectively addressable, program-controllable machine tool means for performing the different tool operations on the different units of work,
(b) automatic conveying means for operatively disposing selected of the different work units at selected machine tools,
(c) means for automatically addressing and controlling selected machine tools to operate on the work units conveyed thereto,
(d) automatic inspection means located proximate said conveying means for inspecting work after it has been operated on by selected of said tools to determine if the tools have properly performed their automatic operations on the work inspected,
(e) means for effecting predetermined relative alignment between said work and said automatic inspection means,
(f) control means for controlling the operation of said automatic inspection means to cause said inspection means to perform different programmed inspection operations on different units of work,
(g) means for identifying work operatively aligned for inspection by said automatic inspection means and generating code signals identifying said work, and
(h) means for applying said code signals to control the operation of said control means to effect selected inspection operations on different units of work operatively aligned with said inspection means.

427. An automatic production system in accordance with claim 426 wherein said automatic inspection means comprises a plurality of automatic inspection machines disposed at different locations in said production system.

428. An automatic production system in accordance with claim 426 wherein at least one of said automatic inspection machines is multi-axis in its operation.

429. An automatic production system comprising in combination:
(a) conveying means for supporting and carrying a plurality of pallets, each pallet containing at least one unit of work and being carried along a path to define a production line, (b) a plurality of production tools disposed adjacent the conveying means, with each tool being operable to perform programmed operations on work presented thereto, (c) at least one of said tools including an automatic inspection device for inspecting work fed thereto and determining the results of the operations of at least some of the others of said tools on work carried by said pallets, (d) means for aligning palletized work with selected of said tools to operatively locate the work with respect to said selected tools, and (e) means for generating selectively addressable command control messages and for selectively applying said messages to selected of said tools to predeterminately control the operation of said selected tools and said automatic inspection device when respective units of work are operatively located with respect thereto to effect preprogrammed operations by said selected tools on said work units and the automatic inspection of such work units after such operations are performed thereon.

430. An automatic production system comprising in combination:

(a) conveying means for supporting and carrying a plurality of pallets with each pallet holding at least one unit of work and being carried along a path to define a production line, (b) a plurality of production tools disposed adjacent the conveying means with each tool being operable to perform programed operations on work presented thereto, (c) a plurality of pallet transfer and support means disposed adjacent said first conveying means, with each transport and support means containing (i) means for engaging a pallet conveyed thereto by the conveying means, and (ii) means for fixedly holding said pallets at said production tools to provide the work held thereby in fixed operative relation with respect to said tools, (d) means for selectively operating said transfer and support means when a selected pallet is presented thereto by the conveying means to selectively transfer said selected pallet into operative relation with respect to a selected tool to which it is conveyed by said conveyor means, (e) means for operating each pallet engaging means at a respective tool to fixedly hold each pallet presented thereto, and (f) means for generating selectively addressable command control messages and applying said control messages to control the operation of selectively addressed tools when selected work is operatively located at the tools by the pallets to cause the tools to perform preprogrammed operations on the selected units of work.

431. An automatic production system comprising in combination:

(a) conveying means for supporting and carrying a plurality of pallets with each pallet containing at least one unit of work and travelling a path defining a production line, (b) a plurality of production tool means disposed adjacent said conveyor means, for performing programmed operations on work presented thereto, (c) addressable storage means located at each tool means for storing respective command control signals and including means for selectively reproducing control signals therefrom for controlling the tool means, (d) a plurality of transfer means disposed adjacent the conveying means for transferring pallets therefrom to respective of said tool means, and means at each tool for operatively locating work with respect to the tool means, (e) means for selectively operating said transfer means when a selected pallet containing work to be operated on by a selected tool means adjacent said transfer means is conveyed to the transfer means to cause said transfer means to transfer the selected pallet to the selected tool means, (f) control means for generating selectively addressable command control messages and means for selectively communicating respective of said messages to selected of said signal storage means, and means for recording the communicated messages in said selected signal storage means for use when reproduced thereafter in controlling respective of the tool means, and (g) means at each transfer means for (i) identifying pallets on the conveying means, (ii) activating the transfer means when selected pallets are identified to transfer said selected pallets to selected of said production tool means, and (iii) effecting control of the signal storage means of the selected tool means to reproduce selected messages stored thereby and to apply said selected messages to control the selected tool means to perform programmed operations on the work located thereat.

432. An automatic production system comprising in combination;

(a) first conveying means for supporting and carrying a plurality of pallets, each containing at least one unit of work, in a given direction defining a production line, (b) a plurality of addressable production tool means disposed adjacent said first conveying means for performing programmed operations on work presented thereto, (c) a plurality of pallet transfer means disposed adjacent said conveying means for engaging pallets on said first conveying means and for transferring said pallets to respective of said tools, (d) control means for generating command control messages, and (e) means for selectively addressing said pallet transfer means and said tools to selectively apply said command control messages to control the operations of selected of said pallet transfer means and said tools in a manner to effect the transfer of selected work-holding pallets to selected of said tools and to predeterminately control the operation of said selected tools on work held by selected of said pallets and to further effect the transfer of said pallets and work back to said conveying means after said operations have been performed on the work held by said pallets by said tools.

433. An automatic production system comprising in combination:

(a) first conveying means for supporting and carrying a plurality of pallets, each pallet holding at least one unit of work, along a given path defining a production line, (b) a plurality of production tool means disposed adjacent said first conveying means for performing programmed operation on work presented thereto, (c) a plurality of pallet transfer means disposed adjacent said fit conveying means for selectively transferring pallets to said tool means, (d) means aligned with each tool means for engaging a pallet transferred to said tool means by said transfer means, (e) support means for fixedly holding a pallet in a manner to provide the work held by said pallet in fixed operative relation with respect to the tool means, and (f) control means for generating command control signals and selectively applying said control signals to control the operations of only selected of said pallet transfer means and of said support means to effect the selective transfer of only selected work-holding pallets to only selected of said tool means and the fixed retention of said pallets at the tool means to which they are transferred to permit said tool means to perform programmed operations on the work presented thereto by said pallets.

434. An automatic production system in accordance with claim 433 wherein said control means is also operable to selectively address and control the programmed operation of each selected tool means after a selected work-holding pallet is transferred from said first conveying means to the support means at the tool means and is fixedly held in an operative position.

435. An automatic production system in accordance with claim 434 wherein said control means is also operable to selectively address and control the operation of selected of said means for fixedly holding pallets in a manner to permit same to hold a selected pallet and fixedly position work held by the pallet with respect to the tool means and to release the pallet to permit the pallet and work to be transferred from the tool support means back to said first conveying means.

436. An automatic production system in accordance with claim 433 wherein said control means is also operable to selectively address and control said pallet transfer devices, after selectively controlling the operation of a tool means to perform on work held by a pallet, to transfer pallets from the pallet support means of the tool means to said first conveying means to permit said first conveying means to carry pallets to another selected tool means adjacent said production line.

437. An automatic production system comprising in combination:

(a) a conveyor supporting and carrying a plurality of pallets in a given direction along a select path defining a production line, each pallet holding at least one unit of work, (b) a plurality of production tools disposed adjacent to said conveyor and structured to perform different programmed operations on different units of work conveyed thereto on said pallets, (c) a plurality of pallet transfer devices, located adjacent to said conveyor so as to transfer a pallet from said conveyor to dispose it and the work it holds adjacent to at least one selected production tool, (d) a securing device at each tool structured to engage and hold a pallet at a predetermined location with respect to said tool and to dispose the work held by the pallet in a fixed position with respect to the tool, within operating range of the tool, and (e) a controller structured to generate and selectively address command control messages to control selected pallet transfer devices, securing devices, and production tools: (1) to transfer selected of said pallets to selected of said tools, and (2) to perform selected programmed operations on selected work supported by said selected pallets.

438. An automatic production system in accordance with claim 437 wherein said controller is also structured to control the operations of a plurality of said tools to permit each of said selected tools to simultaneously operate on work presented thereto on said pallets.

439. An automatic production system in accordance with claim 437 wherein said securing device comprises respective pallet damping devices.

440. An automatic production system in accordance with claim 439 wherein said controller is a master controller further configured to control the operations of said securing devices to cause them to hold pallets and to fixedly position work held by said pallets with respect to an associated tool and to release the pallets to permit the pallets and work to be transferred from the associated securing device to said conveyor.

441. An automatic production system in accordance with claim 437 wherein said controller is a remote controller located remotely from said pallet transfer devices and their associated tools.

442. An automatic production system comprising in combination:

(a) first conveying means for supporting and carrying a plurality of pallets, in a given direction defining a production line each pallet containing at least one unit of work, (b) a plurality of production tools disposed adjacent said first conveying means, with each tool being operable to perform programmed operations on work presented thereto, (c) said tools including a plurality of cutting tools operable to cut and remove material from work presented thereto, (d) said tools also including at least one automatic inspection means for inspecting work fed thereto and detecting the results of the operation of said tools in removing material from said work, (e) means for transferring palletized work from said first conveying means to selected of said tools, and (f) control means for generating command control messages and selectively distributing and applying said messages to control the operation of said pallet transfer means, selected of said mache tools, and said automatic inspection device in a manner to effect the transfer of selected work to only said selected tools, to permit the tools to perform selected programmed operations on work transferred thereto, and to effect the automatic inspection of said work after it is operated on by at least one of said machine tools to automatically determine if the machine tool has properly performed a programed operation on said work.

443. An automatic production system in accordance with claim 442 including a feedback control system for controlling the operation of said automatic inspection device to permit the device to perform different inspection operations on different units of work.

444. An automatic production system comprising:

(a) plurality of machine tools, (b) automatic conveying means for conveying units of work to only selected of said machine tools for performing programmed operations on work carried to said selected tools by said conveying means, (c) control means for controlling the operations of said machine tools when work is disposed at said tools by said conveying means to permit different programmed operations to be performed on different units of work, and (d) an automatic inspection means disposed proximate said automatic conveying means, (e) said automatic inspection means being programmable in its operation, (f) said control means being operable to control said conveying means to feed a selected unit of work to said automatic inspection means and to controllably program the operation of said inspection means when a unit of work is disposed thereat to permit said automatic inspection means to perform a selected programmed inspection operation on said work.

445. An automatic production system in accordance with claim 444 including feedback control means for said automatic inspection means responsive to a signal generated by said control means for controlling the operation of said automatic inspection means to perform selected inspection operations on different units of work fed to said automatic inspection means.

446. An automatic production system in accordance with claim 444 wherein said automatic inspection means is located at one of said tools which is operable to machine work, said automatic inspection means being operable to inspect work which is machined by the tool.

447. An automatic production system in accordance with claim 446 wherein said machine performs a cutting cycle, and said automatic inspection means is operable to inspect work at the tool during the cutting cycle.

448. An automatic production system comprising in combination:

(a) first means including a plurality of self-propelled conveying means for conveying a plurality of units of work in sequence along a path, (b) second means including a plurality of variably operable powered tools disposed at different locations adjacent said path, (c) third means for generating selectively addressable command control signals in the form of separate machine control messages for use in controlling the operation of said tools, (d) fourth means at each of said tools for receiving selectively addressed messages generated by said third means, (e) fifth means for transmitting selectively addressed messages generated by said third means to said receiving means of selected of said tools, (f) sixth means at each of said tools for applying the selectively received messages to control the operation of said tool, and (g) seventh means for detecting the presence of work carried by said conveying means when said work is operatively aligned with respective of said tools and for initiating the generation and application of select control signals to control the operation of the tool at which the work is aligned, (h) said programmed operation on said work being in accordance with the information defined by the selectively addressed messages received at the tool.

449. An apparatus in accordance with claim 448 wherein each of said tools is operable to perform controlled operations on work supported by said conveying means while said conveying means is stopped at the tool.

450. An apparatus in accordance with claim 448 wherein at least certain of said tools are numerically controllable tools and said selectively addressed control messages are operable to numerically control the operation of said tools to perform programmed operations on work supported by respective of said self-propelled conveying means.

451. An automatic production system comprising in combination:

(a) first means including self-propelled conveyors for conveying a plurality of units of work in sequence along a path, (b) second means including a plurality of separately operable and selectively addressable powered tools disposed at different locations adjacent said given path, (c) third means operable to generate selectively addressable command control signals in the form of separate machine control messages for use in controlling the operation of respective of said selectively addressable tools, (d) fourth means having a specific address at each of said tools for selectively receiving only correspondingly addressed messages generated by said third means, (e) fifth means for transmitting selectively addressed messages generated by said third means to respective of said receiving means of selected of said tools for controlling the operation of said tools, and (f) sixth means for detecting the presence of work on said conveying means when said work is operatively aligned with respective of said tools and for initiating the generation and application of selectively addressed control signals to control the operation of selected of the tools at which said work is aligned to cause said tools to perform a programmed operation on the work supported by the conveying means, (g) said programmed operation on said work being in accordance with the information defined by the selectively addressed messages received at said tool.

452. An automatic production system comprising in combination:

(a) a power-operated conveyor for a plurality of units of work moveable along a path, (b) a plurality of separately operable powered tools disposed at different locations adjacent said conveyor, (c) a selectively addressable command control signal generator, said command control signals arranged in the form of separate message, for use in controlling the operation of selective of said tools, (d) a receiver at each of said tools structured to receive messages from said signal generator, said receiver including a specific address, (e) a transmission system for specifically addressed messages coupling said signal generator and said specifically addressable receivers of selected of said tools, wherein each of said receivers is coupled to the corresponding powered tool so as to permit application of the selectively received messages to control the operation of said selected tools, and (f) a detector positioned to detect the presence of work conveyed by said conveyor when said work is aligned with a respective tool, wherein said detector is coupled to the corresponding powered tool so as to apply select command control signals received by the receiver corresponding to said tool to cause the tool to perform a predetermined operation on the work aligned thereat defined by said select command control signals.

453. An automatic production system in accordance with claim 452 wherein each of said tools includes an automatic manipulator having a manipulation arm assembly and an operating head supported thereby containing a power-operated device, a controller for said power-operated device which is controlled in its operation by part of the selectively received messages applied to control the operation of said tool on work aligned thereat.

454. An automatic production system comprising in combination:
(a) a power-operated conveyor structured to carry a plurality of units of work in sequence along a path,
(b) a plurality of separately operable powered tools disposed at different locations adjacent said conveyor,
(c) a master controller having an output for selectively addressed command control signals arranged in the form of separate messages, and
(d) a receiver at each of said tools including a specific address, said receiver structured to apply only correspondingly addressed messages received from said master controller to control the operation of the tool to selectively operate on work delivered by said conveyor to said selected tool.

455. The apparatus of claim 454 further comprising a selectively addressable receiver associated with the conveyor, which receiver is coupled to the conveyor so as to apply correspondingly addressed command control signals from the master controller to control operation of the conveyor.

456. An automatic production system comprising in combination:
(a) first means including a power-operated conveying means for conveying a plurality of units of work in sequence along a path,
(b) second means including a plurality of separately addressable tools disposed at different locations adjacent said conveying means,
(c) third means including control means operative to generate command control signals in the form of separate messages for use in selectively addressing and controlling the operation of selected of said tools, and
(d) fourth means at each of said tools for receiving, recording and reproducing selectively addressed command control signals transmitted from said control means and for applying same to automatically operate on work delivered by said conveying means to said tool.

457. An automatic production system comprising in combination:
(a) first means including power-operated conveying means for conveying a plurality of units of work along a path,
(b) second means including a plurality of individually addressable and separately operable powered tools disposed at different locations adjacent said conveying means,
(c) third means for generating selectively addressed command control signals in form of separate messages for communication to correspondingly addressed tools for use in controlling the operation of said tools,
(d) fourth means associated with each of said tools and having an individual address identifying said tool for selectively receiving and recording correspondingly addressed messages communicated from said third means and for selectively reproducing said recorded control signals when work is positioned at said machine,
(e) fifth means for selectively communicating addressed messages generated by said third means to said correspondingly addressed fourth means of selected of said tools and means for applying the received and reproduced messages to control the operation of said respective tools, and
(f) sixth means for detecting the presence of and identifying work conveyed by said conveying means when said work is operatively aligned with a respective tool and for applying select command control signals reproduced from recorded messages to cause the tool to perform a predetermined operation on the work at the tool in accordance with the tool control function defined by said select command control signals.

458. An automatic production system comprising in combination:
(a) conveying means for a plurality of work holding pallets each supporting at least one unit of work, said conveying means being operable to convey said pallets along a select path,
(b) a plurality of work stations located adjacent said path, each work station having a machine tool and power operated means for holding and locating a work pallet at the machine tool,
(c) each of said machine tools having a power operated tool, first motor means for effecting multi-axis movement of said tool, and respective control means for each of said motor means,
(d) remote control signal generating means for generating addressed tool control signals in the form of command control messages,
(e) each of said work stations having an addressable message signal receiving and recording means,
(f) means for operating said remote control signal generating means to cause it to generate and transmit respective of said addressed command control messages to correspondingly addressed work station receiving and recording means to effect receipt and recording of select messages at select work stations,
(g) means for identifying each of said work holding pallets when the pallet is conveyed by said conveying means to select work stations and for generating control signals, and
(h) means for applying said latter control signals to effect the predeterminate positioning of said work with respect to the tool of the select work station.

459. An automatic production system in accordance with claim 458 wherein the work is predeterminately located on the pallets and the pallets are held and prepositioned at the work stations.

460. An automatic production system in according with claim 458 wherein said pallets contain readable codes and said identifying means scans said codes to identity said pallets at said work stations.

461. An automatic production method comprising:
(a) providing a plurality of automatic programmable machines having tool controllers and spacing said machines apart from each other;
(b) supporting a unit of work between first and second of said machines; and
(c) controllably operating said first and second machines by (1) generating from a common source a plurality of machine control commands defining information for controlling the operation of said first and second machines, (2) addressing said machine control commands to reference the first and second machines, (3) distributing the commands on a common communication channel connecting the plurality of machines, and (4) applying said machine control commands addressed to the first and second machines to tool controllers of only said first and second machines, to cause said fast and second machines to simultaneously perform preprogrammed tool operations on the unit of work supported between said machines.

462. The method of claim 461 wherein said act of generating a plurality of machine control commands includes reproducing selected stored commands from a program storage device.

463. The method of claim 461 further comprising repeatedly replacing the unit of work with another unit of work.

464. The method of claim 463 wherein said act of replacing the units of work comprises disposing a plurality of workpieces along a conveyor.

465. The method of claim 463 wherein said act of replacing the units of work comprises disposing each workpiece on moveable pallets.

466. The method of claim 463 further comprising generating and applying a plurality of machine control commands from the common source to control the replacement of the units of work.

467. A method of automatically operating on work comprising:
(a) spacing a plurality of automatic machines apart from each other along a production line, each of said machines having a local tool controller that controls the machine to perform respective automatic tool operations on a unit of work to alter it in respective predetermined ways;
(b) conveying a unit of work along the production line only to work locating positions proximate to a selected plurality of the series of spaced-apart machines, including supporting the unit of work at a work locating position proximate to a first and a second of said machines; and
(c) controllably operating said first and second machines to simultaneously operate on said selected unit of work by (1) generating on the output of a master controller located remote from said automatic machines a plurality of machine control commands defining information controlling the operation of said first and second machines, (2) communicating the commands to the first and second machines respectively on a common communications channel together with addresses identifying the respective machines, and (3) applying said machine control commands to respective of said tool controllers of said first and second machines to cause the machines controlled thereby to simultaneously perform automatic tool operations on the selected unit of work supported at said work locating position.

468. The method of claim 467 further comprising supporting said unit of work on a conveyor extending along said production line between at least two of said machines, and conveying said unit of work to the work locating position between said machines.

469. The method of claim 468 further comprising positioning and detaining said work at said work locating position between said machines while said machines simultaneously operate on said work.

470. The method of claim 467 wherein part (c)(1) comprises storing said plurality of machine control commands in a storage device of a controller located remote from said machines and reproducing selected of said plurality of machine control commands from said remote storage device.

471. An automatic production method comprising:
(a) stationing a plurality of automatic machines along a production line, each of said machines including a respective machine controller;
(b) preselecting one of a number of possible sequences of machines to perform a preprogrammed sequence of operations on a selected unit of work;
(c) conveying the unit of work to a work station located between two of said stationed automatic machines in the sequence that is preselected for the unit of work;
(d) automatically generating from a common source and applying a plurality of machine control commands to the respective machine controllers of said two machines to control said two machines to simultaneously operate on said unit of work; and
(e) automatically delivering said unit of work in a single pass along said production line only to said preselected sequence of said plurality of machines and controllably operating said selected machines to automatically perform said preprogrammed sequence of production operations on said unit of work to alter it in a predetermined way.

472. A method of performing a plurality of different operations on a plurality of different workpieces by a plurality of powered machines at respective work stations, said method comprising:
(a) conveying each of the different workpieces under the control of a programmable controller in a single pass along a predetermined route to only selected work stations at which an stationed selected of a plurality of machines, some of the workpieces being conveyed to different of the work stations than others;
(b) selectively transferring each of said respective workpieces under the control of the programmable controller to only said work stations in said respective preselected sequence, and controlling the machines at each of said preselected work stations to perform different respective combinations of tooling operations on each of said workpieces under the control of the programmable controller; and
(c) conveying at least one of said workpieces to a work station located between two of said selected machines, and controlling said two machines with the programmable controller to simultaneously operate on said workpiece to alter it in a predetermined way with both machines.

473. An automatic production method comprising:
(a) providing a plurality of automatic programmable machines having machine controllers holding a plurality of separately addressable machine command sets defining information controlling the operation of said machine, and spacing said machines at stationary locations apart from each other;
(b) supporting a unit of work between first and second of said machines; and
(c) controllably operating said first and second machines by (1) generating from a common source a plurality of machine control commands defining operation of said first and second machines, and (2) applying said machine control commands to the machine controllers of said first and second machines to cause said machine controllers to address and apply selected of the machine command sets to cause said first and second machines to simultaneously perform preprogrammed operations on the unit of work supported between said machines.

474. The method of claim 473 further comprising repeatedly replacing the unit of work between the first and second machines with another unit of work.

475. The method of claim 474 wherein providing the machines includes disposing the first and second machines on opposite sides of the conveyor and wherein said act of replacing units of work comprises disposing a plurality of units of work along a conveyor and operating the conveyor to carry a plurality of the units of work simultaneously along the conveyor while a unit of work is being moved into a position between the first and second machines.

476. The method of claim 474 wherein said act of replacing units of work comprises disposing each unit of work on moveable pallets.

477. The method of claim 474 further comprising generating and applying a plurality of control commands from the common source to control the replacement of the units of work.

478. The method of claim 473 wherein generating a plurality of machine control commands includes reproducing selected stored commands from a program storage device.

479. An automatic production method comprising:
(a) providing a plurality of automatic programmable machines having tool controllers containing a plurality of separately addressable programs and spacing said machines apart from each other;
(b) conveying a unit of work in a single direction along an open-path production line only to a selected plurality of a series of stationary work stations adjacent to the machines, including stopping and supporting the unit of work at a first of the stationary work stations between a first and a second of said machines; and
(c) controllably operating said first and second machines by (1) generating from a common source a plurality of machine control commands defining information for controlling the operation of said first and second machines, and (2) applying said machine control commands to tool controllers of said first and second machines to cause each of said first and second machines to select one of the programs and apply it to perform preprogrammed operations on the unit of work supported between said machines at the first workstation.

480. The method of claim 479 wherein said act of generating a plurality of machine control commands includes reproducing selected stored commands from a program storage device.

481. The method of claim 479 further comprising repeatedly replacing the unit of work with another unit of work.

482. The method of claim 481 wherein said act of replacing work units comprises disposing a plurality of units of work at the work station on moveable pallets.

483. The method of claim 481 further comprising generating and applying a plurality of control commands from the common source to control the replacement of the units of work.

484. A method of automatically operating on work comprising:
(a) stationing a plurality of automatic machines apart from each other along a production line, each of said machines having a local tool controller holding a plurality of separately addressable machine command sets that controls the machine to perform respective automatic tool operations on a unit of work to alter it in respective predetermined ways;
(b) supporting a selected unit of work at a work locating position proximate to a first and a second of said machines; and
(c) controllably operating said first and second machines to simultaneously operate on said selected unit of work by (1) generating from a common source a plurality of machine control commands defining selected of the machine command sets for controlling the operation of said first and second machines, and (2) applying said machine control commands to respective of said tool controllers of said first and second machines to cause the machines controlled thereby to address and apply the respective selected machine command sets to simultaneously perform automatic operations on the selected unit of work supported at said work locating position.

485. The method of claim 484 further comprising supporting said unit of work on a conveyor extending along said production line between at least two of said machines, and conveying said unit of work to the work locating position between said machines.

486. The method of claim 485 further comprising positioning and detaining the unit of work at said work locating position between said machines while said machines simultaneously operate on said work.

487. The method of claim 484 wherein generating a plurality of machine control commands from a common source comprises storing said plurality of machine control commands in a storage device of a controller located remote from said machines and reproducing selected of said plurality of machine control commands from said remote storage device.

488. The method of claim 484 wherein generating a plurality of machine control commands from a common source comprises generating the machine control commands on the output of a master controller located remote from said automatic machines and communicating the commands to the first and second machines respectively on a common communications channel together with addresses identifying the respective machines.

489. A method of automatically operating on work comprising:
(a) spacing a plurality of automatic machines apart from each other along a production line, each of said machines having a local tool controller that controls the tool to perform respective automatic tooling operations on units of work;
(b) applying selected of a plurality of commands to control the conveying of a selected unit of work in a single direction along the production line and transferring the unit of work off the conveyor only to a plurality of selected work locating positions proximate to selected of the machines, including a first position proximate to a first and a second of said machines; and
(c) applying others of the plurality of commands to cause said first and second machines to simultaneously operate on said selected unit of work by applying a plurality of said commands defining information for controlling the operation of said first and second machines to respective of said tool controllers of said first and second machines to cause the machines controlled thereby to simultaneously perform automatic operations on the selected unit of work supported at said first work locating position to physically alter the unit of work in a selected way.

490. The method of claim 489 further comprising positioning and detaining said unit of work at said first work locating position between said machines while said machines simultaneously operate on said work.

491. The method of claim 489 further comprising storing said plurality of commands in a storage device of a controller located remote from said machines and reproducing selected of said plurality of commands from said remote storage device.

492. The method of claim 489 wherein applying the commands includes generating the commands on the output of a master controller located remote from said automatic machines and communicating the commands to the first and second machines respectively on a common communications channel together with addresses identifying the respective machines.

493. An automatic production system comprising:
(a) a plurality of automatic machines, each provided with a respective controller and located so that said machines are spaced apart from each other,
(b) a communication channel common to the plurality of machines,
(c) a workpiece support positioned between a first and second of said machines,
(d) a command controller coupled to the common communication channel and structured to control said first and second machines to operate simultaneously on at least one workpiece supported by said workpiece support by selectively (i) generating a plurality of sis as control messages defining information for controlling operation of said first and second machines, (ii) addressing said control messages with addresses defining said first and second machines, and (iii) transmitting said control messages to respective controllers of said first and second machines to cause the first and second machines to operate on said workpiece.

494. The system of claim 493 wherein said command controller includes a program store and a transducer that reproduces selected signals from the program store as command control messages.

495. The system of claim 493 wherein said workpiece support is moveable.

496. The system of claim 495 wherein said moveable workpiece support comprises a conveyor that supports a plurality of workpieces.

497. The system of claim 495 wherein said workpiece support comprises a moveable pallet.

498. The system of claim 495 wherein said command controller also controls the movement of said workpiece support.

499. An automatic production system comprising:
(a) a plurality of automatic machines located at respective stations, each having a respective controller holding a plurality of separately addressable machine command sets defining information controlling the operation of said machine,
(b) a workpiece support positioned between a first and second of said stationary machines, and
(c) a command controller coupled to said first and second machines to apply generated control messages to respective controllers of said first and second machines to select machine command sets of each controller, thereby causing said first and second machines to simultaneously perform preprogrammed operations on said workpiece supported on said workpiece support.

500. The system of claim 499 wherein said command controller includes a program store and a transducer that reproduces selected signals from the program store as command control messages.

501. The system of claim 499 wherein said workpiece support is moveable.

502. The system of claim 501 wherein the workpiece support comprises a conveyor.

503. The system of claim 502 wherein said conveyor supports a plurality of workpieces.

504. The system of claim 501 wherein sad workpiece support comprises a moveable pallet.

505. The system of claim 501 wherein said command controller also controls the movement of said workpiece support.

506. An automatic production system comprising:
(a) a plurality of automatic machines, each provided with a respective controller and located so that said machines are spaced apart from each other,
(b) a workpiece transporter,
(c) a sequence of workpiece supports stationed adjacent to the transporter, each workpiece support positioned adjacent to at least one of the machines, including a first workpiece support between a first and second of said machines,
(d) a plurality of transfer devices, each positioned adjacent to the transporter and one of the workpiece supports, and
(e) a command controller coupled to the transfer devices and programmed to control the transfer devices to transfer a workpiece from the transporter to a selected set of the sequence of the workpiece supports, as the workpiece moves past the sequence of workpiece supports, wherein the selected set of workpiece supports is different for some workpieces than for others, and wherein at least some of the workpieces pass to the first workpiece support, to allow said first and second machines to operate simultaneously on a workpiece supported by said first workpiece support.

507. The system of claim 506 wherein said command controller includes a program store and a transducer that reproduces selected signals from the program store as command control messages for the first and second machines.

508. An automatic production method comprising:
(a) spacing apart a plurality of automatic powered machines along a production line, each of said machines including a respective controller;
(b) providing at least some of said plurality of machines so that they can be controllably moved along said production line;
(c) preselecting one of a number of different possible sequences of machines to perform a preprogrammed sequence of operations that alter a selected unit of work;
(d) automatically delivering said unit of work in a single direction along said production line only to a preselected sequence of stationary positions along the line, so that only the machines of said preselected sequence of machines operate on the unit of work in a predetermined order;
(e) automatically generating and applying a plurality of machine control commands to move selected of said moveable machines along said production line; and
(f) automatically generating and applying a plurality of machine control commands to said respective controllers of said preselected sequence of machines to controllably operate said selected machines to automatically perform said preprogrammed sequence of operations on said unit of work, while the unit of work is held in said stationary positions.

509. The method of claim 508 wherein said act of automatically delivering a unit of work to a preselected sequence of stationary positions comprises placing said unit of work on one of a plurality of moveable pallets and applying control commands to control the delivery of the pallet carrying said unit of work to selected stationary positions.

510. The method of claim 508 wherein said act of automatically delivering a unit of work to a preselected sequence of stationary positions comprises placing said unit of work on one of a plurality of moveable, coded pallets, using the code each time a pallet arrives adjacent to a work station to determine whether the unit of work on the pallet should be operated on by a machine at that work station.

511. The method of claim 508 wherein said act of automatically delivering a unit of work to a preselected sequence of stationary positions includes placing said unit of work on one of a plurality of pallets moveable along a track.

512. The method of claim 511 wherein said act of placing said unit of work on one of a plurality of pallets comprises supporting said unit of work with a work carrier supported by at least one overhead track.

513. The method of claim 508 wherein said act of automatically delivering units of work to a preselected sequence of stationary positions includes placing said units of work in spaced apart relationship on a belt conveyor.

514. The method of claim 508 wherein said act of moving selected of said moveable machines comprises placing each of said moveable machines on a moveable carriage and applying carriage control commands to move the carriage along the production line.

515. The method of claim 508 wherein said act of moving selected of said moveable machines includes supporting each of said moveable machines on one of a plurality of carriers moveable along a track.

516. The method of claim 508 further comprising placing said moveable machines in spaced-apart relationship along a track.

517. The method of claim 516 further comprising supporting each of said moveable machines with a carrier supported by at least one overhead track.

518. The method of claim 508 further comprising the act of automatically controlling said selected moveable machines to operate further on said unit of work as the work is conveyed along the production line.

519. The method of claim 508 further comprising applying a plurality of automatic machine control commands to at least two of said moveable machines to cause them to operate on a unit of work simultaneously.

520. An automatic production method for performing a plurality of different production operations on a plurality of different workpieces by a plurality of automatic machines at respective work stations, said method comprising:
(a) simultaneously conveying each of the different workpieces under the control of a programmable controller along a predetermined route, each workpiece being conveyed to selected work stations and each workpiece being conveyed only to work stations corresponding to a preselected sequence, wherein the sequence for some workpieces is different than the sequence for other workpieces;
(b) providing at least some of said plurality of automatic machines so that they can move along said predetermined route;
(c) selectively transferring each of said workpieces under the control of the programmable controller to only said work stations in said respective preselected sequence;
(d) automatically generating and applying a plurality of machine control commands to cause selected of said moveable machines to be conveyed to said work stations; and
(e) automatically controlling the respective machine at each of said selected work stations to perform different respective combinations of operations on each of said workpieces.

521. The method of claim 520 further comprising automatically controlling at least two of said selected moveable machines to operate on said workpiece simultaneously.

522. An automatic production method comprising:
(a) providing a plurality of automatic programmable machines having tool controllers and spacing said machines apart from each other along a production line;
(b) generating a plurality of control commands and applying them to automatically deliver a unit of work to, and support it at, a position between first and second of said machines;
(c) providing at least one of said first and second machines so that it can be controllably moved along the production line;
(d) controllably operating said first and second machines by (1) generating from a common source a plurality of machine control commands defining information for controlling the operation of said first and second machines, and (2) applying each of said machine control commands to tool controllers of said first and second machines to cause said first and second machines to simultaneously perform preprogrammed tool operations on the unit of work supported between said machines; and
(e) generating additional machine control commands from the common source and applying the additional commands to cause said moveable machine to move along said production line.

523. An automatic production method for producing articles of manufacture from a plurality of different workpieces comprising:
(a) providing a plurality of program-controlled machines along a production line, each machine being capable of performing a plurality of different operations;
(b) structuring at least some of said plurality of machines so that they can move along the production line;
(c) supporting a plurality of workpieces simultaneously with a conveyor;
(d) operating said conveyor to simultaneously convey said workpieces along the production line past each of a series of work stations in sequence, and reading a code carried with the workpiece and applying the code to transfer each of said workpieces between said conveyor and a preselected set of the work stations to effect a predetermined sequence of operations on each workpiece, wherein some of the workpieces are transferred to a different set of the work stations of the series than others of the workpieces;
(e) generating and applying a plurality of machine control commands to cause selected of said moveable machines to move along a path proximate to said conveyor to perform a operation on selected workpieces at the work stations; and
(f) automatically generating and selectively applying machine control commands to automatically control (1) the motion of preselected set of machines that operates on each of said workpieces, and (2) the particular operations performed by each of the machines on each workpiece.

524. The method of claim 523 further comprising generating a plurality of the machine commands and applying them to at least two machines to cause then to simultaneously operate on a single workpiece at one of the work stations.

525. A method for performing automatic operations on a plurality of units of work, comprising:
  (a) conveying a plurality of units of work on a conveyor along a predetermined path past a predetermined sequence consisting of a plurality of program-controllable machines, some units of work having a different predetermined sequence than others, wherein at least one of said machines is moveable relative to said conveyor;
  (b) with respect to a first selected machine:
    (1) generating a plurality of machine control commands on the output of a computer and addressably communicating respective of said machine control commands to the selected machine;
    (2) storing in an addressable memory at said selected machine at least some of said communicated machine control commands, wherein the memory contains, at different addresses, different sets of machine control commands, and wherein each set of machine control commands controls the movement of the selected machine or the operation of the selected machine to alter an aligned unit of work; and
    (3) determining at the machine an address in the memory of the selected machine from which to reproduce command control messages and reproducing, from that address, at least a portion of said stored machine control commands and applying the reproduced commands to control the operation of said selected machine to cause the selected machine to move into alignment with a select unit of work at a stationary location and to automatically perform a predetermined operation on the select unit of work altering it in a predetermined fashion, wherein the selected machine is in the sequence that is predetermined for the select unit of work; and
  (c) determining when the predetermined operation on the select unit of work is completed and automatically conveying the unit of work to a selected second of said plurality of machines and repeating steps (1) through (3) to cause said selected second machine to perform a further predetermined operation altering the unit of work.

526. The method of claim 525 further comprising generating further control commands on the output of said computer to control the movement of said conveyor.

527. The method of claim 525 further comprising controllably moving one of said moveable machines to continue operating on said unit of work while said unit of work is conveyed along said conveyor.

528. The method of claim 525 further comprising controllably moving two of said moveable machines to perform simultaneous operation on a select unit of work at a stationary location.

529. An automatic production method for operating on selected transported workpieces with selected of a plurality of automatic machines, each of said machines having a respective base supporting an operating end capable of supporting at least one individual tool, said method comprising:
  (a) generating from an electronic storage a plurality of machine control commands;
  (b) applying selected of said generated machine control commands to control transport of workpieces along a substantially horizontal path that defines a production line;
  (c) directing other of said generated machine control commands to selected of said machines;
  (d) applying selected of said directed machine control commands to move selected of the machines parallel and adjacent to said production line independently of the other machines to align the selected machines with workpieces along the production line, wherein at least one of the workpieces is aligned with a predetermined subset of machines in a predetermined sequence, and wherein at least another of the workpieces is not aligned with the same predetermined subset of machines in the same sequence; and
  (e) applying other of said directed machine control commands to cause the individual tools of each of the machines to perform a tool operation altering each workpiece held at a stationary location aligned with each machine.

530. The method of claim 529 wherein controlling the transport of workpieces includes placing each of said workpieces on a moveable pallet and applying control commands to control delivery of the pallets to selected machines.

531. The method of claim 529 wherein controlling the transport of workpieces includes placing said workpieces on a plurality of pallets moveable along a track.

532. The method of claim 531 wherein placing said workpieces on a plurality of pallets comprises supporting one of said workpieces with a work carrier supported by at least one overhead track.

533. The method of claim 529 wherein controlling the transport of workpieces includes placing said workpieces in spaced-apart relationship along a conveyor.

534. The method of claim 529 wherein moving selected of said machines comprises applying control commands to control a moveable carriage supporting the machine, causing the machine to move along the production line.

535. The method of claim 534 wherein moving selected of said machines includes supporting each of said moveable machines on a carriage that moves along a track.

536. The method of claim 535 further comprising supporting each of said machine carriages by at least one overhead track.

537. The method of claim 529 wherein moving selected of said machines includes placing said moveable machines in spaced-apart relationship along a track.

538. The method of claim 529 including applying control commands to cause both a selected moveable machine and a workpiece aligned with the machine to move along the production line after the machine operates on the workpiece.

539. The method of claim 529 wherein causing a selected machine to become aligned with a workpiece includes applying control commands to cause both the selected moveable machine and the workpiece to stop along the production line.

540. The method of claim 539 wherein causing the selected moveable machine and the workpiece to stop along the production line comprises temporarily supporting the workpiece at a stationary work station adjacent to the production line.

541. The method of claim 540 wherein aligning said machine with said workpiece comprises sensing that a workpiece moving along the production line has reached the work station and stopping the moveable machine adjacent to the work station.

542. The method of claim 529 further comprising applying other of said directed machine control commands to cause the operating end of one of the selected machines to execute multi-axis motion with respect to a workpiece aligned with said machine.

543. The method of claim 529 further comprising storing the directed machine control commands in an addressable, electronic memory supported by the base of each of the selected machines, and wherein parts (d) and (e) include reproducing the stored machine control commands from addresses that are determined at the machines.

544. The method of claim 529 further comprising pre-storing in an addressable, electronic memory supported by the base of each of the selected machines a plurality of sets of machine control commands operative to control a tool operation, and wherein part (e) comprises:
   (a) applying one of said directed machine control commands to select one of said sets of stored machine control commands;
   (b) reproducing from said memory said selected set of stared machine control commands; and
   (c) applying said reproduced set of stored signals to perform said tool operation.

545. The method of claim 544:
   (a) wherein directing commands to selected of said machines comprises transmitting signals using wireless communication;
   (b) further comprising moving a plurality of said selected machines to become aligned with a workpiece along the production line; and
   (c) wherein performing a tool operation comprises operating on said workpiece simultaneously with said plurality of machines.

546. The method of claim 545 further comprising applying other of said transmitted machine control commands to cause the operating end of one of the selected machines to execute multi-axis motion with respect to a workpiece aligned with said machine, further comprising storing the transmitted machine control commands in an addressable, electronic memory supported by the base of each of the selected machines, and wherein parts (d) and (e) include reproducing the stored machine control commands from addresses determined at the machine.

547. The method of claim 544 wherein each of said prestored sets of machine control commands is associated with one of a plurality of different types of workpieces on the production line.

548. The method of claim 547 wherein directing commands to selected of said machines comprises transmitting signals using wireless communication, and wherein said transmitted machine control commands are applied to cause each of said plurality of different types of workpieces on said production line to have different machines operating thereon.

549. The method of claim 529 wherein aligning said machine with said workpiece comprises sensing that a workpiece moving along the production line has reached a predetermined position relative to said machine.

550. The method of claim 549 wherein said sensing comprises detecting a surface of the workpiece with an electronic limit switch.

551. The method of claim 529 wherein directing commands to selected of said machines comprises transmitting signals using wireless communication.

552. The method of claim 551 further comprising applying other of said transmitted machine control commands to cause the operating end of one of the selected machines to execute multi-axis motion with respect to a workpiece aligned with said machine, further comprising storing the transmitted machine control commands in an addressable, electronic memory supported by the base of each of the selected machines, and wherein parts (d) and (e) include reproducing the stored machine control commands from an address that is determined at the machines.

553. The method of claim 529 further comprising moving a plurality of said selected machines to become aligned with a workpiece on the production line, and wherein performing a tool operation comprises operating on said workpiece simultaneously with said plurality of machines.

554. The method of claim 529 wherein said generated machine control commands are applied to cause each of a plurality of different types of workpieces on the production line to have different tool operations performed thereon.

555. The method of claim 554 wherein said generated machine control commands are applied to cause each of a plurality of different types of workpieces on the production line to have different machines operating thereon.

556. The method of claim 529:
   (a) further comprising pre-storing in an addressable, electronic memory supported by the base of each of the selected machines a plurality of sets of machine control commands operative to control a tool operation;
   (b) wherein each of said pre-stored sets of machine control commands is associated with one of a plurality of different types of workpieces on the production line;
   (c) wherein part (c) comprises transmitting signals using wireless communication;
   (d) wherein part (d) comprises moving the machines to cause a different selected subset of machines to operate on each of said plurality of different types of workpieces; and
   (e) wherein part (e) comprises:
      (1) applying one of said transmitted machine control commands to select one of said sets of stored machine control commands, wherein said transmitted command depends on which type of workpiece is aligned with the machine;
      (2) reproducing from said memory said selected set of stored machine control commands; and
      (3) applying said reproduced set of stored commands to perform said tool operation.

557. An automatic production method comprising:
   (a) providing a plurality of automatic programmable machines having tool controllers and spacing said machines apart from each other along a production line;
   (b) generating a plurality of control commands to automatically convey a unit of work in a single direction along an open-path production line, including stopping and supporting the unit of work at a stationary work station between first and second of said machines;
   (c) providing at least one of said first and second machines so that it can be controllably moved along the production line; and
   (d) controllably operating said first and second machines by (1) generating a plurality of machine control commands defining information for controlling the operation of said first and second machines from a common source and (2) applying said commands to cause said moveable machine to move along said production line to the work station and to the tool controllers of said first and second machines to cause said first and second machines to simultaneously perform preprogrammed operations on the unit of work supported between said machines.

558. An automatic production method comprising:
   (a) spacing apart a plurality of automatic machines along a production line, each of said machines including a respective controller;

(b) providing at least some of said plurality of automatic machines so that they can be controllably moved along said production line;

(c) preselecting one of a number of possible sequences of machines to perform a preprogrammed sequence of operations on a selected unit of work;

(d) generating and applying a plurality of control commands from a common source and applying some of the control commands to deliver the unit of work in a single pass along said production line only to a preselected series of stationary work stations adjacent to the production line;

(e) applying others of the plurality of control commands to move selected of said moveable machines along said production line to said work stations; and (f) applying others of the plurality of control commands to said respective controllers of said preselected sequence of machines to controllably operate said selected machines to automatically perform said preprogrammed sequence of production operations on said unit of work at said work stations.

559. The method of claim 558 further comprising applying selected of the plurality of control commands to cause at least two of said moveable machines to operate on the unit of work simultaneously.

560. The method of claim 558 wherein said act of delivering the unit of work to selected machines comprises placing said unit of work on one of a plurality of moveable pallets and applying control commands to control the delivery of the pallet carrying said unit of work to selected machines.

561. The method of claim 558 wherein said act of delivering the unit of work to selected machines comprises placing said unit of work on one of a plurality of moveable, coded pallets and using the code each time a pallet arrives adjacent to a work station to determine whether the unit of work on the pallet should be operated on by a machine at that work station.

562. The method of claim 558 wherein said act of delivering the unit of work to selected machines includes placing said unit of work on one of a plurality of pallets moveable along a track.

563. The method of claim 562 wherein said act of placing said unit of work on one of a plurality of pallets comprises supporting said unit of work with a work carrier supported by at least one overhead track.

564. The method of claim 558 wherein said act of delivering the unit of work to selected machines includes placing said unit of work in a spaced-apart relationship along a belt conveyor with respect to other units of work.

565. The method of claim 558 wherein said act of moving selected of said moveable machines comprises placing each of said moveable machines on a moveable carriage and applying control commands to move the carriage along the production line.

566. The method of claim 558 wherein said act of moving selected of said moveable machines includes supporting each of said moveable machines on one of a plurality of pallets moveable along a track.

567. The method of claim 566 further comprising supporting each of said moveable machines with a carrier supported by at least one overhead track.

568. The method of claim 558 further comprising placing said moveable machines in spaced-apart relationship along a track.

569. A method for performing automatic operations on a plurality of units of work, comprising:

(a) simultaneously conveying a plurality of units of work on a conveyor along a predetermined path to a predetermined sequence consisting of a plurality of work stations to which can be moved a plurality of program-controllable machines moveable along side of said conveyor, wherein some units of work have a different predetermined sequence than others;

(b) with respect to a selected first of said plurality of machines:

(1) generating a plurality of machine control commands on the output of a computer and addressably communicating respective of said machine control commands to the selected machine;

(2) storing in an addressable memory at said selected machine at least some of said communicated machine control commands, wherein the memory contains, at different addresses, different sets of machine control commands, and wherein each set of machine control commands controls the movement of the machine or the operation of the machine to alter an aligned unit of work in a predetermined way, different sets physically altering the aligned unit of work differently; and (3) determining at the machine, in response to reading a code carried with the workpiece, an address in the memory of the selected machine from which to reproduce a set of machine control commands and reproducing, from that address said stored machine control commands and applying the reproduced commands to control the operation of said selected machine to cause said machine to move into alignment with a select unit of work at a first stationary work station in the predetermined sequence and to automatically perform at the work station a predetermined operation on the select unit of work altering it in a predetermined fashion; and (c) determining when the predetermined operation on the select unit of work is completed and automatically conveying the unit of work to a selected second stationary work station at which a selected second of said plurality of machines is aligned and repeating steps (1) through (3) to cause said selected second machine to perform a further predetermined operation altering the unit of work.

570. The method of claim 569 further comprising generating further control commands on the output of said computer to control the movement of said conveyor.

571. The method of claim 569 further comprising controllably moving one of said moveable machines to continue operating on said unit of work while said unit of work is conveyed along said conveyor.

572. The method of claim 569 further comprising controllably moving two of said moveable machines to perform simultaneous operation on a select unit of work at a stationary work station.

573. An automatic production method for operating on selected transported workpieces with selected of a plurality of automatic machines, each of said machines having a respective base supporting an operating tool end capable of supporting at least one individual tool, said method comprising;

(a) generating from an electronic storage a plurality of machine control commands;

(b) applying selected of said generated machine control commands to control simultaneous transport of a plurality of workpieces along a substantially horizontal path that defines a production line to a plurality of stationary work stations, and to transfer the workpieces to the work stations adjacent to the production line;

(c) directing other of said generated machine control commands to selected of said machines (d) applying selected of said directed machine control commands to move selected of the bases of the machines parallel and adjacent to said production line independently of the other machines to align the selected machines with workpieces at the work stations along the production line, wherein at least one of the workpieces is aligned with a predetermined subset of machines in a predetermined sequence, and wherein at least another of the workpieces is not aligned with the same predetermined subset of machines in the same sequence; and (e) applying other of said directed machine control commands to cause each of the machines to perform a tool operation altering each workpiece held at a work station aligned with each machine.

574. The method of claim 573 wherein controlling the transport of workpieces includes placing each of said workpieces on a moveable pallet and applying machine control commands to control delivery of the pallets to selected work stations at which the predetermined machines are aligned.

575. The method of claim 573 wherein controlling the transport of workpieces includes placing said workpieces on a plurality of pallets moveable along a track.

576. The method of claim 575 wherein placing said workpieces on a plurality of pallets comprises supporting one of said workpieces with a work carrier supported by at least one overhead track.

577. The method of claim 573 wherein controlling the transport of workpieces includes placing said workpieces in spaced-apart relationship along a conveyor.

578. The method of claim 573 wherein moving selected of the bases of the machines comprises applying machine control commands to control a moveable carriage supporting the machine, causing the machine to move along the production line.

579. The method of claim 578 wherein moving selected of the bases of the machines includes supporting each of said moveable machines on a carriage that moves along a track.

580. The method of claim 579 further comprising supporting each of said machine carriages by at least one overhead track.

581. The method of claim 573 wherein moving selected of the bases of the machines includes placing the bases of the moveable machines in spaced-apart relationship along a track.

582. The method of claim 573 wherein causing a selected machine to become aligned with a workpiece includes applying control commands to cause both the selected moveable machine base and the workpiece to stop along the production line.

583. The method of claim 573 wherein aligning said machine with said workpiece comprises sensing that a workpiece moving along the production line has reached the work station and stopping the moveable machine base adjacent to the work station.

584. The method of claim 573 further comprising applying other of said directed machine control commands to cause the tool end of one of the selected machines to execute multi axis motion with respect to a workpiece aligned with said machine.

585. The method of claim 573 further comprising storing the directed machine control commands in an addressable, electronic memory supported by the base of each of the selected machines, and wherein parts (d) and (e) include reproducing the stored machine control commands from an address that is determined at the machines.

586. The method of claim 573 further comprising pre-storing in an addressable, electronic memory supported by the base of each of the selected machines a plurality of sets of machine control commands operative to control a tool operation, and wherein part (e) comprises:

(a) applying one of said directed machine control commands to select one of said sets of stored machine control commands;

(b) reproducing from said memory said selected set of stored machine control commands; and (c) applying said reproduced set of stored commands to perform said tool operation.

587. The method of claim 586:

(a) wherein directing commands to selected of said machines comprises transmitting signals using wireless communication;

(b) further comprising moving the bases of a plurality of said selected machines to become aligned with a workpiece along the production line; and (c) wherein performing a tool operation comprises operating on said workpiece simultaneously with said plurality of machines.

588. The method of claim 587 further comprising applying other of said transmitted machine control commands to cause the tool end of one of the selected machines to execute multi-axis motion with respect to a workpiece aligned with said machine, further comprising storing the transmitted machine control commands in an addressable, electronic memory supported by the base of each of the selected machines, and wherein parts (d) and (e) include reproducing the stored machine control commands from an address that is determined at the machines.

589. The method of claim 586 wherein each of said pre-stored sets of machine control commands is associated with one of a plurality of different types of workpieces on the production line.

590. The method of claim 589 wherein directing commands to selected of said machines comprises transmitting signals using wireless communication, and wherein said transmitted machine control commands are applied to cause each of said plurality of different types of workpieces on said production line to have different machines operating thereon.

591. The method of claim 573 wherein aligning sad machine with said workpiece comprises sensing that a workpiece moving along the production line has readied a predetermined position relative to said machine.

592. The method of claim 591 wherein said sensing comprises detecting a surface of the workpiece with an electronic limit switch.

593. The method of claim 573 wherein directing commands to selected of said machines comprises transmitting signals using wireless communication.

594. The method of claim 593 further comprising applying other of said transmitted machine control commands to cause the tool end of one of the selected machines to execute multi-axis motion with respect to a workpiece aligned with said machine, further comprising storing the transmitted machine control commands in an addressable, electronic memory supported by the base of each of the selected machines, and wherein parts (d) and (a) include reproducing the stored machine control commands from an address that is determined at the machines.

595. The method of claim 573 further comprising moving the bases of a plurality of said selected machines to become aligned with a workpiece on the production line, and wherein performing a tool operation comprises operating on said workpiece simultaneously with said plurality of machines.

596. The method of claim 573 wherein said generated machine control commands are applied to cause each of a plurality of different types of workpieces on the production line to have different tool operations performed thereon.

597. The method of claim 596 wherein said generated machine control commands are applied to cause each of a plurality of different types of workpieces on the production line to have different machines operating thereon.

598. The method of claim 573:
(a) further comprising pre-storing in an addressable, electronic memory supported by the base of each of the selected machines a plurality of sets of machine control commands operative to control a tool operation;
(b) wherein each of said pre-stored sets of machine control commands is associated with one of a plurality of different types of workpieces on the production line;
(c) wherein part (c) comprises transmitting signals using wireless communication;
(d) wherein part (d) comprises moving the bases of the machines to cause a different selected subset of machines to operate on each of said plurality of different types of workpieces; and
(e) wherein part (e) comprises:
(1) applying one of said transmitted machine control commands to select one of said sets of stored machine control commands, wherein said transmitted command depends on which type of workpiece is aligned with the machine;
(2) reproducing from said memory said selected set of stored machine control commands; and
(3) applying said reproduced set of stored commands to perform said tool operation.

599. The system comprising:
(a) a workpiece transporter that defines a production line and that carries work-in-process in a substantially horizontal path,
(b) a plurality of automatic machines having respective local controllers, operating tool ends, and at least one individual tool bit supported at each tool end capable of performing at least one operation on work aligned with the respective machines,
(c) respective powered tool transporters that support selected of said plurality of machines adjacent to the production line and that move said selected machines adjacent to and along said production line under the control of the local controller of the respective machine,
(d) respective multi-part, flexible manipulator arms, each coupled to move the respective tool end to execute multi-axis travel with respect to the work, each of which arms is coupled to and under the control of the local controller of the respective machine, and
(e) a remote controller including an electronic storage device having a plurality of machine control commands stored there in and a reproduction device structured to reproduce from said storage device selected machine control commands and coupled to apply said reproduced signals to control operation of the workpiece transporter and the local controller of selected machines to: (1) predeterminately align work on the workpiece transporter with respect to selected of said machines, (2) cause said selected machines to execute multi-axis movement of their tool ends with respect to the aligned work and to cause their tool bits to perform predetermined operations thereon, and (3) cause selected of said plurality of tool transporters to move along said production line.

600. The system of claim 599 wherein said respective powered tool transporters move along a common support extending parallel to and above the workpiece transporter.

601. The system of claim 600 wherein said common support includes a guideway parallel to the production line and a locking device positioned to secure a machine on said guideway.

602. The system of claim 599 wherein said tool transporters are disposed on both sides of the production line so as to controllably position respective machines facing opposite sides of work on the production line.

603. The system of claim 602 wherein said workpiece transporter comprises a conveyor positioned to be driven substantially horizontally, and wherein said tool transporters are supported by a common support comprising a structural beam disposed above and substantially parallel to the workpiece transporter.

604. The system of claim 603 wherein said conveyor comprises an endless array of flights.

605. The system of claim 599 wherein said workpiece transporter includes a plurality of moveable pallets, each supporting at least one workpiece.

606. The system of claim 605 wherein said workpiece transporter includes a plurality of pallets moveable along a track.

607. The system of claim 599 wherein said workpiece transporter comprises a conveyor carrying a plurality of spaced-apart workpieces.

608. The system of claim 599 wherein said workpiece transporter comprises at least one overhead track and a plurality of work carriers supported by said track, each carrier in turn supporting at least one workpiece.

609. The system of claim 599 wherein said tool transporters comprise moveable tool pallets, each pallet supporting at least one tool.

610. The system of claim 609 further including a track aligned adjacent to the production line and configured to support and guide said moveable tool pallets.

611. The system of claim 599 wherein said plurality of tool transporters together comprise a conveyor carrying a plurality of spaced-apart machines.

612. The system of claim 599 wherein said each of said tool transporters is supported by and moveable along at least one overhead track.

613. The system of claim 599 wherein said remote controller includes means for applying selected machine control commands to predeterminately control operation of the workpiece transporter to align selected units of work and selected machines.

614. The system of claim 599 wherein said remote controller includes means for transmitting signals to align the work and the selected machines, to cause the selected machines to perform predetermined operations on the aligned work, and after the predetermined operation is completed, to cause selected tool transporters to move along the production line.

615. The system of claim 599 wherein said remote controller includes means for transmitting signals to cause a selected machine, while it is aligned with the work, to be stopped along the production line.

616. The system of claim 599 wherein said remote controller includes means for transmitting signals to cause a selected machine, while it is aligned with the work, to move along the production line.

617. An automatic production apparatus comprising:
(a) a conveyor carrying work-in-process at spaced-apart intervals along a substantially horizontal path of travel defining part of a production line,
(b) a plurality of separately operable machines disposed adjacent to the conveyor, each machine having a tool end and a tool transporter that moves said tool end in a plurality of directions with respect to work on said conveyor,
(c) a guideway disposed above and along the conveyor supporting selected tool transporters, and
(d) a controller structured to: (1) control the movement of each tool transporter supported by said guideway along said guideway to a predetermined location before initiating operation of the machine associated with said tool transporter, (2) operate the conveyor to align respective units of work with respective of said machines, and (3) operate at least one of said machines to perform at least one predetermined operation on work disposed on the conveyor and aligned with the machine.

618. The system of claim 617 wherein:
(a) the guideway comprises at least one track extending in two directions; and
(b) each of said tool transporters includes respective powered bi-directional drives.

619. The system of claim 617 further including respective program-controlled power drives coupled to move each tool end along a plurality of axes while performing different operations on work aligned with the tool transporter.

620. The apparatus of claim 617 further comprising a separate guideway associated with each of a selected plurality of tool transporters.

621. An automatic production apparatus of claim 620 wherein at least one of said tool transporters includes a bridge crane supported on said two separate guideways for travel in both directions parallel to said conveyor, wherein said bridge crane supports a track located above and extending across the conveyor, and wherein said bridge crane supports at least one programcontrolled machine that performs controlled operations on work supported by the conveyor.

622. An automatic production system comprising:
(a) at least one work transporter that supports and moves work along a path,
(b) at least one tool transporter disposed proximate to said work transporter,
(c) a machine supported on each of said tool transporters and moveable by said tool transporter proximate to and along the path, each machine comprising an electrically controlled and powered device structured to perform programmed operations on work supported by said work transporter,
(d) a local controller associated with each tool transporter that controls said electrically controlled and powered device and includes a remotely addressable command signal receiver and an electronic storage device coupled to said receiver, and
(e) a remote controller located remote from said machines structured and coupled to control said work transporter to align said work with only selected of the machines and to address the command signal receiver of said local controllers that are associated with the selected machines to cause a program in said storage device to control said selected machines to perform preprogrammed operations on work aligned therewith.

623. The system of claim 622 wherein said remote controller controls the operation of a plurality of selected machines to cause said machines to simultaneously perform operations on work supported adjacent to said machines.

624. The system of claim 622 wherein said remote controller controls a plurality of said selected machines to simultaneously operate on a single unit of work located adjacent to said machines.

625. The system of claim 624 wherein said plurality of machines includes a drill operable for drilling holes in work and a tapping tool for tapping such holes to permit fasteners to be secured to said work.

626. The system of claim 624 wherein said plurality of machines include a plurality of welding machines each operable for welding a different portion of said work.

627. The system of claim 624 wherein said plurality of machines includes a plurality of fastening machines each operable to fasten a different portion of said work.

628. The system of claim 624 wherein said plurality of machines includes a plurality of fastener applying machines.

629. The system of claim 624 wherein said plurality of machines includes a plurality of riveting machines.

630. The system of claim 629 wherein said plurality of machines includes at least one drilling tool and at least one riveting tool.

631. The system of claim 622 wherein:
(a) said tool transporter comprises first and second trackways each disposed adjacent to opposite sides of said work transporter and a bridge crane supported for travel along said first and second trackways above and across said work transporter,
(b) said machines include a carrier supported for movement laterally to a direction of travel of said work transporter by the bridge of said bridge crane, and
(c) said remote controller causes said bridge crane to move in a direction parallel to said work transporter and causes said carrier for said machine to move in a direction across said work transporter to predeterminately position said machine adjacent to work on said work transporter, and causes said machine to perform programmed operations on said work.

632. The system of claim 622 wherein said remote controller controls a plurality of machines to simultaneously operate on respective units of work located adjacent to said machines.

633. An automatic production apparatus comprising:
(a) a conveyor that carries work-in-process in a spaced-apart manner along a substantially horizontal path of travel, said path defining part of a production line,
(b) a plurality of selectively addressable and separately operable machines disposed adjacent to both sides of the conveyor,
(c) each machine having a tool end and a tool transporter to drive said machine in a plurality of directions with respect to work on said conveyor,
(d) at least one tool transporter guideway disposed above and along the conveyor that guides and locates each tool transporter with respect to said conveyor,
(e) a first control system coupled to and automatically prepositioning each tool transporter and its associated machine along said guideway at a select predetermined location relative to said conveyor adjacent to a work station, (f) a second control system coupled to and operating the conveyor and transferring respective units of work to said work station, and (g) a third control system coupled to and operating selected of said machines to perform predetermined operations on work aligned with said selected machines at the work station.

634. An automatic production system comprising:

(a) a conveyor structured to carry along a select path a plurality of work-holding pallets, each supporting at least one unit of work;

(b) a plurality of work stations located adjacent to said path, each having power-operated pallet securing devices;

(c) a plurality of machines structured to operate on work while positioned at a work station, each machine having a power-operated tool end, a power drive that effects multi-axis movement of said tool end, and a respective controller coupled to said power drive;

(d) a remote controller structured to generate addressed tool-control signals in the form of command control messages;

(e) each of said machines also having an addressable signal receiver and a signal-recording device coupled to store tool-control signals received by the signal receiver;

(f) a transmitter coupled to the remote controller to transmit addressed tool-control signals to correspondingly addressed signal receivers at selected machines;

(g) identification code readers positioned to generate a control signals when a work-holding pallet is conveyed to each of a plurality of said work stations; and (h) a local controller responsive to said control signals and coupled to the securing devices to effect the predeterminate positioning of different units of said work with respect to different selected subsets of said work stations; and (i) wherein at least some of said machines are mounted on moveable supports that are moved under the control of said remote controller to present at least two of said machines at one of said work stations to simultaneously operate on at least one unit of work at that work station.

635. An automatic production system comprising:

(a) a workpiece transporter defining a production line and structured to carry work-in-process in a substantially horizontal path from one end of the production line to the other without backtracking;

(b) a plurality of automatic machines, each of said machines having a respective:
 (i) local controller,
 (ii) base supporting an operating tool end, which is capable of supporting at least one individual tool bit,
 (iii) drive system positioned to move said tool bit in multi-axis travel with respect to work aligned with said machine, and
 (iv) local electronic storage device associated with said local controller, which storage device stores machine control commands applied by the local controller to operate the drive system and the machine to perform at least one operation on work aligned with said machine;

(c) powered tool transporters coupled to and supporting selected of said plurality of machines adjacent to the production line, each of said transporters including a power drive that is controllable to move its respective machine back and forth adjacent to and along said production line independently of the other machines;

(d) a remote controller including an electronic storage device that stores a plurality of machine control commands and a reproduction system positioned to extract from said storage device selected machine control commands; and (e) a communications system linking the remote controller with the workpiece transporter and the local controllers of said machines and structured to: (1) communicate selected of said reproduced machine control commands to selected local storage devices associated with the local controllers of selected of said machines so that programmed automatic operations can be carried out on work aligned with said machines, (2) apply selected of said reproduced machine control commands to control the workpiece transporter to cause supported work to move in a controlled manner along the production line relative to said machines, and (3) apply selected of said reproduced machine control commands to control the powered tool transporters to selectively move the associated machines adjacent to the production line to carry out operations on work moving along the production line; and (f) wherein the machine control commands stored by the electronic storage device of the remote controller control the workpiece transporter and the tool transporters to coordinate operation on the work by a predetermined sequence of machines.

636. The system of claim 635 wherein said workpiece transporter comprises a conveyor that supports a plurality of workpieces and wherein the machine control commands control the conveyor and the tool transporters to coordinate operation on each of the workpieces by a predetermined sequence of machines.

637. The system of claim 636 wherein said conveyor supports a plurality of spaced-apart workpieces and wherein the predetermined sequence of machines for at least one workpiece differs from the predetermined sequence of machines for at least another workpiece.

638. The system of claim 635 wherein said workpiece transporter comprises at least one moveable pallet.

639. The system of claim 638 wherein said workpiece transporter comprises a plurality of moveable pallets, each supporting at least one workpiece.

640. The system of claim 639 wherein said communication system includes a transmitter coupled to the remote controller and a receiver coupled to each of said pallets.

641. The system of claim 639 wherein said workpiece transporter comprises a plurality of pallets moveable along a track.

642. The system of claim 635 wherein said reproduction system of said remote controller includes a transducer that reproduces selected signals from the electronic storage device as command control messages.

643. The system of claim 635 wherein said workpiece transporter comprises at least one overhead track and a plurality of work carriers supported by said track, each carrier in turn supporting at least one workpiece.

644. The system of claim 635 wherein said tool transporters comprise moveable carriages, each supporting at least one machine.

645. The system of claim 635 wherein each of said tool transporters is supported by and moveable along at least one track aligned with the workpiece support.

646. The system of claim 645 wherein said track is disposed generally above the production line.

647. The system of claim 635 wherein said remote controller includes means for applying machine control commands to align the work and the selected machines.

648. The system of claim 635 wherein said remote controller includes means for applying signals to cause a selected machine, while it is aligned with the work, to be stopped along the production line.

649. The system of claim 635 wherein said remote controller includes means for applying signals to cause a selected machine, while it is aligned with the work, to move along the production line.

650. The system of claim 635 wherein said communication system includes a transmitter coupled to the remote controller and a receiver coupled to the local storage device of each local controller.

651. The system of claim 635 wherein said communication system includes a transmitter coupled to the remote controller and a receiver coupled to the power drive of each tool transporter.

652. An automatic production system comprising:
   (a) a workpiece transporter that defines a production line and that carries work-in-process in a substantially horizontal path,
   (b) a plurality of automatic machines having respective local controllers, operating tool ends, and at least one individual tool bit supported at each tool end capable of performing at least one operation on work aligned with the respective machines,
   (c) respective powered machine transporters that support selected of said plurality of machines adjacent to the production line and that move said selected machines along said production line under the control of the local controller of the respective machine,
   (d) respective multi-part, flexible manipulator arms, each coupled to move the respective tool end to execute multi-axis travel with respect to the work, each of which arms is coupled to and under the control of the local controller of the respective machine,
   (e) a plurality of stationary work stations adjacent to the workpiece transporter and the machine transporters, and
   (f) a remote controller including an electronic storage device having a plurality of machine control commands stored therein and a reproduction device structured to reproduce from said storage device selected machine control commands and coupled to apply said reproduced signals to control operation of the workpiece transporter and the local controller of selected machines to: (1) predeterminately align work at said work stations with respect to selected of said machines, (2) cause said selected machines to execute multi-axis movement of their tool ends with respect to the aligned work and to cause their tool bits to perform predetermined operations thereon, and (3) cause selected of said plurality of machine transporters to move along said production line.

653. The system of claim 652 wherein said respective powered machine transporters move along a common support extending parallel to and above the workpiece transporter.

654. The system of claim 653 wherein said common support includes a guideway parallel to the production line and a locking device positioned to secure a machine on said guideway.

655. The system of claim 652 wherein said machine transporters are disposed on both sides of the production line so as to controllably position respective machines facing opposite sides of work on the production line.

656. The system of claim 655 wherein said workpiece transporter comprises a conveyor positioned to be driven substantially horizontally, and wherein said machine transporters are supported by a common support comprising a structural beam disposed above and substantially parallel to the workpiece transporter.

657. The system of claim 656 wherein said conveyor comprises an endless array of flights.

658. The system of claim 652 wherein said workpiece transporter includes a plurality of moveable pallets, each supporting at least one workpiece.

659. The system of claim 658 wherein said workpiece transporter includes a plurality of pallets moveable along a track.

660. The system of claim 652 wherein said workpiece transporter comprises a conveyor carrying a plurality of spaced-apart workpieces.

661. The system of claim 652 wherein said workpiece transporter comprises at least one overhead track and a plurality of work carriers supported by said track, each carrier in turn supporting at least one workpiece.

662. The system of claim 652 wherein said machine transporters comprise moveable machine pallets, each pallet supporting at least one machine.

663. The system of claim 662 further including a track aligned adjacent to the production line and configured to support and guide said moveable machine pallets.

664. The system of claim 652 wherein said plurality of machine transporters together comprise a conveyor carrying a plurality of spaced-apart machines.

665. The system of claim 652 wherein said each of said machine transporters is supported by and moveable along at least one overhead track.

666. The system of claim 652 wherein said remote controller includes means for applying selected machine control commands to predeterminately control operation of the workpiece transporter to align selected units of work and selected machines.

667. The system of claim 652 wherein said remote controller includes means for transmitting signals to align the work and the selected machines, to cause the selected machines to perform predetermined operations on the aligned work, and after the predetermined operation is completed, to cause selected machine transporters to move along the production line.

668. The system of claim 652 wherein said remote controller includes means for transmitting signals to cause a selected machine, while it is aligned with the work, to be stopped along the production line.

669. The system of claim 652 wherein said remote controller includes means for transmitting signals to cause a selected machine, while it is aligned with the work, to move along the production line.

670. An automatic production system comprising:
   (a) at least one work transporter that supports and moves work,
   (b) at least one tool transporter disposed proximate to and along side of said work transporter,
   (c) a machine supported on each of said tool transporters, each machine comprising an electrically controlled and powered device structured to perform programmed operations on work supported at work stations adjacent to said work transporter,
   (d) a local controller associated with each tool transporter that controls said electrically controlled and powered device and includes a remotely addressable command signal receiver and an electronic storage device coupled to said receiver, and (e) a remote controller located remote from said machines structured and coupled to control said work transporter to transfer said work to a work station for alignment with only selected of the machines and to address the command signal receiver of said local controllers that are associated with the selected machines to cause a program in said storage device to control said selected machines to perform preprogrammed operations on work aligned therewith.

671. The system of claim 670 wherein said remote controller controls the operation of a plurality of selected machines to cause said machines to simultaneously perform operations on work supported adjacent to said machines.

672. The system of claim 670 wherein said remote controller controls a plurality of said selected machines to simultaneously operate on a single unit of work located adjacent to said machines.

673. The system of claim 672 wherein said plurality of machines includes a drill and a tapping tool.

674. The system of claim 672 wherein said plurality of machines include a plurality of welding machines, each positioned to weld a different portion of said work.

675. The system of claim 672 wherein said plurality of machines includes a plurality of fastening machines, each positioned to fasten a different portion of said work.

676. The system of claim 672 wherein said plurality of machines includes a plurality of fastener applying machines.

677. The system of claim 672 wherein said plurality of machines includes a plurality of riveting machines.

678. The system of claim 670 wherein said plurality of machines includes at least one drilling tool and at least one riveting tool positioned to set rivets in holes drilled by the drilling tool.

679. The system of claim 670 wherein:

(a) said machine transporter comprises first and second trackways each disposed adjacent to opposite sides of said work transporter and a bridge crane supported for travel along said first and second trackways above and across said work transporter, (b) said machines include a carrier supported for movement laterally to a direction of travel of said work transporter by the bridge of said bridge crane, and (c) said remote controller causes said bridge crane to move in a direction parallel to said work transporter and causes said carrier to move in a direction across said work transporter to predeterminately position work to said work station, and causes said machine to perform programmed operations on said work.

680. The system of claim 670 wherein said remote controller controls a plurality of machines to simultaneously operate on respective units of work located adjacent to said machines.

681. An automatic production system comprising:

(a) a workpiece transporter defining a production line and structured to carry work-in-process in a substantially horizontal path from one end of the production line to the other without backtracking;

(b) a plurality of automatic machines, each of said machines having a respective:
  (i) local controller,
  (ii) base supporting an operating tool end, which is capable of supporting at least one individual tool bit,
  (iii) drive system positioned to move said tool bit in multi-axis travel with respect to work aligned with said machine, and (iv) local electronic storage device associated with said local controller, which storage device stores machine control commands applied by the local controller to operate the drive system and the machine to perform at least one operation on work aligned with said machine;

(c) powered machine transporters coupled to and supporting selected of said plurality of machines adjacent to the production line, each of said transporters including a power drive that is controllable to move its respective machine back and forth adjacent to and along said production line independently of the other machines;

(d) a remote controller including an electronic storage device that stores a plurality of machine control commands and a reproduction system positioned to extract from said storage device selected machine control commands; and (e) a communications system linking the remote controller with the workpiece transporter and the local controllers of said machines and structured to: (1) communicate selected of said reproduced machine control commands to selected local storage devices associated with the local controllers of selected of said machines so that programmed automatic operations can be carried out on work aligned with said machines, (2) apply selected of said reproduced machine control commands to control the workpiece transporter to cause supported work to move in a controlled manner along the production line relative to said machines and to position the work at selected work stations, and (3) apply selected of said reproduced machine control commands to control the powered machine transporters to selectively move the associated machines adjacent to the production line to carry out operations on work at the selected work stations; and (f) wherein the machine control commands stored by the electronic storage device of the remote controller control the workpiece transporter and the machine transporters to coordinate operation on the work by a predetermined sequence of machines.

682. The system of claim 681 wherein said workpiece transporter comprises a conveyor that supports a plurality of workpieces and wherein the machine control commands control the conveyor and the machine transporters to coordinate operation on each of the workpieces by a predetermined sequence of machines.

683. The system of claim 682 wherein said conveyor supports a plurality of spaced-apart workpieces and wherein the predetermined sequence of machines for at least one workpiece differs from the predetermined sequence of machines for at least another workpiece.

684. The system of claim 681 wherein said workpiece transporter comprises at least one moveable pallet.

685. The system of claim 684 wherein said workpiece transporter comprises a plurality of moveable pallets, each supporting at least one workpiece.

686. The system of claim 685 wherein said workpiece transporter comprises a plurality of pallets moveable along a track.

687. The system of claim 685 wherein said communication system includes a transmitter coupled to the remote controller and a receiver coupled to each of said pallets.

688. The system of claim 681 wherein said reproduction system of said remote controller includes a transducer that reproduces selected signals from the electronic storage device as command control messages.

689. The system of claim 681 wherein said workpiece transporter comprises at least one overhead track and a plurality of work carriers supported by said track, each carrier in turn supporting at least one workpiece.

690. The system of claim 681 wherein said machine transporters comprise moveable carriages, each supporting at least one machine.

691. The system of claim 681 wherein each of said machine transporters is supported by and moveable along at least one track aligned with the workpiece support.

692. The system of claim 691 wherein said track is disposed generally above the production line.

693. The system of claim 681 wherein said communication system includes a transmitter coupled to the remote controller and a receiver coupled to the local storage device of each local controller.

694. The system of claim 681 wherein said communication system includes a transmitter coupled to the remote controller and a receiver coupled to the power drive of each machine transporter.

\* \* \* \* \*

UNITED STATES PATENT AND TRADEMARK OFFICE
CERTIFICATE OF CORRECTION

PATENT NO. : 6,708,385 B1
DATED : March 23, 2004
INVENTOR(S) : Jerome H. Lemelson It is certified that error appears in the above-identified patent and that said Letters Patent is hereby corrected as shown below:

Title page,
Item [73], Assignee, change "NE" to -- NV--.
Item [63], Related U.S. Application Data, change "continuation-in-part" to -- continuation--; and, change "application No. 07/636,415, which is" to -- said application No. 05/107,357 is --.
Item [57], ABSTRACT,
Line 3, change "by" to -- on--.

Column 1,
Line 7, change "06/51,656" to -- 06/251,656 --.
Line 21, delete "Ser. No. 07/636,415 is a CIP of".

Column 3,
Line 23, change "control,system" to -- control system --.

Column 7,
Line 8, change "fastener,applicators to -- fastener applicators --.

Column 10,
Line 23, delete the comma.
Line 39, change "thefixture" to -- the fixture --.

Column 11,
Line 25, change "Inspection" to -- inspection --.

Column 12,
Line 12, delete the comma after "is".

Column 17,
Line 12, change "2a" to -- 2a, --.

Column 19,
Line 53, delete the period.

Column 20,
Line 46, insert a hyphen, thereby changing "221" to -- 22-1 --.

Column 28,
Line 4, delete the comma.
Line 47, change "mac" to -- machines --.
Line 48, change "set" to -- sets --.

UNITED STATES PATENT AND TRADEMARK OFFICE
CERTIFICATE OF CORRECTION

PATENT NO. : 6,708,385 B1
DATED : March 23, 2004
INVENTOR(S) : Jerome H. Lemelson It is certified that error appears in the above-identified patent and that said Letters Patent is hereby corrected as shown below:

Column 29,
Line 10, insert a comma after "set".
Line 59, change "he" to -- the --.

Column 30,
Line 12, change "mining" to -- milling --.
Line 18, change "pallet" to -- pallets --.
Line 50, change "hereby" to -- thereby --.

Column 31,
Line 1, change "carded" to -- carried --.

Column 32,
Line 27, change "cared" to -- carried --.
Line 57, change "Is" to -- is --.

Column 33,
Line 20, insert a comma after "time".

Column 34,
Line 5, change "Is" to -- is --.

Column 35,
Line 32, change "machine" to -- channel --.

Column 38,
Line 46, change "kits" to -- units --.
Line 63, change "One" to -- one --.

Column 39,
Line 15, change "an" to -- than --.

Column 41,
Line 43, change "there upon" to -- thereupon --.

Column 46,
Line 34, change "an" to -- on --.
Line 58, change "vats" to -- units --.

Column 47,
Line 1, change "pallet:" to -- pallets --.
Line 49, change "progranuned" to -- programmed --.

UNITED STATES PATENT AND TRADEMARK OFFICE
CERTIFICATE OF CORRECTION

PATENT NO. : 6,708,385 B1
DATED : March 23, 2004
INVENTOR(S) : Jerome H. Lemelson It is certified that error appears in the above-identified patent and that said Letters Patent is hereby corrected as shown below:

<u>Column 48,</u>
Line 17, insert a comma after "travel".

<u>Column 51,</u>
Lines 20-21, change "programcontrollable" to -- program-controllable --.
Line 51, change "locate" to -- locating --.
Line 64, change "(1)" to -- (i) --.

<u>Column 53,</u>
Line 20, change "to,cause" to -- to cause --.

<u>Column 55,</u>
Line 40, change "unit" to -- units --.

<u>Column 56,</u>
Line 52, change "programcontrollable" to -- program-controllable --.

<u>Column 57,</u>
Line 1, change "(i)" to -- (ii) --.

<u>Column 58,</u>
Line 8, change "programcontrollable," to -- program-controllable, --.
Line 31, change "identify" to -- identifying --.
Line 32, change "sis" to -- signals --.

<u>Column 60,</u>
Line 22, change "costs" to -- command --.
Line 37, change "commands" to -- and --.

<u>Column 62,</u>
Line 62, insert a comma after "work".

<u>Column 63,</u>
Line 22, change "herein" to -- wherein --.
Line 46, change "machine," to -- machines, --.

<u>Column 64,</u>
Line 50, change "machines" to -- machine, --.

<u>Column 66,</u>
Line 64, change "255" to -- 261 --.

UNITED STATES PATENT AND TRADEMARK OFFICE
CERTIFICATE OF CORRECTION

PATENT NO.   : 6,708,385 B1
DATED        : March 23, 2004
INVENTOR(S)  : Jerome H. Lemelson It is certified that error appears in the above-identified patent and that said Letters Patent is hereby corrected as shown below:

Column 69,
Line 23, change "Of" to -- of --.

Column 72,
Line 44, change "set" to -- sets --.

Column 73,
Line 21, change "tease" to -- least --.

Column 74,
Lines 11 and 14, change "321" to -- 357 --.

Column 78,
Line 45, delete the first comma.

Column 82,
Line 64, change "operation" to -- operations --.
Line 66, change "fit" to -- first --.

Column 86,
Line 43, delete the comma.

Column 89,
Line 4, change "fast" to -- first --.

Column 90,
Line 31, change "an" to -- are --.

Column 93,
Line 23, change "sis" to -- signals --.

Column 94,
Line 3, change "sad" to -- said --.

Column 95,
Line 22, change "spaced apart" to -- spaced-apart --.

Column 97,
Line 1, change "then" to -- them --.

UNITED STATES PATENT AND TRADEMARK OFFICE
CERTIFICATE OF CORRECTION

PATENT NO. : 6,708,385 B1
DATED : March 23, 2004
INVENTOR(S) : Jerome H. Lemelson It is certified that error appears in the above-identified patent and that said Letters Patent is hereby corrected as shown below:

Column 99,
Line 16, change "stared" to -- stored --.
Line 41, change "prestored" to -- pre-stored --.

Column 103,
Line 63, change "multi axis" to -- multi-axis --.

Column 104,
Line 50, change "readied" to -- reached --.
Line 65, change "(a)" to -- (e) --.

Column 105,
Line 63, change "there in" to -- therein --.

Column 107,
Line 45, change "programcontrolled" to -- program-controlled --.

Column 108,
Line 27, change "629" to -- 622 --.

Signed and Sealed this

Twenty-eighth Day of June, 2005

JON W. DUDAS
*Director of the United States Patent and Trademark Office*